United States Patent
Hibino et al.

(10) Patent No.: US 7,773,478 B2
(45) Date of Patent: Aug. 10, 2010

(54) OPTICAL RECORDING MEDIUM, MULTI-LAYERED OPTICAL RECORDING MEDIUM, AND OPTICAL RECORDING METHOD AND RECORDING APPARATUS USING THE SAME

(75) Inventors: Eiko Hibino, Yokohama (JP); Hiroshi Miura, Yokohama (JP); Kazunori Ito, Yokohama (JP); Makoto Harigaya, Hiratsuka (JP); Hiroyoshi Sekiguchi, Yokohama (JP); Michiaki Shinotsuka, Hiratsuka (JP); Masaru Shinkai, Yokohama (JP); Masaki Kato, Sagamihara (JP); Katsuyuki Yamada, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 1169 days.

(21) Appl. No.: 11/391,388

(22) Filed: Mar. 29, 2006

(65) Prior Publication Data
US 2007/0081445 A1 Apr. 12, 2007

Related U.S. Application Data

(63) Continuation of application No. PCT/JP2006/304543, filed on Mar. 2, 2006.

(30) Foreign Application Priority Data

| Mar. 2, 2005 | (JP) | ............................. 2005-057781 |
| Mar. 3, 2005 | (JP) | ............................. 2005-059644 |
| Jul. 22, 2005 | (JP) | ............................. 2005-213335 |
| Nov. 28, 2005 | (JP) | ............................. 2005-342367 |
| Nov. 29, 2005 | (JP) | ............................. 2005-344769 |

(51) Int. Cl.
G11B 7/004 (2006.01)

(52) U.S. Cl. ..................... 369/59.11; 369/94

(58) Field of Classification Search ................ 369/59.1, 369/59.11, 94, 275.2
See application file for complete search history.

(56) References Cited

U.S. PATENT DOCUMENTS 5,818,808 A * 10/1998 Takada et al. ................ 369/116

(Continued)

FOREIGN PATENT DOCUMENTS

EP 1 300 836 4/2003

(Continued)

OTHER PUBLICATIONS

Japanese Office Action dated Dec. 12, 2006.

(Continued)

Primary Examiner—Wayne R Young
Assistant Examiner—Thomas D Alunkal
(74) Attorney, Agent, or Firm—Dickstein Shapiro LLP

(57) ABSTRACT

The present invention relates to an recording method for a multi-layered optical recording medium including M phase change recording layers, with $M \geq 2$. The method comprises recording a mark in a Kth one of said recording layers by using a laser to irradiate the Kth recording layer using a recording pulse train including a plurality of laser beam pulses. The recording pulse train for the Kth recording layer has a cycle of $t_{(K)}[T]$, the 1st recording layer is the recording layer closest the laser beam, and the Mth recording layer is the recording layer furthest from the laser beam, T is a clock cycle. The following relationship is satisfied:

$t_{(1)} < t_{(M)}$, and the cycle of recording pulse train does not decrease from one recording layer to the next recording layer in the direction in which the laser beam irradiates.

16 Claims, 18 Drawing Sheets

U.S. PATENT DOCUMENTS

| | | | |
|---|---|---|---|
| 6,169,722 B1 * | 1/2001 | Kikukawa et al. | 369/275.4 |
| 6,333,913 B1 * | 12/2001 | Yoshinari et al. | 369/283 |
| 6,411,579 B2 * | 6/2002 | Nobukuni et al. | 369/59.12 |
| 7,142,496 B2 | 11/2006 | Miyagawa et al. | |
| 7,167,431 B2 * | 1/2007 | Miura et al. | 369/59.11 |
| 2002/0196324 A1 * | 12/2002 | Abe et al. | 347/179 |
| 2003/0081523 A1 * | 5/2003 | Miyagawa et al. | 369/59.11 |
| 2003/0142606 A1 * | 7/2003 | Ogawa et al. | 369/59.11 |
| 2004/0017768 A1 * | 1/2004 | Hibino et al. | 369/283 |
| 2005/0163011 A1 | 7/2005 | Miura et al. | |

FOREIGN PATENT DOCUMENTS

| | | |
|---|---|---|
| EP | 1 484 751 | 12/2004 |
| JP | 11-66576 | 3/1999 |
| JP | 2002-541606 | 3/2000 |
| JP | 3223907 | 8/2001 |
| JP | 2001-273638 | 10/2001 |
| JP | 2001-331936 | 11/2001 |
| JP | 2003-242644 | 2/2002 |
| JP | 2002-237051 | 8/2002 |
| JP | A 2002-242644 | 8/2002 |
| JP | 2002-288830 | 10/2002 |
| JP | 2002-288837 | 10/2002 |
| JP | 2005-71396 | 3/2003 |
| JP | 2003-178448 | 6/2003 |
| JP | 2003-211849 | 7/2003 |
| JP | 2003-242643 | 8/2003 |
| JP | 2003-242644 | 8/2003 |
| JP | 2003-242645 | 8/2003 |
| JP | 2004-46956 | 2/2004 |
| JP | 2004-47053 | 2/2004 |
| JP | 2004-63005 | 2/2004 |
| JP | 2005-63586 | 3/2005 |
| JP | 2005071396 | 3/2005 |
| WO | WO 00/60584 | 10/2000 |

OTHER PUBLICATIONS

Annex to European Search Report dated Dec. 13, 2007.
International Search Report issued on Jun. 13, 2006.

* cited by examiner

Amorphous mark

Fused area of the amorphous mark

Laser Beam

The number of repetitive recording times

| parameter | 8para | 6para |
|---|---|---|
| Ttop | 3 | 3 |
| Tmp | 3 | 3 |
| dTtop | 6 | 6 |
| dTtop3 | 4 | 4 |
| dTlp | -8 | -7 |
| dTera | 5 | 6 |
| dTlp3 | -7 | |
| dTlp4 | -7 | |

OPTICAL RECORDING MEDIUM, MULTI-LAYERED OPTICAL RECORDING MEDIUM, AND OPTICAL RECORDING METHOD AND RECORDING APPARATUS USING THE SAME

CROSS-REFERENCE TO RELATED APPLICATIONS

This is a continuation of Application No. PCT/JP2006/304543, filed on Mar. 2, 2006.

BACKGROUND OF THE INVENTION

1. Field of the Invention

The present invention relates to an optical recording medium having a phase-change optical recording layer and capable of high-density recording such as rewritable DVD (Digital Versatile Disc), which may be referred to as "optical information recording medium" or "optical disc" and relates to an optical recording method and an optical recording apparatus using the optical recording medium.

The present invention also relates to a multi-layered optical recording medium having two or more information layers each containing a recording layer in which information can be rewritably recorded and reproduced by irradiating the information layers with a laser beam to induce optical changes onto a material for the recording layers and relates to an optical recording method and an optical recording apparatus using the multi-layered optical recording medium.

2. Description of the Related Art

Recently, demands for high-speed recording of optical recording media have increased. Particularly for disc type optical recording media, speeding-up of recording is progressing, because recording speed and reproducing speed thereof can be speeded up by accelerating the rotation speed. Among optical discs, optical recording media capable of recording information with only modulation degrees of light for irradiation during recording enable price-reduction of media themselves and recording apparatuses because of the simple recording mechanism thereof and ensure high-compatibility with reproducing-only apparatuses, because intensely modulated light is also used for reproducing. For the reason stated above, these optical recording media became popular, and demands for high-densification and high-speed recording are further increased.

Among these optical discs, those using phase-change materials have become mainly used because of the capability of repeatedly rewriting information many times. In the case of optical discs using phase-change materials, information is recorded by subjecting the recording layer material to a quenched condition and an annealed condition by means of intensified modulation degrees of light for irradiation. In a quenched condition, the recording layer material becomes amorphous, and in an annealed condition, the recording layer material becomes crystalline. Since optical properties differ between an amorphous phase and a crystalline phase, information can be recorded. In other words, phase-change optical recording media are those in which a thin recording layer on a substrate is irradiated with a laser beam to heat the recording layer and induce phase changes between a crystalline phase and an amorphous phase on the recording layer structure to change the reflectance of the disc to thereby record or erase information. Typically, non-recorded portions are formed in a crystalline phase having a high reflectance, and information is recorded by forming marks formed in an amorphous phase having a low reflectance and spaces formed in a crystalline phase having a high reflectance on the non-recorded portions.

Since a complex mechanism of "quenching" and "annealing" of such a recording layer material is used as a recording principle, in high-speed recording, as commonly known, information is recorded by irradiating a recording medium with a recording light beam of which the pulse is split and intensely modulated into ternary.

Examples of an emission pattern of a waveform or a recording strategy for repeatedly recording data which contains marks and spaces include those used for DVD+RW or the like as shown in FIG. 7. A mark in an amorphous condition is formed by pulse irradiation of repeatedly alternating a peak power (Pw=Pp) beam and a bias power (Pb) beam, and a space in a crystalline condition is formed by consecutive irradiation with an erasing power (Pe) beam which is on the intermediate level between the peak power (Pw=Pp) beam and the bias power (Pb) beam. For a space or spaces, an erasing power beam may be binarized for irradiation in a pulse pattern.

When a recording layer is irradiated with a pulse train containing a peak power beam and a bias power beam, the recording layer is repeatedly fused and quenched to form an amorphous mark. When a recording layer is irradiated with an erasing power beam, the recording layer is fused and slowly cooled or annealed in a solid phase condition to be crystallized, and then a space is formed. A pulse train containing a peak power beam and a bias power beam is typically categorized into a leading pulse, intermediate pulses, and a last pulse. The shortest mark 3T is recorded using only the leading pulse and the last pulse, and when a mark of 4T or more is recorded, the intermediate pulses are used in addition to the leading pulse and the last pulse. The intermediate pulse is called as "multi-pulse" and is set for each 1T cycle, and every time the mark length increases in length by 1T, the number of pulses is increased by one. Namely, the number of pulse trains is a value of (n−1) with respect to the mark length nT.

When information is recorded at high-speeds faster than 4× DVD, the time of a basic clock cycle T is shortened, and thus the load burdened on the light source driving member is increased. When a recording layer is irradiated with a pulse train of a 1T cycle, both the heating time and the cooling time are shortened, which leads to a problem that amorphous marks formed in sufficient size cannot be obtained. To prevent the problem, there are various proposals, in which the number of pulses for forming amorphous marks is reduced, namely, the pulse cycle is set to have a cycle longer than 1T, to secure sufficient time for both heating and cooling so that amorphous marks in sufficient size can be formed (for example, Japanese Patent Application Laid-Open (JP-A) Nos. 2002-237051, 2002-288837, and 2001-331936, and other documents).

In addition, in the high-speed recording, information can be recorded with a low jitter at the first recording, however, when repeatedly recorded, an event that the jitter is drastically raised conspicuously occurs. FIG. 1 shows an example of variations in jitter during a random pattern being repeatedly recorded. The jitter drastically increased at the first time of repetitive recording is gradually lowered by around 10 times repetitive recording and is settled, and the variations in jitter from the time when the layer quality is degraded by the several thousand times repetitive recording to the several million times repetitive recording till the time when the jitter is raised again are small. The raise of jitter in the early stage of repetitive recording is also observed in low-speed recording as fast as 1× DVD to 2× DVD, however, the variations in jitter is not so conspicuous, and even when the jitter is raised in low-speed recording as fast as 1× DVD to 2× DVD, it is possible to satisfy the standard jitter value. As the recording linear velocity is speeded up, there are often cases where particularly the jitter at the first time of repetitive recording is high and is beyond the standard jitter, although excellent recording can be performed at the first recording or after repeatedly recorded 10 times or more.

It is presumed that such an increase of jitter in the early stage of repetitive recording is caused by some difference in conditions between the early stage crystalline phase formed in the initialization process and the crystalline phase formed during recording. For this reason, in the early stage of repetitive recording in which the early stage crystalline phase and the crystalline phase formed during recording are mixed, variations in shape of a mark occur, resulting in increases in jitter values. It is presumed that almost entire recording tracks are formed with the crystalline phase formed during recording by around ten times of repetitive recording, and thus the variations in shape of a mark are mitigated to lower the jitter.

Thus, the jitter in the early stage of repetitive recording largely differs depending on the early stage crystalline condition. The jitter in the early stage of repetitive recording can be lowered by making the early stage crystalline phase in a condition similar to the condition of the crystal formed during recording. Specifically, when initializing a recording layer for high-speed recording, the jitter in the early stage of repetitive recording tends to be lowered by using a beam of large aperture to scan the recording layer at higher linear velocity to fuse and crystallize the recording layer.

However, the crystalline condition formed in high-speed recording is typically unstable, and even with an optical recording medium that shows excellent properties immediately after the initialization process, there is a tendency that the condition changes with the lapse of time, and excellent recording will not be performed under the same recording conditions. The appearance is shown in FIG. 2. FIG. 2 shows an example that recording was enabled with low jitters immediately after the initialization even in the early stage of repetitive recording, however, when information was recorded again in non-recorded portions one-month after the first repetitive recording under the same recording conditions, the jitters was raised. Thus, it is necessary to reduce the jitter in the early stage of repetitive recording, even when the early stage crystalline condition is not equal to the condition of crystal formed at the time of recording.

As a recording method effective in reducing the jitter at the first time of repetitive recording, Japanese Patent Application Laid-Open (JP-A) No. 2004-46956 describes that the start time of a heating pulse of the leading part is delayed by 1T or more. According to studies by the inventors of the present invention, the recording method is an effective method when a cycle of 1T is used for a pulse train. However, the recording method is ineffective when the pulse cycle is set to be longer than 1T for responding to higher speed recording.

In addition, Japanese Patent (JP-B) No. 3223907 discloses that recording can be excellently performed by prolonging the irradiation time of a heating pulse of the leading part. The recording method is also effective in reducing the raise of jitter in the early stage of repetitive recording. However, in the case of high-speed recording, the recording method has a problem that the layers easily suffer from deterioration with prolonged irradiation time because the peak power value is typically high, and the repetitive recording endurance degrades. The recording method also has a problem that marks recorded in adjacent tracks are partially erased, and frequency of cross-erase is increased.

Phase-change optical recording media such as compact discs-rewritable (CD-RW) typically have a basic structure in which a recording layer containing a phase-change material is formed on a plastic substrate, and a reflective layer capable of improving light absorption of the recording layer and having thermal diffusion effect is formed on the recording layer, and the layer structure is irradiated with a laser beam from the substrate surface to thereby record and reproduce information.

Phase-change recording materials used for recording layers of phase-change optical recording media induces phase changes between a crystalline condition and an amorphous condition by repeatedly heating the phase-change material by means of a laser beam and cooling the phase-change material, and the materials are in an amorphous condition when rapidly heated and quenched, and the materials are in a crystalline condition when slowly cooled. Phase-change optical recording media are those to which the characteristic is applied to recording of information, and information is reproduced by utilizing difference in reflectances caused by difference in optical constants between a crystalline condition and an amorphous condition.

A phase-change optical recording medium typically contains an upper protective layer (which may be referred to as upper dielectric layer) formed between a substrate and a recording layer, and a lower protective layer (which may be referred to as lower dielectric layer) formed between the recording layer and a reflective layer for the purpose of preventing oxidation, transpiration, and deformation caused by application of heat by means of irradiation of a light beam. These protective layers have a function to control optical properties of recording media by controlling the thicknesses of the layers. Further, the upper protective layer also has a function to prevent the substrate from softening by heat generated when the recording layer is recorded.

Recently, with increased amount of information used through computers or the like, the recorded volume with signals recorded on rewritable optical discs such as DVD-RAM, DVD-RW, and DVD+RW are increased, and high-densification of signal information is rapidly addressed. As of now 2005, a compact disc (CD) has a storage capacity of around 650 MB, and a digital versatile disc (DVD) has a storage capacity of around 7 GB, however, demands for high-density recording are expected to be further increased in the near future.

As a method for high density recording by using such an optical recording medium, for example, there have been proposed a method in which a laser wavelength to be used is shortened to blue-laser wavelengths, and a method in which the spot size of a laser beam to be used for irradiating an optical recording medium is reduced by increasing the numerical aperture (NA) of an object lens to be used for pick-up for recording and reproducing information. Studies and developments of these methods have progressed and come close to being put into practical use.

On the other hand, as a method for improving an optical recording medium itself to increase the storage capacity, various proposals have been presented for a two-layered optical recording medium which is produced by a method in which two information layers respectively have at least a recording layer and a reflective layer disposed in a laminar structure on one surface of a substrate, and these information layers are bonded through an ultraviolet curable resin, and the like. An intermediate layer being bonded between the information layers has a function to optically separate the two information layers, and since a laser beam used for recording and reproducing needs to reach the inner side information layer as far as possible, the intermediate layer contains a material which prevents absorbing light as far as possible. However, with respect to the two-layered optical recording medium, there are still many problems to resolve. For example, when a laser beam is not sufficiently transmitted to the information layer (a first information layer) formed on the front side as viewed from the laser beam irradiation side, information cannot be recorded nor reproduced in the recording layer of the inner side information layer (a second information layer), and thus the reflective layer constituting the first information layer needs to be an extremely thin translucent reflective layer.

Recording on a phase-change optical recording medium is performed in the way where a phase-change material used for a recording layer is irradiated with a laser beam to heat the phase-change material up to the melting point or higher temperatures and then the phase-change material is quenched to change a crystalline condition into an amorphous condition to thereby form recording marks. Information is erased by heating the phase-change material of the recording layer up to the crystallization temperature or higher temperatures and then annealing the phase-change material to change an amorphous condition to a crystalline condition.

In a conventional single-layer optical recording medium, since a reflective layer can be sufficiently thickly formed, it is possible to allow residual heat caused by laser beam irradiation to quickly escape. Thus, amorphous conditions are easily formed due to progressed quenching effect. Similarly, with respect to a two-layered optical recording medium, there is no need to make a laser beam transmitted to a second information layer thereof, and thus a second reflective layer and a second recording layer may be formed to respectively have a thickness as can be seen in conventional single-layer optical recording media, and when a first information layer has a high transmittance, it is possible to obtain excellent recording properties as well as to reproduce information with ease.

However, when information is recorded on a first information layer of a two-layered optical recording medium, and an extremely thin translucent reflective layer having a thickness around 10 nm is used, it is difficult to form amorphous marks, because thermal diffusion effect is reduced. To allow information to be recorded and reproduced on the recording layer of a second information layer, it is preferred that the first information layer have a high light transmittance. Then, to record or erase amorphous marks on the first information layer of a two-layered optical recording medium, it is necessary to irradiate the first information layer with a laser beam of a recording power or an erasing power higher than those of a single-layer optical recording medium in which reflective layers can be thickly formed. For example, it is known that an erasing power Pe ranging from approx. 6 mW to 9 mW brings about excellent properties on conventional DVD single-layer optical recording media at a recording linear velocity ranging from 3.5 m/s to 27.9 m/s. Contrarily, an erasing power Pe used for irradiation of a first information layer of a DVD two-layered optical recording medium needs approx. 6 mW to 9 mW at a recording linear velocity ranging from 3.5 m/s to 14 m/s, and it needs an erasing power having high-density energy in the context of the recording linear velocity being slower than that of a single-layer optical recording medium.

In addition, since a two-layered optical recording medium needs a high-erasing power Pe but also has a thin first reflective layer, thermal diffusion property of the first information layer is fairly poorer than that of a single-layer optical recording medium, and there is a problem with thermal effects that a first recording layer being formed ultrathin suffers. When information is recorded at a recording linear velocity ranging from 3.5 m/s to 14 m/s, a recording power Pp having power two times or more of the erasing power is required, residual heat generated by such a high-recording power further causes thermal damage onto the first recording layer, and thus there is a problem to prevent the thermal damage.

For example, Japanese Patent Application Laid-Open (JP-A) No. 2004-63005 proposes a method in which an erasing power beam is binarized for irradiation in pulse energy when a space is formed. However, in the proposal, the erasing power immediately anterior to the leading pulse having a peak power Pp for forming marks is not reduced to the bias power Pb level, and when information is recorded by the recording method, there is a problem with excessive application of heat induced by residual heat.

In addition, when information is recorded by a recording method in which the erasing power used just before forming a recording mark is temporarily increased as seen in Japanese Patent Application Laid-Open (JP-A) No. 2002-288830, it also causes a problem with excessive application of heat.

In a method that only the bias power Pb is set immediately anterior to the leading pulse, as can be seen in Japanese Patent Application Laid-Open (JP-A) Nos. 2001-273638, 2004-47053 and 2005-63586, when recording and erasing is performed in the first information layer having poor thermal diffusion property as seen in a two-layered optical recording medium, the effect is insufficient, and there is a problem that it is hard to obtain excellent recording properties, although the effect can be sufficiently exerted with a single-layer optical recording medium.

Thus, when information is recorded on a first recording layer formed in a first information layer disposed on the front side as viewed from the laser beam flux irradiation side of a multi-layered optical recording medium which contains two or more information layers on which information can be rewritably recorded and reproduced by irradiating the information layers with a laser beam to induce optical changes onto recording layer materials, a recording method for a multi-layered optical recording medium capable of preventing thermal damage that the first recording layer suffers, appropriately recording and erasing information, and having excellent recording property has not yet been provided. Therefore, prompt developments on such a recording method are desired.

SUMMARY OF THE INVENTION

It is therefore an object of the present invention to provide an optical recording medium capable of reducing the increase in jitters in the early stage of repetitive recording regardless of the early stage crystalline condition without causing deterioration of repetitive recording endurance and increases in cross-talk even at a high-speed recording as fast as 6× DVD to 8× DVD, and an optical recording method and an optical recording apparatus using the optical recording medium.

When information is recorded on a first recording layer formed in a first information layer disposed on the front side as viewed from the laser beam flux irradiation side of a multi-layered optical recording medium having two or more information layers containing phase-change recording layers, embodiments of the present invention also provide a multi-layered optical recording medium capable of preventing thermal damage the first recording layer suffers, appropriately recording and erasing information, and having excellent repetitive recording property and two or more recording layers excelling in recording sensitivity as well as a recording method and a recording apparatus for the multi-layered optical recording medium.

According to a first aspect of the invention, there is provided a recording method for a multi-layered optical recording medium including M phase change recording layers, with M>2, the method comprising:

recording a mark in a Kth one of said recording layers by using a laser to irradiate the Kth recording layer using a recording pulse train including a plurality of laser beam pulses, the recording pulse train for the Kth recording layer having a cycle of $t_{(T)}$[T], where:

the 1st recording layer is the recording layer closest to the laser beam, the Mth recording layer is the recording layer furthest from the laser beam, T is a clock cycle; wherein the following relationship is satisfied:

$t_{(1)} < t_{(M)}$, and the cycle of recording pulse train does not decrease from one recording layer to the next recording layer in the direction in which the laser beam irradiates.

In the optical recording method for a multi-layered optical recording medium according to the first aspect, repetitive recording property of the recording layer disposed at the front side thereof and the recording sensitivity of the recording at the innermost side thereof can be made improved.

By using a recording strategy of 1T at the front side of the recording layer, and using a recording strategy of 2T at the innermost side of the recording layer, the following effects can be obtained.

(1) excellent jitter property can be obtained at the front side of the recording layer;
(2) the recording sensitivity of the innermost side of the recording layer can be improved (recording is enabled with a low recording power); and
(3) an effect for improving the maximum value of the modulation degree at the innermost side of the recording layer can be obtained (as can be seen in FIG. 32, the saturated value of the modulation degree at the innermost side thereof (2T recording strategy side) is 2% higher than that of the modulation degree at the front side thereof (1T recording strategy side).

In a recording strategy of 1T, as shown in FIG. 34, to record a mark having a length of nT, (n−1) pulses are used.

In a recording strategy of 2T, as shown in FIG. 35, when a mark having a length of nT using m pulses, 'n' is equal to 2m, provided that 'n' is an even number, and 'n' is equal to 2m plus 1 provided that 'n' is an odd number (where m≧1).

In a recording strategy of 3T, as shown in FIG. 36, when a mark having a length of nT using m pulses (where m≧1), the following equations are realized:

when 'n' is divided by 3 and 1 is left, $n=3m-2$ when 'n' is divided by 3 and 2 is left, $n=3m-1$ and when 'n' is multiples of 3, $n=3m$ Embodiments of the invention can provide a method in which the following relationship is satisfied for recording pulse used for the 1st and the 2nd layers:

$t_{(1)} < t_{(2)}$.

Embodiments of the invention can comprise recording a mark in 1st recording layer using a recording pulse train having a cycle of 1T; and recording a mark in the 2nd recording layer using a recording pulse train having a cycle of 2T.

Embodiments of the invention can comprise recording a mark in 1st recording layer using a recording pulse train having a cycle of 1T; and recording a mark in the other recording layers using a recording pulse train having a cycle of 2T.

Embodiments of the invention can provide a method in which when a mark having a length of nT is recorded in the recording layers of the M phase change recording layers except the Mth recording layer, the following relationship is satisfied:

$(n-1.5)T \leq Tr \leq (n-1)T$ wherein n is an integer of not less than 1, and Tr represents the interval between the leading edge of the leading pulse to the leading edge of the last pulse.

Embodiments of the invention can provide a method in which the following relationship is satisfied:

$0.12T \leq Tmp \leq 0.3T$, where Tmp represents the width of a recording pulse.

Embodiments of the invention can provide a method in which marks are recorded on the recording layers other than the recording layer disposed at the innermost side as viewed from the laser beam irradiation side, and the recording marks are formed by a recording pulse train being set such that cooling power levels Pc1, Pc2, . . . , PcN (where N is an integer of 1 or more) are modulated between a bias power level Pb and a recording power level Pp and are set between an erasing power level Pe and at least one bias power level Pb of the bias power level Pb anterior to a leading pulse and the bias power level Pb posterior to a last pulse so as to satisfy the following relation:

Pp>Pe>Pc1>Pc2 . . . >PcN>Pb

Embodiments of the invention can provide a method in which the marks are formed by a recording pulse train being set such that the cooling power levels Pc1, Pc2, . . . , PcN (where N is an integer of 1 or more) are modulated between the bias power level Pb and the recording power level Pp and are set between the erasing power level Pe and the bias power level Pb anterior to the leading pulse so as to satisfy the following relation:

Pp>Pe>Pc1>Pc2 . . . >PcN>Pb

Embodiments of the invention can provide a method in which the marks are formed by a recording pulse train being set such that the cooling power levels Pc1, Pc2, . . . , PcN (where N is an integer of 1 or more) are modulated between the bias power level Pb and the recording power level Pp and are set between the erasing power level Pe and the bias power level Pb posterior to the last pulse so as to satisfy the following relation:

Pp>Pe>Pc1>Pc2 . . . >PcN>Pb

Embodiments of the invention can provide a method in which the marks are formed by a recording pulse train being set such that the cooling power levels Pc1, Pc2, . . . , PcN (where N is an integer of 1 or more) are modulated between the bias power level Pb and the recording power level Pp and are set between the erasing power level Pe and the bias power level Pb being anterior to the leading pulse and posterior to the last pulse so as to satisfy the following relation:

Pp>Pe>Pc1>Pc2 . . . >PcN>Pb

The value N in the cooling power levels Pc1, Pc2, . . . , PcN can be any one of integers from 1 to 3.

The information can be recorded on each of the two or more phase-change recording layers, and the information can recorded by varying at least one of a ratio εe (Pe/Pp) between the recording power level Pp and the erasing power level Pe and a ratio d1, . . . dN (Pc1/Pp, . . . , PcN/Pp) between the recording power level Pp and the cooling power levels Pc1, Pc2, ..., PcN for each of the two or more phase-change recording layers.

Embodiments of the invention can provide a method in which the number of irradiation pulses of the recording power level Pp used at the time of recording a recording mark having a length of nT (where n is an integer of one or more, and T represents a clock cycle) is represented as m (where m is an integer of one or more), the relation n=2m is satisfied, provided that the value n is an even number, and the relation n=2m+1 is satisfied, provided that the value n is an odd number. The mark can be recorded by increasing only the shortest mark by one pulse.

Embodiments of the invention can provide a method in which a pulse structure of an erasing power level Pe-lower than the erasing power Pe is included during the irradiation of the erasing power level Pe.

Embodiments of the invention can provide a method in which when information is recorded on each of the information layers of the multi-layered optical recording medium, the information is recorded sequentially from the information layer disposed on the front side as viewed from the laser beam flux irradiation side.

T can be the same clock cycle for each recording layer.

According to a second aspect of the invention, there is provided a recording apparatus for a multi-layered optical recording medium including M phase change recording layers, with $M \geq 2$, the apparatus being arranged to:

record a mark in a Kth recording layer using a laser arranged to irradiate the Kth recording layer using a recording pulse train including a plurality of laser beam pulses, the recording pulse train for the Kth layer having a cycle of $t_{(K)}[T]$, where:

the 1st recording layer is the recording layer closest the laser beam, the Mth recording layer is the recording layer furthest from the laser beam and $1 \leq K \leq M$, T is the clock cycle;

wherein the following relationship is satisfied:

$t_{(1)} < t_{(M)}$, and the cycle of recording pulse train does not decrease from one recording layer to the next recording layer in the direction in which the laser beam irradiates.

In such an apparatus, the repetitive recording property of the recording layer disposed at the front side thereof and the recording sensitivity of the recording at the innermost side thereof can be made improved.

In some embodiments, the apparatus is arranged so that the following relationship is satisfied for recording pulse used for the 1st and the 2nd layer: $t_{(1)} < t_{(2)}$.

In some embodiments, the apparatus is arranged to: record a mark in 1st recording layer using a recording pulse train having a cycle of 1T; and record a mark in the 2nd recording layer using a recording pulse train having a cycle of 2T.

In some embodiments, the apparatus is arranged to: record a mark in 1st recording layer using a recording pulse train having a cycle of 1T; and record a mark in the other recording layers using a recording pulse train having a cycle of 2T.

In some embodiments, the apparatus is arranged such that when a mark having a length of nT is recorded in the recording layers of the M phase change recording layers except the Mth recording layer, the following relationship is satisfied:

$(n-1.5)T \leq Tr \leq (n-1)T$ wherein n is an integer of not less than 1, and Tr represents the interval between the leading edge of the leading pulse to the leading edge of the last pulse.

In some embodiments, the apparatus is arranged such that following relationship is satisfied:

$0.12T \leq Tmp \leq 0.3T$, where Tmp represents the width of a recording pulse.

In some embodiments, the apparatus is arranged such that marks are recorded on the recording layers other than the recording layer disposed at the innermost side as viewed from the laser beam irradiation side, and the marks are formed by a recording pulse train being set such that cooling power levels Pc1, Pc2, ..., PcN (where N is an integer of 1 or more) are modulated between a bias power level Pb and a recording power level Pp and are set between an erasing power level Pe and at least one bias power level Pb of the bias power level Pb anterior to a leading pulse and the bias power level Pb posterior to a last pulse so as to satisfy the following relation:

Pp>Pe>Pc1>Pc2 ... >PcN>Pb

In some embodiments, the apparatus is arranged such that the marks are formed by a recording pulse train being set such that the cooling power levels Pc1, Pc2, ..., PcN (where N is an integer of 1 or more) are modulated between the bias power level Pb and the recording power level Pp and are set between the erasing power level Pe and the bias power level Pb anterior to the leading pulse so as to satisfy the following relation:

Pp>Pe>Pc1>Pc2 ... >PcN>Pb

In some embodiments, the apparatus is arranged such that the marks are formed by a recording pulse train being set such that the cooling power levels Pc1, Pc2, ..., PcN (where N is an integer of 1 or more) are modulated between the bias power level Pb and the recording power level Pp and are set between the erasing power level Pe and the bias power level Pb posterior to the last pulse so as to satisfy the following relation:

Pp>Pe>Pc1>Pc2 ... >PcN>Pb

In some embodiments, the apparatus is arranged such that the marks are formed by a recording pulse train being set such that the cooling power levels Pc1, Pc2, ..., PcN (where N is an integer of 1 or more) are modulated between the bias power level Pb and the recording power level Pp and are set between the erasing power level Pe and the bias power level Pb being anterior to the leading pulse and posterior to the last pulse so as to satisfy the following relation:

Pp>Pe>Pc1>Pc2 ... >PcN>Pb

The value N in the cooling power levels Pc1, Pc2, ..., PcN can be any one of integers from 1 to 3.

In some embodiments, the apparatus is arranged such that when information is recorded on each of the two or more phase-change recording layers, the information is recorded by varying at least one of a ratio e (Pe/Pp) between the recording power level Pp and the erasing power level Pe and a ratio d1, dN (Pc1/Pp, ..., PcN/Pp) between the recording power level Pp and the cooling power levels Pc1, Pc2, ..., PcN for each of the two or more phase-change recording layers.

In some embodiments, the apparatus is arranged such that when the number of irradiation pulses of the recording power level Pp used at the time of recording a recording mark having a length of nT (where n is an integer of one or more, and T represents a clock cycle) is represented as m (where m is an integer of one or more), the relation n=2m is satisfied, provided that the value n is an even number, and the relation n=2m+1 is satisfied, provided that the value n is an odd number. The mark can be recorded by increasing only the shortest mark by one pulse.

In some embodiments, the apparatus is arranged such that a pulse structure of an erasing power level Pe-lower than the erasing power Pe is included during the irradiation of the erasing power level Pe.

In some embodiments, the apparatus is arranged such that when information is recorded on each of the information layers of the multi-layered optical recording medium, the information is recorded sequentially from the information layer disposed on the front side as viewed from the laser beam flux irradiation side.

T can be the same clock cycle for each recording layer.

BRIEF DESCRIPTION OF THE DRAWINGS

FIG. 7 is a graph showing an emission pattern of waveform (recording strategy) for repeatedly recording data containing marks and spaces which are used in DVD+RW, and the like.

(1) illustrates an example of a recording method of a conventional single-layer optical recording medium.

(2) illustrates an example of a recording method of the information layer formed on the front side of a conventional two-layered optical recording medium viewed from the beam irradiation side thereof.

(3) illustrates another example of a recording method of the information layer formed on the front side of a conventional two-layered optical recording medium viewed from the beam irradiation side thereof.

Figure 25:
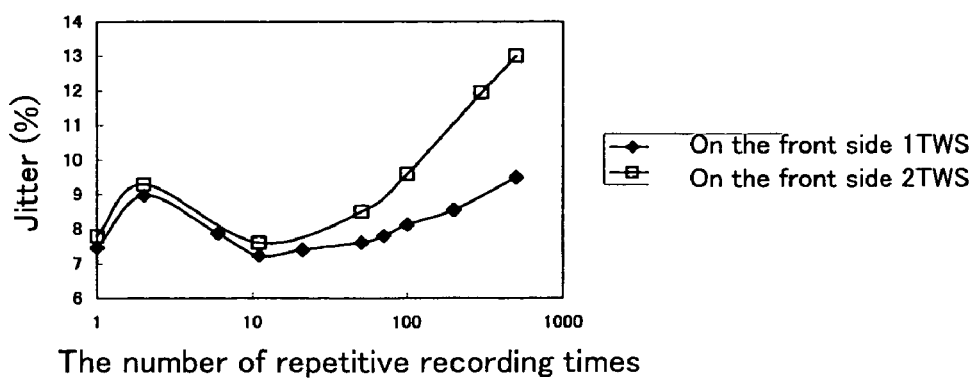

FIG. 25 is a graph showing jitters compared for a two-layered phase-change optical recording medium prepared in Example B-17.

Figure 26:
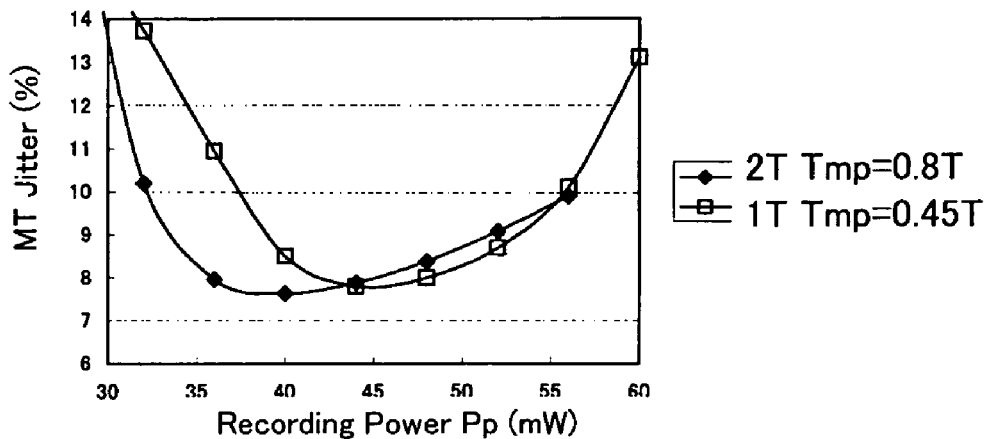

FIG. 26 is a graph showing jitters compared for a two-layered phase-change optical recording medium prepared in Example B-18.

Figure 27:
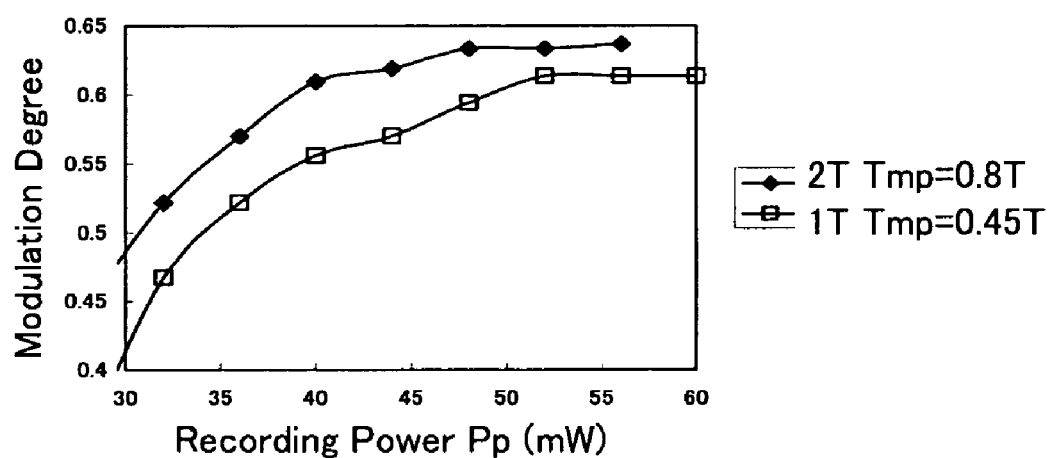

FIG. 27 is a graph showing modulation degrees compared for a two-layered phase-change optical recording medium prepared in Example B-18.

Figure 28:
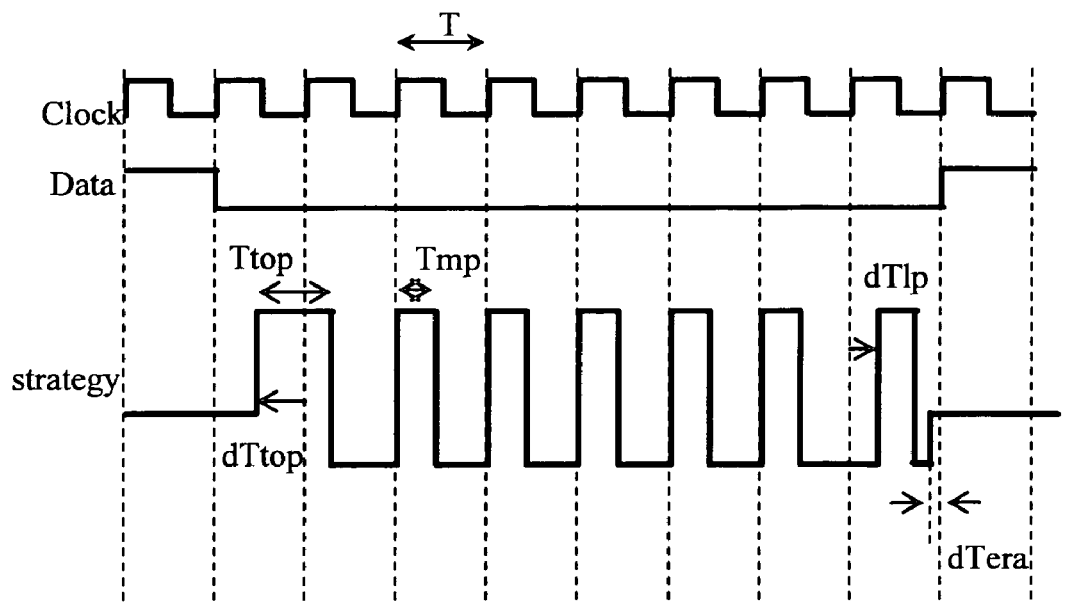

FIG. 28 is a view showing parameters of the recording pulse strategy used in the present invention.

Figure 29:
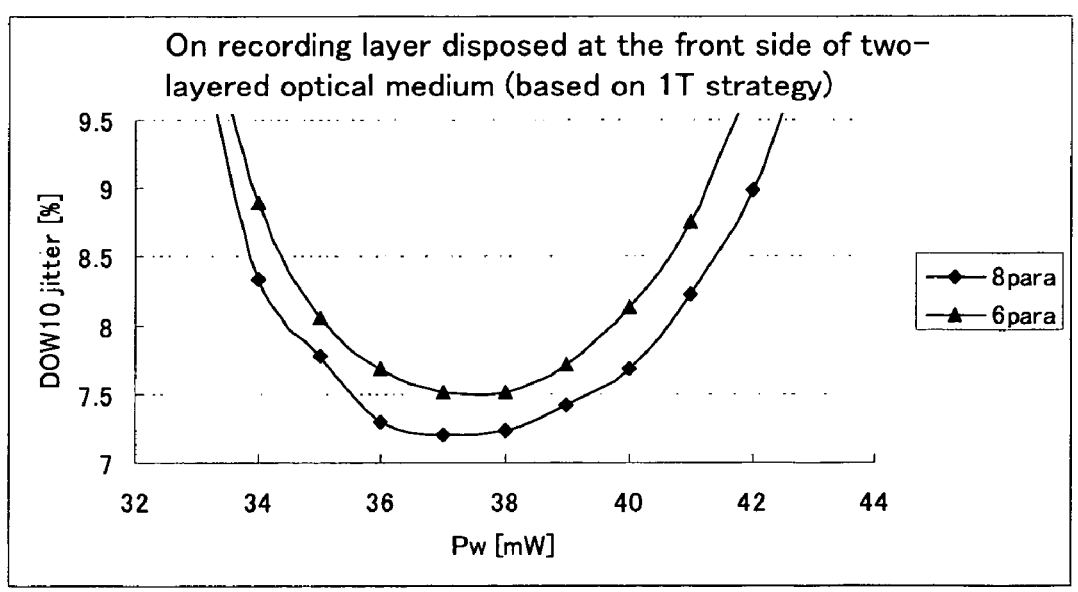

FIG. 29 is a view showing compared results of recording properties of repetitive recording up to 10 times with varying the number of parameters, on the recording layer disposed at the front side as viewed from the laser beam irradiation side.

Figures 30, 31:
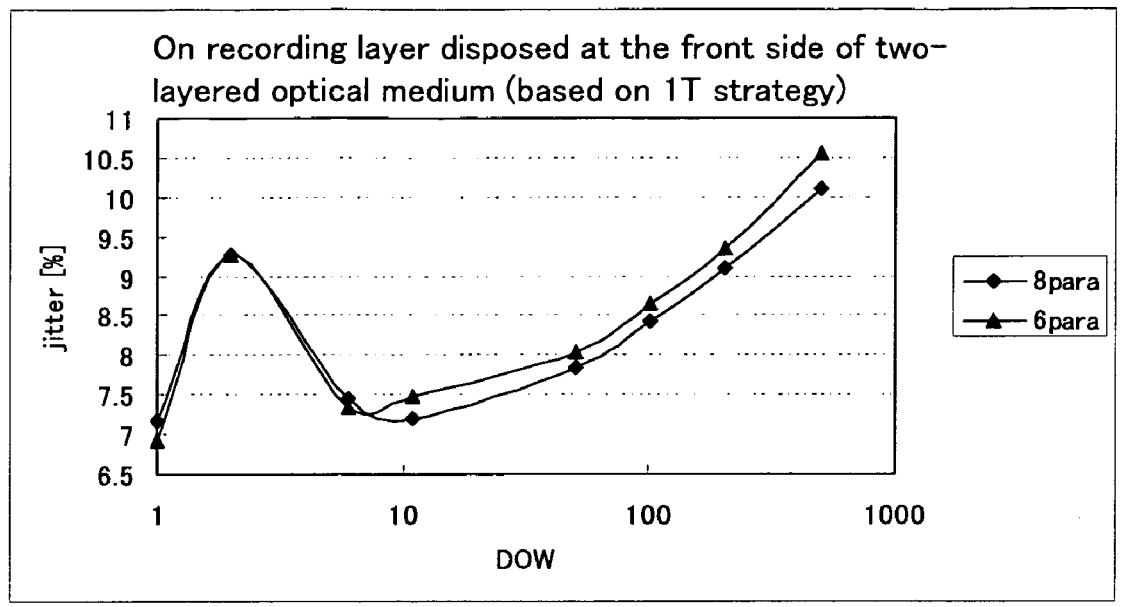

FIG. 30 is a view showing compared results of recording properties of repetitive recording up to 500 times with varying the number of parameters, on the recording layer disposed at the front side as viewed from the laser beam irradiation side.

FIG. 31 shows parameters of the recording strategy actually used in FIGS. 29 and 30.

Figure 32:
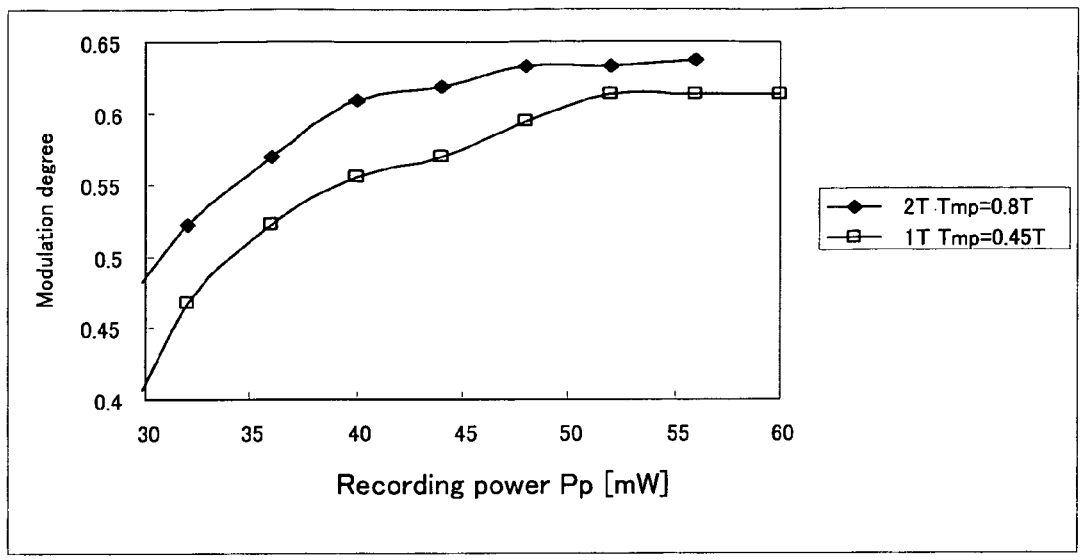

FIG. 32 is a graph shoring a relation between recording powers and modulation degrees.

Figure 33:
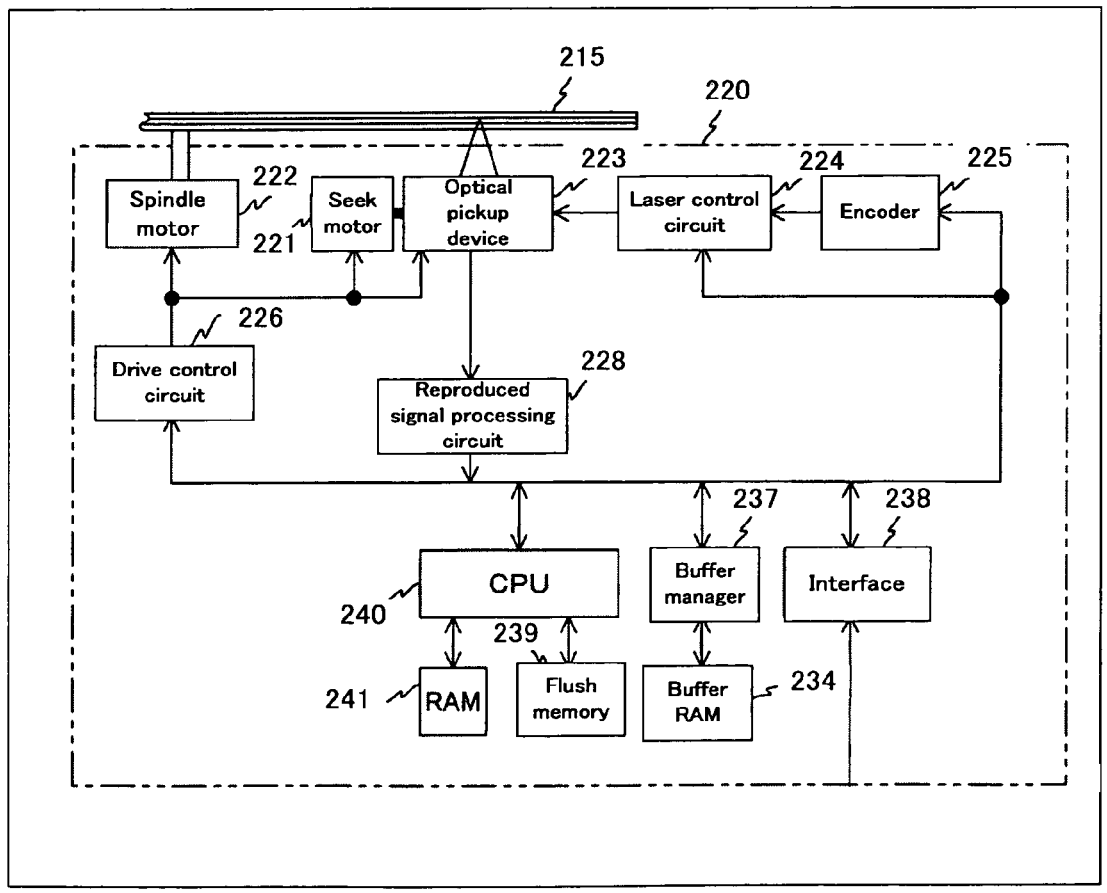

FIG. 33 is a view exemplarily showing an optical recording apparatus on which the single-sided multi-layered optical recording medium of the present invention is mounted.

Figure 34:
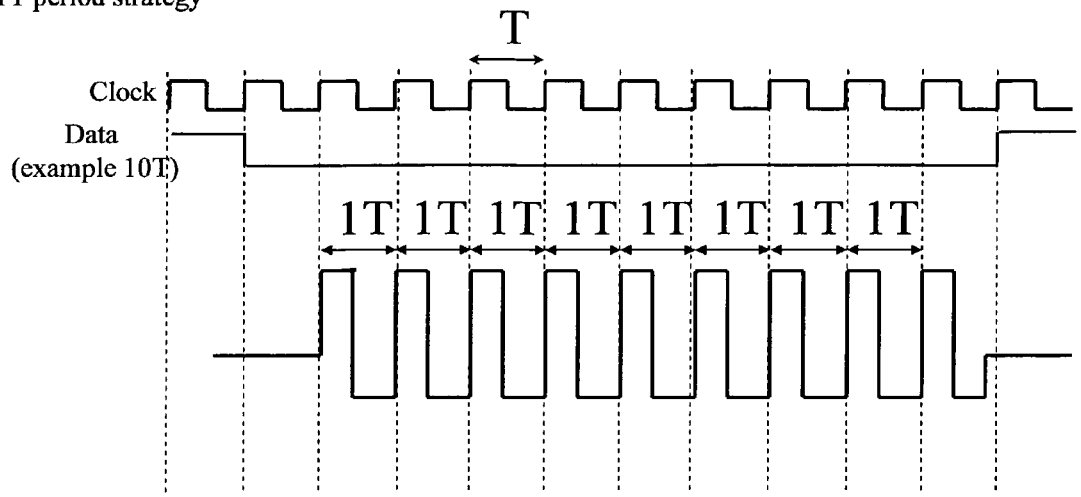

FIG. 34 is a view showing a waveform of a recording strategy of 1T.

Figure 35:
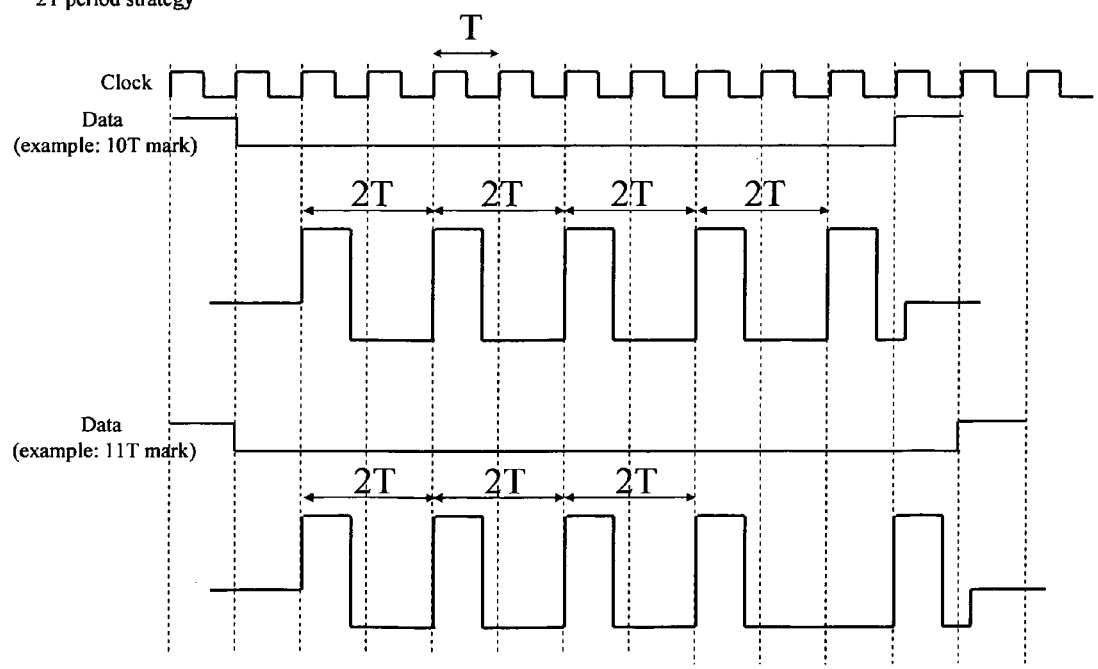

FIG. 35 is a view showing a waveform of a recording strategy of 2T.

Figure 36:
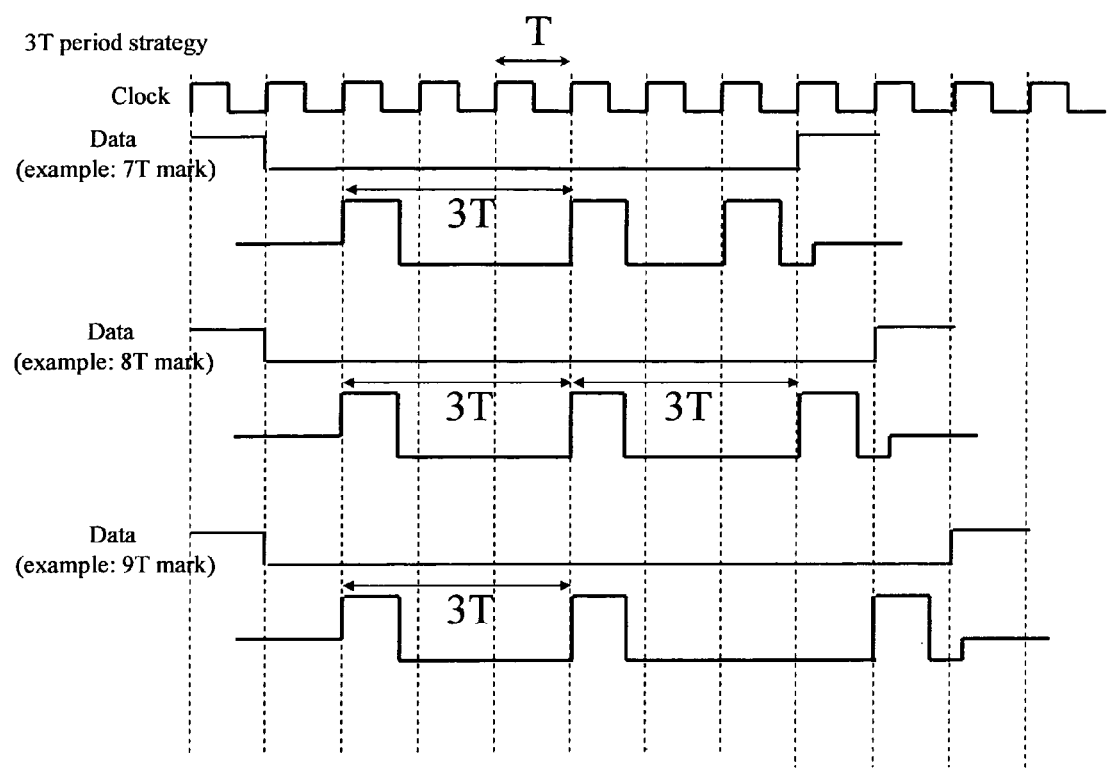

FIG. 36 is a view showing a waveform of a recording strategy of 3T.

DESCRIPTION OF THE PREFERRED EMBODIMENTS (Optical Recording Medium, Optical Recording Method, and Optical Recording Apparatus)

According to optical recording methods according to some embodiments of the present invention, when an optical recording medium is irradiated with a laser beam, and information is recorded by a mark length recording method in which the time length of a recording mark is represented by nT (T represents a basic clock cycle, and n is a natural number), the recording mark is formed by alternating irradiation with a heating pulse of power Pp and a cooling pulse of power Pb (Pp>Pb) "m" times, the condition m≦(n/2+1) is satisfied, and the irradiation time of the leading cooling pulse is 0.2T to 0.4T.

An optical recording medium according to embodiments of the present invention is used in the optical recording method, and contains a substrate, a first protective layer, a phase-change recording layer, a second protective layer, and a reflective layer each of which is formed on the substrate in a laminar structure, and the phase-change recording layer contains Sb, and one or more elements selected from the group consisting of Ge, Ga, In, Zn, Mn, Sn, Ag, Mg, Ca, Bi, Se, and Te.

In an optical recording apparatus according to an embodiment of the present invention, an optical recording medium is irradiated with a laser beam, and information is recorded by the mark length recording method in which the time length of a recording mark is represented by nT (T represents a basic clock cycle, and n is a natural number). The optical recording apparatus contains a rotation driving mechanism configured to rotate the optical recording medium, a laser light source configured to emit a laser beam for irradiating the optical recording medium, and a light source driving unit configured to emit the laser light source, an emission waveform controlling unit configured to control the light source driving unit by-setting a recording strategy relating to emission waveform of the light beam emitted by the laser light source, and the recording strategy is set such that recording marks are formed by irradiation with a heating pulse power Pp and a cooling pulse power Pb (Pp>Pb) alternately at the number of "m" times, m <(n/2+1), and the irradiation time of the first time cooling pulse is 0.2 T to 0.4 T.

Embodiments of present invention can be applied to optical recording methods and optical recording apparatuses including optical information reproducing apparatuses used for which information is recorded at high-speeds, for example, at a recording speed as fast as 6× DVD to 8× DVD or more to optical recording media can record, erase, or rewrite information by intensity modulations by means of light beam irradiation.

Figure 1:
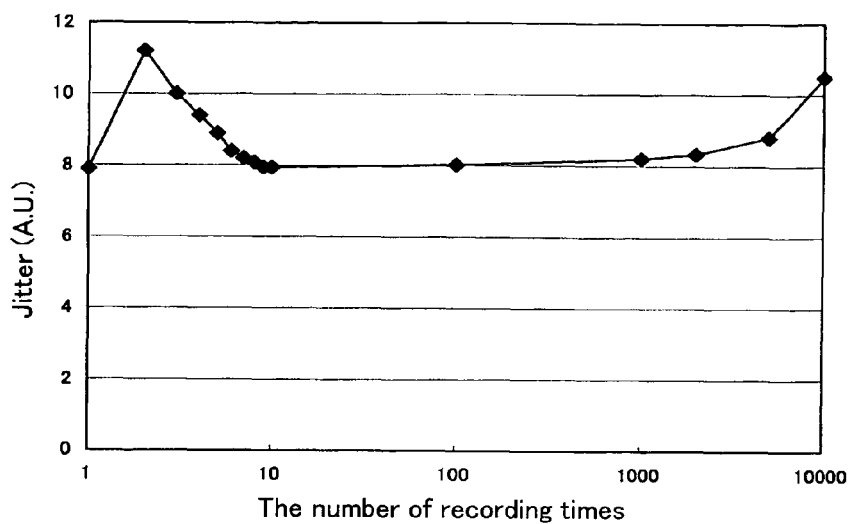
FIG. 1 is a graph exemplarily showing an example of variations in jitter during a random pattern being repeatedly recorded.
Figure 2:
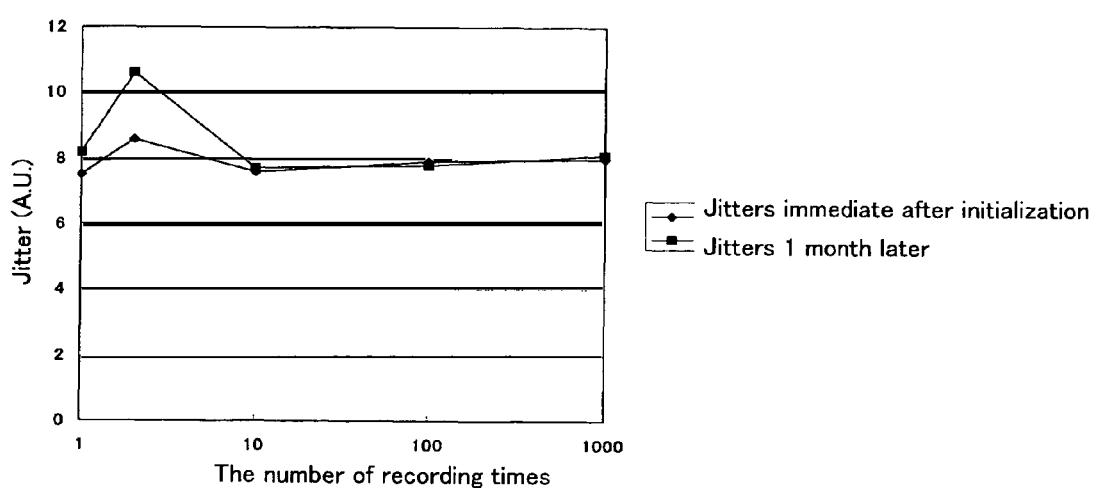
FIG. 2 is a graph showing jitters shown immediately after the initialization and jitters at the time when the random pattern is repeatedly recorded one month after the initialization.
Figure 3:
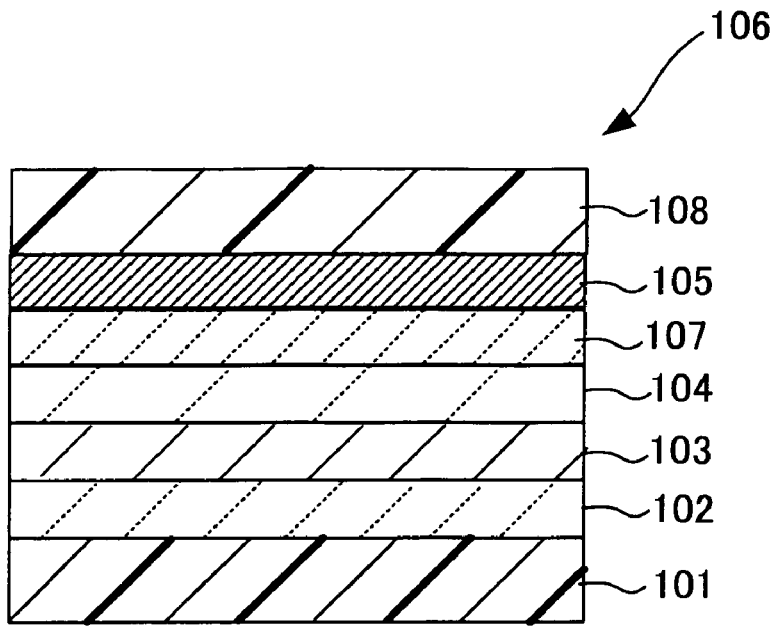
FIG. 3 is a schematic view exemplarily showing an example of a phase-change optical recording medium based on a DVD specification and a high-speed specification.

FIG. 3 shows an example of a phase-change optical recording medium based on a DVD specification and a high-speed specification suitable for the optical recording method of some embodiments of the present invention.

In FIG. 3, phase-change optical recording medium 106 contains first protective layer 102, phase-change recording layer 103, second protective layer 104, reflective layer 105, anti-sulfuration layer 107, and organic protective layer 108 on transparent substrate 101 having guide groove, and further contains other layers in accordance with the necessity.

Materials of the transparent substrate 101 are not particularly limited, may be suitably selected in accordance with the intended use, however, polycarbonate resins are preferably used in terms of heat resistance, impact resistance, low-water absorbing property, and the like.

The refractive index of the substrate 101 is preferably 1.5 to 1.65. When the refractive index is greater than 1.65, the refractive index of the entire disc lowers, and when the refractive index is smaller than 1.5, the modulation degree may run short as a result of the increase in refractive index. The thickness of the substrate 101 is preferably 0.59 mm to 0.62 mm. When the thickness of the substrate is thicker than 0.62 mm, there may be a problem with focus performance of the pickup lens, and when the thickness is thinner than 0.59 mm, there may be a problem that the number of rotations is unstable due to lacks of clamp of the recording and reproducing apparatus. Further, when the circumferential uniformity in thickness is more than the range stated above, there may be cases where the signal intensity varies on the circumference of the disc.

For the phase-change recording layer 103, a material which contains Sb, and one or more elements selected from the group consisting of Ge, Ga, In, Zn, Mn, Sn, Ag, Mg, Ca, Ag, Bi, Se, and Te is used.

When Sb is used as a base and combined with elements being divalent with Sb and having a eutectic point around 600° C. or less or elements forming solid solutions, it is possible to form a recording layer suitably for performing repetitive recording between amorphous conditions and crystalline conditions. Depending on the type and amount of elements to be combined with Sb, properties such as crystallization rate, recording property, storage stability, and ease of initialization are controlled. Elements to be combined with Sb are one or more and may be several types in accordance with the necessity. Other elements may be added to an alloy being divalent or more between the above elements and Sb.

When information is recorded repeatedly at high velocities, amorphous marks need to be crystallized at high velocities, therefore, particularly when recording is performed at a high-speed as fast as 6× DVD to 8× DVD or more, the usage of Sb is typically 50 atomic % to 90 atomic %, and preferably 60 atomic % to 85 atomic %. When the usage of Sb is less than 50 atomic %, the crystallization rate is so slow that amorphous marks remain unerased at the time of repetitive recording, which causes increases in jitters and the number of errors. When the usage is more than 90 atomic %, it is difficult to form amorphous marks.

When the thickness of the phase-change recording layer 103 is thinner than 8 nm, the modulation degree is small, and stability of reproduced light beams degrades. When it is thicker than 22 nm, the jitter greatly increases. Thus, the thickness of the phase-change recording layer 103 is typically 8 nm to 22 nm, and preferably, when it is set within the range of 11 nm to 16 nm, particularly the repetitive recording endurance is improved.

For the reflective layer 105, an Al-based alloy is conventionally used. Al has high-reflectance and high-thermal conductivity, and excels in temporal stability when formed in a disc. However, when the crystallization rate of the recording material is high, recording marks are easily thinned with a disc using an Al alloy for the reflective layer 105, it may be difficult to perform recording with a sufficient modulation degree. As a reason for this, when the crystallization rate is high, re-crystallized area in the fusion area grows larger at the time of recording, the amorphous area to be formed becomes reduced in size. To reduce the re-crystallized area in size, it is only necessary to make the second protective layer 104 thin so as to have a quenching structure, however, only simply making the second protective layer 104 thin simply does not make the temperature of the recording layer sufficiently increased, and the fusion area is reduced in size. Thus, even when the size of the re-crystallized area can be reduced, the size of the amorphous area to be formed is consequently reduced. In a refractive index (n+ik) at the wavelength of 650 nm to 670 nm, when a metal having values of both 'n' and 'k' smaller than those of Al is used for the reflective layer, the absorption index of the recording layer is increased, and the modulation degree can also be increased. Examples of metals having values of both 'n' and 'k' smaller than those of Al include Au, Ag, Cu, and alloys based on thereof as primary components. Here, being a primary component means that the component is included in the material at 90 atomic % or more, and preferably included at 95 atomic % or more.

Au, Ag, and Cu individually has a higher thermal conductivity than Al, and when these metals are used as the reflective layer, there are effects of enhancing the light absorption index of the recording layer and raising the temperature of the recording layer to increase the fusion area in size as well as enhancing the cooling rate to reduce the re-crystallized area in size at the time of cooling and to thereby form an amorphous area larger than that in the case where an Al alloy is used. The modulation degree of recording mark is determined by the optical modulation degree and the size of mark, and with increased optical modulation degree and recording mark in size, the modulation degree of recording mark is increased in size. Thus, even when information is recorded at high-linear velocities using a material having a high-crystallization rate as a recording layer, a large recording mark can be formed through the use of such a reflective layer because the reflective layer has a high-absorption index and a high-cooling rate, and it is also possible to record information with a high modulation degree because of the increased difference in reflectance between a crystalline phase and an amorphous phase.

Among Au, Ag, Cu, and alloys based on thereof, particularly, Ag and Ag alloys are relatively inexpensive in cost and are more hardly oxidized compared to Cu and Cu alloys which are also inexpensive in cost, and thus it is possible to produce a recording medium which excels in secular stability, and Ag and Ag alloys are preferably used for the reflective layer.

When the thickness of the reflective layer is 90 nm or more, there is almost no transmitted light beam, and light beams can be effectively utilized, therefore, the thickness is preferred to be 90 nm or more. With increased thickness of the reflective layer 105, the cooling rate of the recording medium is heighten, and it is advantageous when a recording layer having a high-crystallization rate is used, however, the cooling rate is saturated with a thickness of 200 nm or less, even when the reflective layer 105 is made thicker than 200 nm, there is no change in recording property and it only takes extra time in forming the layer. Therefore, it is preferred to form the reflective layer 105 with a thickness of 200 nm or less.

When Ag or an Ag alloy is used as the reflective layer 105, and a material including S is used for the second protective layer, anti-sulfuration layer 107 is needed. Examples of properties requested to the anti-sulfuration layer include not including S, and not transmitting to S. The inventors of the present invention formed various oxidized layers, nitrided layers, or the like as the anti-sulfuration layer 107 to evaluate the recording property and the storage stability thereof. In the result, the evaluation results showed that SiC, Si, or materials made of any one of SiC or Si as a primary component have excellent functions. Here, being a primary component means that SiC or Si is included in the material at 90 mole % or more, and preferably included at 95 mole % or more.

The thickness of the anti-sulfuration layer 107 is preferably 3 nm to 22 nm. When the thickness of the anti-sulfuration layer 107 is 3 nm or more, an anti-sulfuration function is exerted because the layer formed by sputtering is uniformly formed, however, when the thickness thereof is thinner than 3 nm, the probability of partially causing a defect drastically gets higher. When the thickness is more than 22 nm, the reflectance is reduced along with the increased thickness, and since the deposition rate of the anti-sulfuration layer is equivalent to the recording layer at the maximum, when the anti-sulfuration layer 107 is thicker than the recording layer, production efficiency degrades. For these reasons, it is preferred that the anti-sulfuration layer 107 be formed so as not to have a thickness thicker than that of the recording layer at the maximum. In the result, the preferred upper limit thickness of the anti-sulfuration layer 107 is 22 nm.

For the first protective layer 102 and the second protective layer 104, they respectively have a high refractive index and high heat resistance besides functions as protective layers such as heat resistance, therefore, a mixture of ZnS and $SiO_2$ with a molar ratio close to 8:2 in which the incident beam can be effectively utilized by controlling the thickness is used.

The thickness of the first protective layer 102 is preferably 40 nm to 220 nm, and more preferably 40 nm to 80 nm. The thickness value is primarily determined by the reflectance, and within the thickness range, a thickness in which both sufficient reflectance and sufficient recording sensitivity can be achieved is selected. When the thickness of the first protective layer 102 is thinner than 40 nm, the heat resistance is poor, and the damage given to the substrate 1 is increased, resulting in increased in jitter at the time of repetitive recording. When the thickness of the first protective layer 102 is thicker than 220 nm, the recording sensitivity degrades because of an excess of the high-reflectance.

The thickness of the second protective layer 104 is preferably 2 nm to 20 nm, and more preferably 6 nm to 14 nm. The thickness value is primarily determined by thermal conductivity. Since a reflective layer is further formed on the second protective layer 104, the heat absorbed in the recording layer diffuses to the reflective layer through the second protective layer 104 to be cooled. Thus, when the second protective layer 104 is formed in an excessively thin layer, the thermal diffusion speed is too fast to sufficiently increase the temperature of the recording layer, resulting in degraded recording sensitivity. When the second protective layer 104 is excessively thick, this makes it hard for amorphous marks to be formed due to insufficient cooling rate.

The above-mentioned layers are formed on the substrate 101 in order of the first protective layer 102, the phase-change recording layer 103, the second protective layer 104, the anti-sulfuration layer 107, and the reflective layer 105 by sputtering, and thereafter, the organic protective layer 108 is formed on the reflective layer 105 by spin-coating. The layers in this condition or the layers further subjected to a bonding step and then subjected to initialization step to be used as optical recording medium 6. The bonding is a step in which a plate having the same size as the substrate and typically made of the same material as the substrate is bonded to the substrate through the organic protective layer.

The initialization is a step in which the layer structure is irradiated with a laser beam formed in around 1× several dozen µm to a few hundred µm having around 1 W to 2 W, the phase-change recording layer 103 in an amorphous condition immediately after forming the layers is initialized.

Hereinafter, the optical recording method of embodiments of the present invention to the optical recording medium 6 based on a high-speed specification as mentioned above, particularly the recording strategy will be described.

Here, information is to be recorded using a recording mark length and an inter-mark length modulation system in which PWM (Pulse Width Modulation) is applied for the optical recording medium 6. According to the recording system, information can be recorded by controlling the length of recording mark and the length between recorded marks, using the basic clock cycle T as a unit. The recording system is characterized in capability of high-densification, because the recording system capable of making recording density higher than in the mark position modulation system which is one of the recording methods of optical recording media, and the recording system is a modulation system adopted in optical discs such as EFM employed in CD, DD (Double Density) CD, and EFM+ employed in DVD. In the recording mark length and the inter-mark length modulation system, it is important to appropriately control the length of recording marks and the length between recorded marks (referred to as "space length" hereinafter). In these modulation systems, both the recording mark length and the space length have a time length of nT (n is a natural number of 3 or more) with respect to the basic clock cycle T.

According to embodiments of the present invention, with respect to the recording strategy in which three values of peak power Pp, erasing power Pe, and bias power Pd are used, it is based on the assumption that a method for reducing the number of pulses is used such that the recording layer is sufficiently heated and cooled as a high-speed specification, namely, it is based on a method in which an amorphous mark having a length of nT is formed by irradiation with 'm' pulses (m is an integer and satisfies the condition m <(n/2+1)), the 'm' pulses are formed by repeatedly alternating a peak power Pp beam and a bias power Pb beam where m represents an integer; a crystallized space having a length of nT between amorphous marks is formed by irradiation with the erasing power Pe beam. Thus, 3T being the smallest mark formed based on the EFM+ modulation system is formed with 2 pulses or less, 4T and 5T are formed with 3 pulses or less, 6T and 7T are formed with 4 pulses or less, 8T and 9T are formed with 5 pulses or less, 10T and 11T are formed with 6 pulses or less, and 14T was formed with 8 pulses or less. The number of pulses is determined primarily by the recording linear velocity, and the faster the recording linear velocity is, the better the number of pulses is reduced.

Under high-speed specification conditions as described above, the leading cooling pulse time in a pulse train with heating pulses forming amorphous marks and cooling pulses is 0.2T to 0.4T. When marks are formed by irradiation with three or more trains of heating pulses and cooling pulses, the second cooling pulse time is 1.0T to 2.5T. The ratio of the erasing power Pe to the peak power Pp is $0.1 \leq Pe/Pp \leq 0.4$.

These contrivances make it possible to thickly form the amorphous mark edges, thus, shapes of the edges are hardly affected by the condition of peripheral crystals, and it is possible to prevent the increase in jitter at the early stage of repetitive recording as well as to prevent cross-erase without degrading repetitive recording endurance.

When mark edges are thin, a difference in crystal conditions is easily reflected as an increase in jitter, the increase in jitter at the early stage of repetitive recording further increases. This phenomenon occurs because crystallization makes progress from the boundary with crystals due to growth of crystals in the case of a recording layer using Sb as the main component.

Generally, the higher the temperature is, the faster the growth of crystals is. For this reason, when the boundary between a crystalline phase and an amorphous phase resides in the center part of a track where it is higher temperature, crystallization easily makes progress, and when there is a difference in crystal conditions, variations in shape of the mark edges easily occur in the process of irradiation with a pulse train. When the mark edges are thick and the boundary between a crystalline phase and an amorphous phase resides away from the center part of the track, variations in shape of the mark edges are hard to occur even when there is a difference in crystal conditions, because the temperature is low, and crystal growth rate is slow.

Further, since a recording and reproducing beam typically has a Gaussian distribution, in reproducing, the beam is more influenced by the shape changes of marks at the center part of the track than by a reflectance change due to shape changes of marks residing away from the center part of the track. For the reasons stated above, it can be said that when the shape of mark edges is originally thick, it is hard to be influenced by a difference in crystal conditions, and when the shape of mark edges is thin, it is easily influenced by a difference in crystal conditions. Thus, recording mark edges thickly is an effective method.

Figure 4:
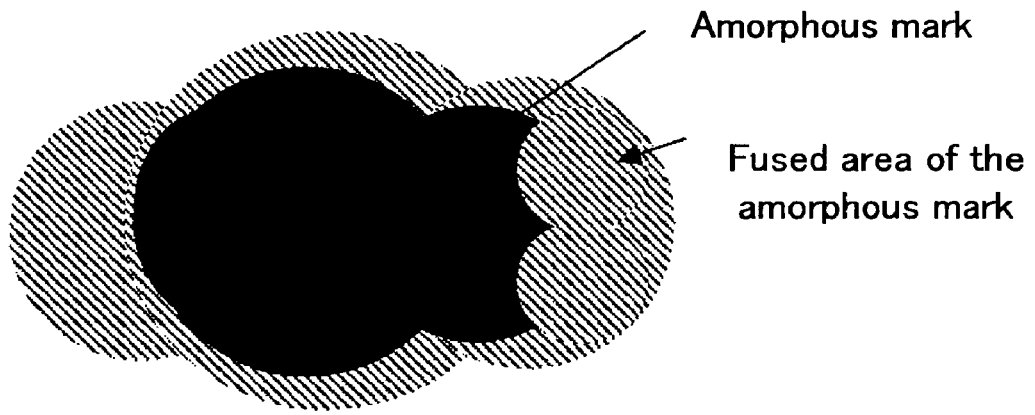
FIG. 4 is a view exemplarily showing appearance that amorphous portions formed by the first heating pulse disappeared due to re-crystallization, however, the temperature at the time the second heating pulse being irradiated was raised by preheating effect of the first heating pulse to widen fused area and to consequently increase peripheral portions of marks.

Since the crystallization rate of a phase-change recording layer used for high-speed recording is typically fast, shortening the irradiation time of cooling pulses, as seen in the setting of the leading cooling pulse of embodiments of the present invention, is hardly considered. This is because when the irradiation time of the cooling pulse is shortened, an amorphous mark formed by the heating pulse immediately anterior to the cooling pulse is re-crystallized, and a sufficiently large amorphous mark cannot be formed, resulting in an increased jitter. However, the inventors of the present invention found that mark edges can be formed in a large size by shortening the irradiation time of the leading cooling pulse daringly. As a result of considerations on observations of simulation and TEM pictures, it is found that the amorphous portion formed by the first heating pulse disappears due to re-crystallization, however, the temperature during irradiation with the second heating pulse was raised by preheating effect of the first heating pulse, and the raised temperature widens fused area, and consequently the mark edges are enlarged. FIG. 4 schematically shows the appearance.

Similarly, it is also possible to form mark edges in large size when the leading cooling pulse is not set, and the first heating pulse is lengthened in a way that the first heating pulse is likely to continue to the second heating pulse. However, in this case, because of consecutive irradiation of a peak power, the temperature is exceedingly raised, and deterioration of quality of layers is accelerated, resulting in degraded repetitive recording endurance. In addition, since the temperature of the adjacent track is raised, it causes cross-erase phenomenon in which amorphous marks that have been recorded in the adjacent track are partially erased.

The leading cooling pulse is to be between 0.2T to 0.4T. When the leading cooling pulse is set to have a cycle shorter than 0.2T, cooling effect is hardly obtained, and it exhibits behaviors similar to those in the case where the first heating pulse is lengthened, causing degradation of repetitive recording endurance and increases in cross-talk. When the leading cooling pulse is set to have a cycle longer than 0.4T, the amorphous portion formed by the first heating pulse remains, and thus the amorphous portion has thin edges, resulting in increased jitter at the early stage of repetitive recording.

The second cooling pulse in the case where a mark is formed by three or more pulse trains needs to be sufficiently lengthened, as conventionally considered. With this configuration, it is possible to prevent re-crystallization by the third heating pulse to form mark edges in a large size. The second cooling pulse is set to have a cycle between 1.0T to 2.5T. When the second cooling pulse is set to have a cycle shorter than 1.0T, the third heating pulse affects re-crystallization of the formed amorphous portions progresses in the process of irradiation with the second cooling pulse, resulting in increased jitter. When the second cooling pulse is longer than 2.5T, continued marks cannot be formed.

The recording strategy stated above is effectively exerted when the ratio of erasing power Pe to peak power Pp is less than 0.4 or less. As a result of studies by the inventors of the present invention, when information is recorded at a speed as fast as 6× DVD or more, and the ratio of the erasing power Pe to the peak power Pp is increased more than 0.4, the jitter is increased even at the first recording. The reason is not clarified, however, it is considered that since the recording time is short in the case of high-speed recording, the recording layer cannot be sufficiently heated unless the value Pp is increased, however, when the value Pe is also increased, it leads to a deficiency in cooling, and contrarily, the jitter is increased. However, when the value Pe is low, the temperature rise induced by the first peak power is likely to be insufficient. In such a case, the jitter in the early stage of repetitive recording tends to increase, however, the problem can be resolved by using the first heating pulse as a preheating pulse, as can be seen in embodiments present invention. However, when the value Pe/Pp is smaller than 0.1, erasing power is likely to be insufficient, and jitters increase across the repetitive recording at large, even though the first recording shows an excellent jitter property.

Next, a configuration example of an optical recording apparatus for realizing the optical recording method based on the recording strategy stated above will be described referring to FIG. 5.

The optical recording apparatus contains rotation controlling mechanism 122 having spindle motor 121 which rotatably drives optical recording medium 106, and an optical head 124 in which an object lens through which the optical recording medium 106 is irradiated with a concentrated laser beam, and a laser light source such as laser diode LD 123 are seek-and-movably arranged in the disc radial direction. Actuator controlling mechanism 25 is connected to an object lens drive unit and an output system of the optical head 124. To the actuator controlling mechanism 25, wobble detecting unit 27 including programmable BPF 26 is connected. To the wobble detecting unit 27, address decoding circuit 28 which demodulates addresses from detected wobble signals is connected. To the address decoding circuit 28, recording clock generating unit 30 including PLL synthesizer circuit 29 is connected. To the PLL synthesizer circuit 29, drive controller 31 is connected. To the drive controller 31 which is connected to system controller 32, the rotation controlling mechanism 122, the actuator controlling mechanism 25, and the wobble detecting unit 27, and the address decoding circuit 28 are also connected.

System controller 32 is based on a so-called microcomputer configuration which contains a CPU or the like. To the system controller 32, EFM encoder 34, mark length counter 35, pulse number controlling unit 36 are connected. To the EFM encoder 34, the mark length counter 35, the pulse number controlling unit 36, and the system controller 32, record-ing pulse controlling unit 37 to be an emission waveform controlling unit is connected. The recording pulse train controlling unit 37 contains multi-pulse generation unit 38 which generates multi-pulses (on-pulse for peak power Pp, and off-pulse for bias power Pb) defined by a recording strategy, edge selector 39, and pulse edge generation unit 40.

To the output side of the recording pulse train controlling unit 37, LD driver unit 42 is connected. The LD driver unit 42 serves as a light source driving unit configured to drive the laser diode LD 123 in the optical head 124 by switching each individual driving current sources 41 for recording power Pw (peak power Pp), erasing power Pe, and bias power Pb.

Figure 7:
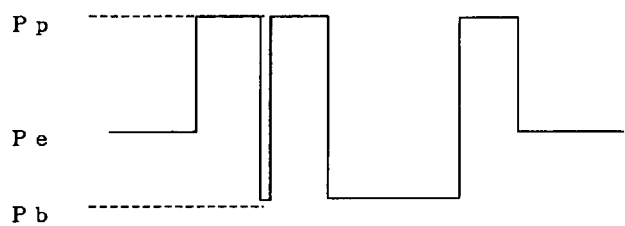

In this configuration, to record information in the optical recording medium 106, the number of rotations of the spindle motor 121 is controlled by the rotation controlling mechanism 122 under the control of the drive controller 31 so as to have a recording speed corresponding to the intended recording speed and then address-demodulated by wobble signals separately detected by the programmable BPF 26 from the push-pull signals obtained by the optical head 124, and a recording channel clock is generated by the PLL synthesizer circuit 29. Next, to generate a recording pulse train through the use of a laser diode LD 123, the recording channel clock and EFM+data which is information to be recorded is input in the recording pulse train controlling unit 37, and the multi-pulse generation unit 38 in the recording pulse train controlling unit 37 generates multi-pulses in accordance with the recording strategy as shown in FIG. 7, and a LD emission waveform can be obtained by switching drive current sources 41which are set so as to be each individual irradiation powers corresponding to the peak power Pp, the easing power Pe, and the bias power Pb in the LD driver unit 42.

Figure 5:
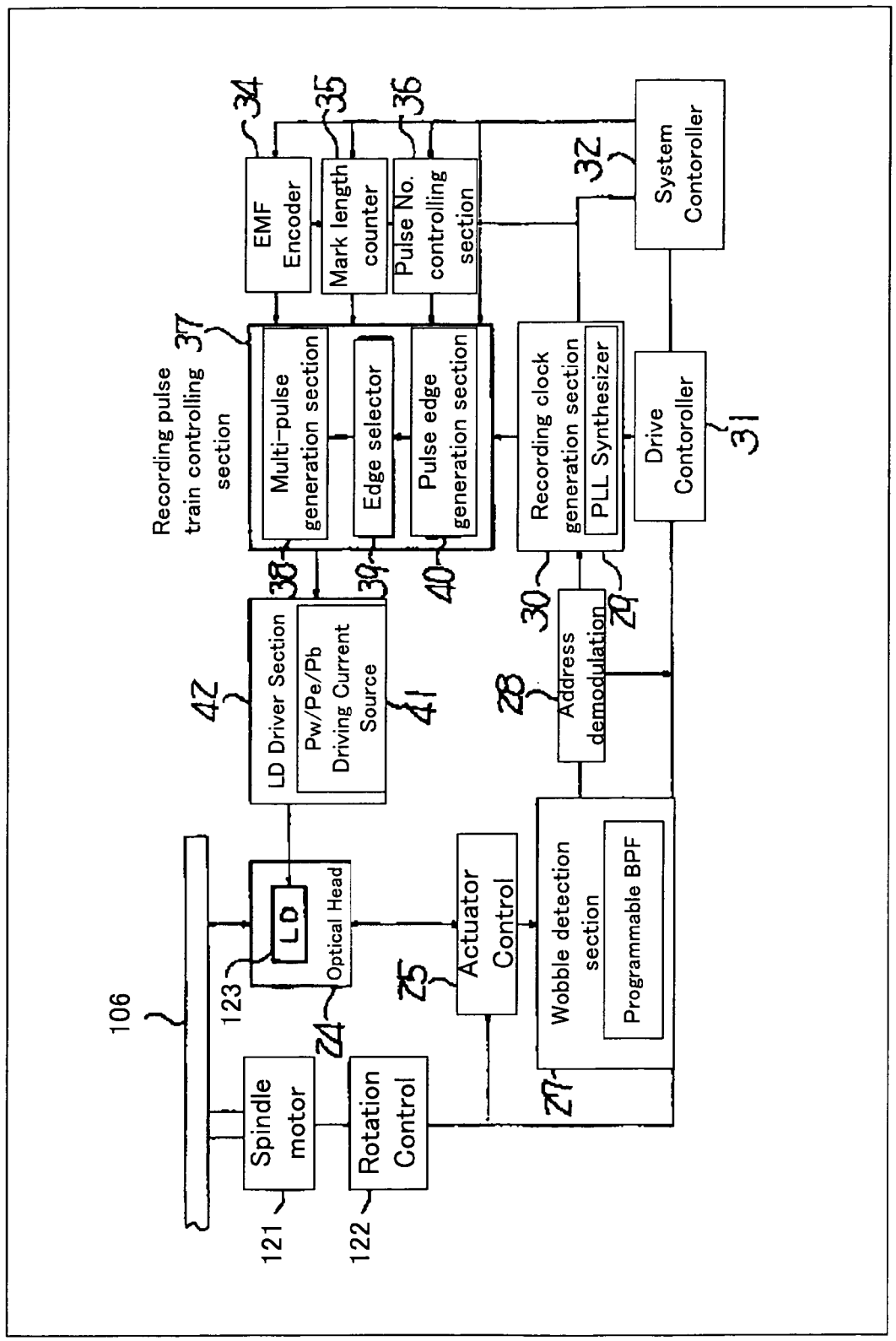
FIG. 5 is a block diagram exemplarily showing an example of an optical recording apparatus used for realizing an optical recording method of an embodiment of the present invention.

In the recording pulse train controlling unit 37 as shown in FIG. 5, mark length counter 35 for counting mark length of EFM+signals obtained from EFM encoder 34 is arranged and configured to generate multi-pulses through the number of pulses controlling unit 36 such that every time the mark counted value is increased by 2T, a train of pulses (recording power Pw=on-pulse by peak power Pp and off-pulse by bias power Pb) is generated.

As another configuration of the multi-pulse generating unit 38, a recording frequency dividing clock in which recording channel clock is divided into two frequencies is generated, an edge pulse is generated using a multistage delay circuit from the recording frequency dividing clock, and the anterior and posterior edges are selected by an edge selector to thereby generate a train of pulses (recording power Pw=on-pulse by peak power Pp and off-pulse by bias power Pb) every time the recording channel clock is increased by 2T. In this configuration, the substantive operating frequency of the multi-pulse generating unit is ½, and further higher speed recording operations are possible.

According to embodiments of the present invention, it is possible to provide an optical recording method and an optical recording apparatus that enables reducing increases in jitter in the early stage of repetitive recording regardless of the early stage crystalline condition, without causing deterioration of repetitive recording endurance and increases in crosstalk, because mark edges can be thickly formed at a high-speed recording as fast as 6× DVD to 8× DVD.

(Recording Method and Recording Apparatus for Multi-Layered Optical Recording Medium)

In the recording method for the multi-layered optical recording medium of some embodiments of the present invention, when the cycle of recording pulse train at the time when information is recorded on the Kth recording layer (K is an integer of 2 or more) viewed from the laser beam irradiation side under a clock cycle T is represented as $t_{(k)}[T]$, the condition $1 \leq t_{(1)} \leq t_{(2)} \leq \ldots \leq t_{(k)} \leq t_{(K+1)}$ is satisfied. However, the condition is excluded when all the signs are represented by equals.

In other embodiments, in the recording method for a multi-layered optical recording medium including M phase change recording layers, (M≧2), a mark in a Kth one of the recording layers by using a laser to irradiate the Kth recording layer using a recording pulse train including a plurality of laser beam pulses, the recording pulse train for the Kth recording layer having a cycle of $t_{(K)}[T]$. The 1st recording layer is the recording layer closest the laser beam, and the Mth recording layer is the recording layer furthest from the laser beam, T is a clock cycle. In such embodiments, the following relationship is satisfied:

$t_{(1)} < t_{(M)}$, and the cycle of recording pulse train does not decrease from one recording layer to the next recording layer in the direction in which the laser beam irradiates.

In many cases, T1 is equal to 1. When T1 is equal to 1, and information is recorded to the second recording layer or later recording layers, the effect is exerted by giving the cycle 1.5 or more for recording. Typically, recording is also possible with a recording strategy of 3T cycle. Namely, when the value K is set at 2 or more, the range of $t_{(k)}$ is preferably 1.5 to 3, $1.5 \leq t_{(k)} \leq 3$. However, in practice, it is preferable to record information with 2T cycle in order to prevent increased number of parameters of the recording strategy. Thus, when recording is performed on a recording layer disposed at the most front side as viewed from the laser beam irradiation side, a recording strategy with 1T cycle is used, and when recording is performed to the area of the recording layer other than the recording layer disposed at the most front side, a recording strategy with 2T cycle is preferably used.

When recording is performed on the recording layer disposed at the most front side of a recording, and the recording pulse train is set to have a 1T cycle, overwrite property is improved. On the condition that the recording pulse train is set to have a 2T cycle, recording is possible, however, when the number of repetitive recording times is increased, the jitter property is poorer than that in the case of 1T cycle, because it is primarily influenced by misalignment of the shortest mark length (see FIG. 25). It is noted that the case example shows that the test was performed using the two-layered optical recording medium used in Example B-17.

When recording is performed to the area of the recording layer other than the recording layer disposed at the most front side and a 2T cycle is used for the recording pulse train, it is possible to improve recording sensitivity because the pulse width of the recording pulse train can be taken wider, and the cooling time can be taken longer time. On the condition that a 1T cycle is used, the recording sensitivity degrades by approx. 15%, although recording is possible (see FIGS. 26 and 27).

According to the optical recording method of embodiments of the present invention, it is possible to improve recording property of the recording layers other than the innermost recording layer viewed from the laser beam irradiation side of a multi-layered optical recording medium having two or more phase-change recording layers.

Figure 24:
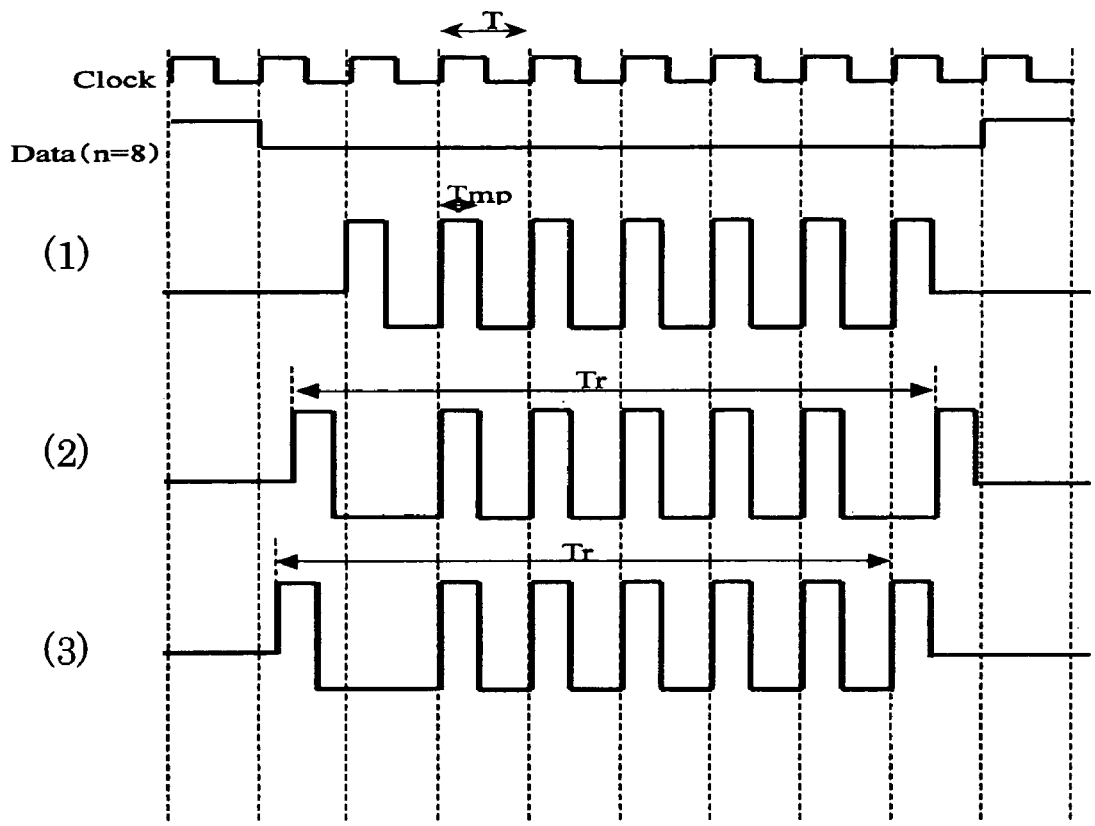
FIG. 24 includes (1), (2), and (3)

As shown in FIG. 24, in a conventional single-layer rewritable optical recording medium such as DVD+RW, for example, when using recording strategy of 1T cycle, it has been a primary recording method in which it starts recording data from the time position delayed by 1T with reference to the data (see (1) in FIG. 24). However, for a method for recording on recording layers other than the innermost recording layer viewed from the laser beam irradiation side of a multi-layered optical recording medium having two or more phase-change recording layers, as shown in (2) and (3) in FIG. 24, when forming a mark having a mark length of nT, it is preferable to use a recording method that the rise time width Tr between the leading pulse and the last pulse is widen.

This is because the information layers other than the innermost recording layer viewed from the laser beam irradiation side of a multi-layered optical recording medium needs to have a high-transmittance, and a thick metal layer cannot be formed, therefore, it is necessary to supplement heat dissipation effect by using transparent dielectrics. When the metal layer is made thick, sufficient heat dissipation effect can be obtained, and recording marks are easily formed, however, when transparent dielectrics are used, the thermal conductivity is lower than that of a metal layer, and therefore, sufficient heat dissipation effect cannot be exerted, and re-crystallization of amorphous marks is easily liable to occur. Thus, the above-mentioned recording method aims at obtaining a desired mark length by setting the rise time width Tr wide.

In the recording method, as shown in (2) in FIG. 24, the rise of the leading pulse may be early in terms of time, and the rise of the last pulse may be delayed in terms of time, and as shown in (3) in FIG. 24, making only the leading pulse raised early is also allowed. The range of values Tr is preferred to be set as $(n-1.5)T \leq Tr \leq (n-1)T$. For example, when recording a 8T mark, the value Tr which satisfies the condition of $6.5T \leq Tr \leq 7T$ is used. Further, in order to increase the area to form amorphous marks, cooling time after heating needs to be with a relatively long moment. Thus, it is preferred that the recording pulse width Tmp be made narrowed as much as possible. When a clock cycle is represented as T, it is preferable to have a range of $0.12T \leq Tmp \leq 0.3T$ regardless of the recording linear velocity. When the recording pulse width Tmp is set shorter than 0.12T, it needs high-recording power, and particularly when the recording linear velocity is fast such as at 9.2 m/s, the clock cycle T is 15.9 nsec, therefore, the recording pulse width Tmp is 0.12T which is equal to 1.9 nsec, and it is difficult to record information at a desired recording power, because it is too late for response time (rise time and fall time) of the laser emitted from laser diode (LD) in the recording apparatus. When the recording pulse width Tmp is made longer than 0.3T, re-crystallization is induced by residual heat of the next pulse due to lack of cooling time, causing a problem that a desired modulation degree is not ensured.

Generally, it is preferred to use the parameters of the recording pulse strategy shown in FIG. 28 with keeping the above noted Tr range, however, the range of Tr is not limited to the above stated. For example, DVD employs EFM+data modulation mode, and the number of appearance of 3T marks and 4T marks is larger than that of other long marks. Thus, 3T marks and 4T marks may affect have much more affect on the recording property or jitter property. As far as recording of 3T marks and 4T marks goes, parameters like (dTtop3), (dTtop4), (dTlp3), (dTlp4), (dTera3), and (dTera4) can be individually set. FIG. 29 and FIG. 30 respectively show compared results of recording property (jitter) when the number of parameters was changed. It is found that when the last pulse of 3T or 4T was individually set, the recording property was improved. The recording was performed using the recording strategy represented by the parameters shown in FIG. 31. The mark "-" means that the recording is delayed behind the reference clock or the rise time.

According to the optical recording method of embodiments of the present invention, recording property of multi-layered optical recording media is improved. Further, as a recording method to be applied to recording layers other than the innermost recording layer as viewed from the laser beam irradiation side, when forming recording marks by irradiating a multi-layered optical recording medium having two or more phase-change recording layers on the substrate with a laser beam, information is recorded by using the emission waveform of the laser beam as a recording pulse train containing a plurality of pulses and modulating the recording pulse train, recording marks are modulated between a bias power level Pb and a recording power level Pp, and cooling power levels $Pc1$, $Pc2, \ldots, PcN$ (N is an integer of one or more) between the erasing power level Pb and at least one bias power level anterior to the leading pulse and posterior to the last pulse is set so as to form the recording marks by means of a pulse train satisfying the relation represented by the following condition:

$Pp>Pe>Pc1>Pc2 \ldots >PcN>Pb$

A recording apparatus for a multi-layered optical recording medium of embodiments of the present invention is set such that the recording method of a multi-layered optical recording medium of embodiments of the present invention can be performed, an optical device leads a laser beam emitted from the laser light source to a condenser lens, and the condenser lens condenses and irradiates the laser beam onto the multi-layered optical recording medium to thereby record information on the multi-layered optical recording medium. The recording apparatus leads a part of laser beam emitted from the laser light source to a laser beam detector and controls the amount of light of the laser light source based on the detected amount of laser beam detected by the laser beam detector. The laser beam detector converts the detected amount of laser beam into a voltage or a current to output it as a detected signal.

The recording apparatus further contains various controlling units in accordance with the necessity. The controlling units are not particularly limited as long as the movements of the above-noted individual units can be controlled, may be suitably selected in accordance with the intended use, and examples thereof include instruments such as sequencers, and computers.

A recording method for a multi-layered recording medium of some embodiments of the present invention contains any one of the following aspects:

A first aspect of some embodiments of the present invention is an optical recording method in which recording marks are modulated between a bias power level Pb and a recording power level Pp, and cooling power levels $Pc1, Pc2, \ldots, PcN$ (where N is an integer of 1 or more) between an erasing power level Pe and a bias power level Pb anterior to the leading pulse is set so as to form the recording marks by means of a pulse train satisfying the relation represented by the following condition:

$Pp>Pe>Pc1>Pc2 \ldots >PcN>Pb$

A second aspect of some embodiments of the present invention is an optical recording method in which recording marks are modulated between a bias power level Pb and a recording power level Pp, and cooling power levels $Pc1, Pc2, \ldots, PcN$ (where N is an integer of 1 or more) between the erasing power level Pe and a bias power level Pb posterior to the last pulse is set so as to form the recording marks by means of a pulse train satisfying the relation represented by the following condition:

$Pp>Pe>Pc1>Pc2 \ldots >PcN>Pb$

A third aspect of some embodiments of the present invention is an optical recording method in which recording marks are modulated between a bias power level Pb and a recording power level Pp, and cooling power levels $Pc1, Pc2, \ldots, PcN$ (where N is an integer of 1 or more) between the erasing power level Pe and a bias power level Pb anterior to the leading pulse and posterior to the last pulse is set so as to form the recording marks by means of a pulse train satisfying the relation represented by the following condition:

$Pp>Pe>Pc1>Pc2 \ldots >PcN>Pb$

In the first aspect to the third aspect, it is preferred that the value N in the cooling power levels $Pc1, Pc2, \ldots, PcN$ be any one of integers 1 to 3.

Figure 15:
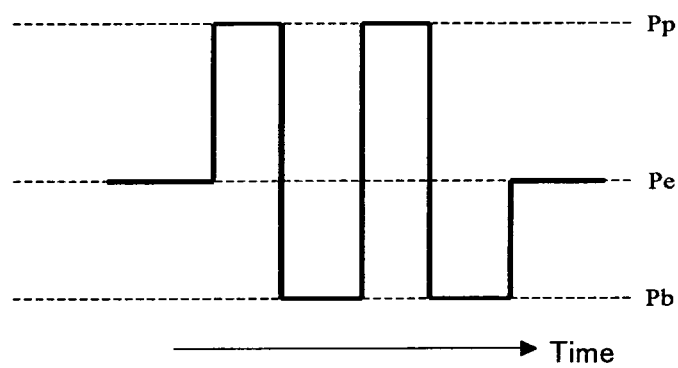
FIG. 15 is a view exemplarily showing an example of a laser emission pattern in a conventional recording method.
Figure 16:
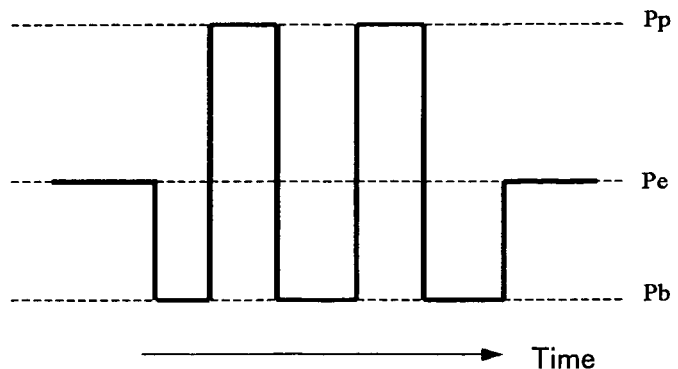
FIG. 16 is a view exemplarily showing another example of a laser emission pattern in a conventional recording method.

Here, examples of a specific laser waveform emission pattern include those used for DVD+RW as shown in FIGS. 15 and 16. Amorphous marks are formed by alternately repeating irradiation with pulses of a peak power (Pp) beam and a bias power (Pb) beam. On the other hand, spaces formed in a crystalline condition are formed by consecutive irradiation with an erasing power (Pe) beam on an intermediate level between the peak power Pp and the bias power (Pb) beam.

When a recording layer is irradiated with a recording pulse train containing a peak power (Pp) beam and a bias power (Pb) beam, the recording layer is repeatedly fused and quenched to form amorphous marks thereon. When the recording layer is irradiated with an erasing power (Pe) beam, the recording layer is fused and then slowly cooled or annealed in a solid phase condition to be crystallized to thereby form a space.

Typically, a recording pulse train containing a peak power (Pp) beam and a bias power (Pb) beam is divided into the leading pulse, intermediate pulses and the last pulse. The shortest mark 3T is recorded by using only the leading pulse and the last pulse, and when a mark of 4T or more is formed, intermediate pulses are also used. The intermediate pulses are called as "multi-pulse" and set with each 1T cycle, and a method of which every time the mark length increases in length by 1T, the number of pulse increases by one. The recording method is called as "1T cycle recording strategy", and the number of recording pulses at the time of forming a mark having a length of nT is (n−1). However, T represents a clock cycle. Incidentally, when recording information at a recording speed faster than 4× DVD+RW, the clock cycle is shorten, and thus a recording method using 2T cycle (2T cycle recording strategy) is often used.

Figure 11:
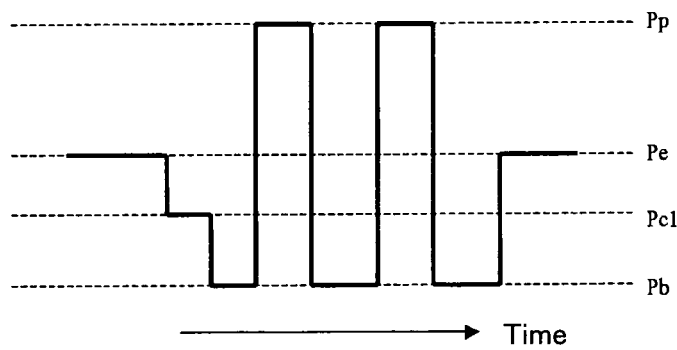
FIG. 11 is a view exemplarily showing an example of a laser emission pattern when N=1 in the recording method relating to a first aspect of some embodiments of the present invention in which power levels of Pc1 to PcN are set.

In the recording method for a multi-layered optical recording medium according to the first aspect of some embodiments of the present invention, when the value N is 1, as shown in FIG. 11, recording marks are modulated between a bias power level Pb and a recording power level Pp, and a cooling power level $Pc1$ between an erasing power level Pb and a bias power level Pb anterior to the leading pulse satisfies the relation of $Pp>Pe>Pc1>Pb$.

Figure 12:
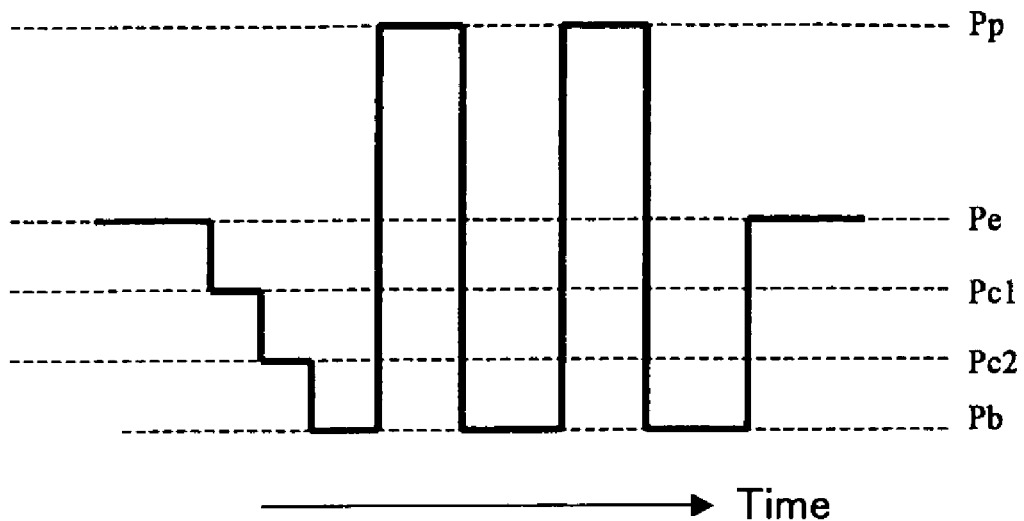
FIG. 12 is a view exemplarily showing an example of a laser emission pattern when N=2 in the recording method relating to the first aspect of some embodiments of the present invention in which power levels of Pc1 to PcN are set.

When the value N is 2, as shown in FIG. 12, recording marks are modulated between a bias power level Pb and a recording power level Pp, and cooling power levels $Pc1$ and $Pc2$ between an erasing power level Pb and a bias power level Pb anterior to the leading pulse satisfies the relation of $Pp>Pe>Pc1>Pc2>Pb$.

Figure 13:
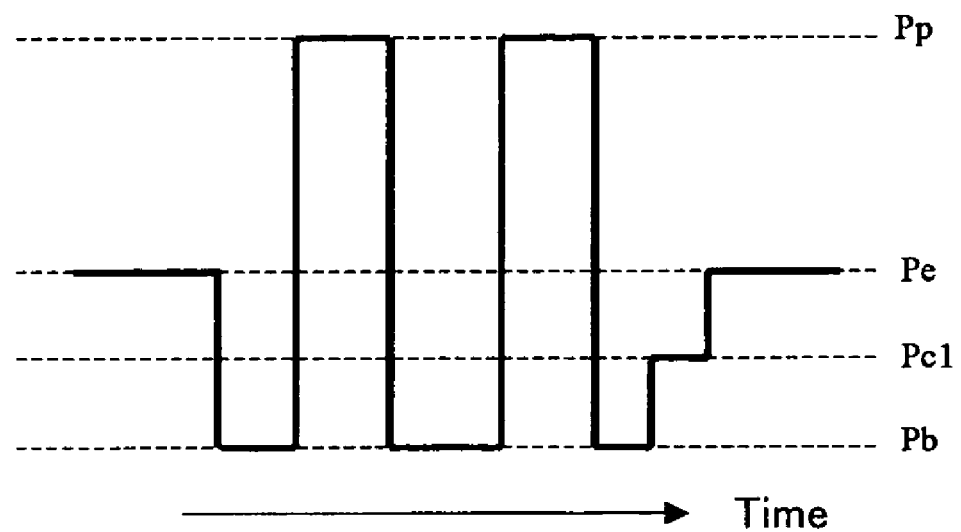
FIG. 13 is a view exemplarily showing an example of a laser emission pattern when N=1 in the recording method relating to a second aspect of some embodiments of the present invention in which power levels of Pc1 to PcN are set.

In the recording method for a multi-layered optical recording medium according to the second aspect of the present invention, when the value N is 1, as shown in FIG. 13, it is clarified that recording mark are modulated between a bias power level Pb and a recording power level Pp, and a cooling power level $Pc1$ between an erasing power level Pe and a bias power level Pb posterior to the last pulse satisfies the relation of $Pp>Pe>Pc1>Pb$.

Figure 14:
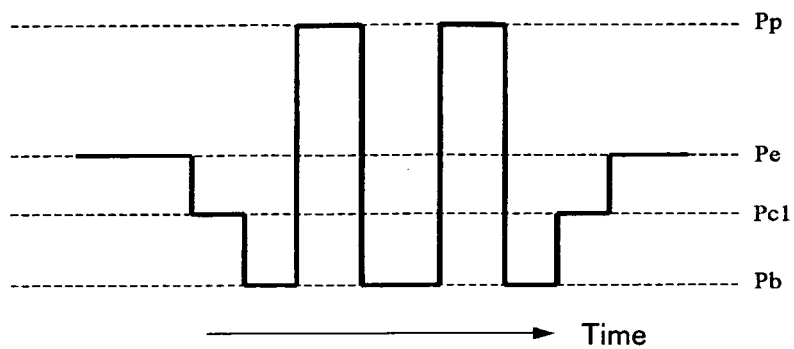
FIG. 14 is a view exemplarily showing an example of a laser emission pattern when N=1 in the recording method relating to a third aspect of some embodiments of the present invention in which power levels of Pc1 to PcN are set.

In the recording method for a multi-layered optical recording medium according to the third aspect of some embodiments of the present invention, when the value N is 1, as shown in FIG. 14, it is clarified that recording mark are modulated between a bias power level Pb and a recording power level Pp, and a cooling power level Pc1 between an erasing power level Pe and a bias power level Pb anterior to the leading pulse and posterior to the last pulse satisfies the relation of Pp>Pe>Pc1>Pb.

Since the recording method for a multi-layered optical recording medium of embodiments of the present invention can utilize at least any one of residual heat remaining anterior to the leading pulse and posterior to the last pulse by satisfying any one of the relations of the first aspect to the third aspect, it is possible to prevent thermal damage the first recording layer would further suffer, appropriately perform recording and erasing, improve recording property, and applied to various optical recording media, however, the recording method is particularly suitably used for multi-layered optical recording media of embodiments of the present invention which will be described below.

Figure 19:
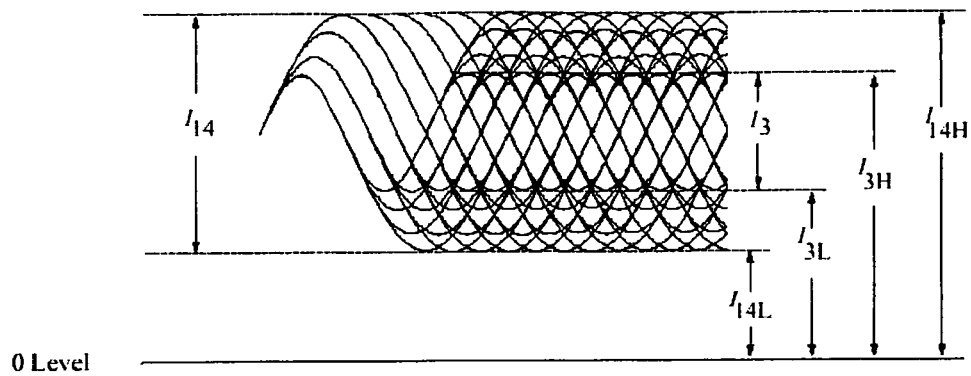
FIG. 19 is a diagram illustrating asymmetry.

In a conventional recording method as shown in FIGS. 15 and 16, a recording method of which the ratio $\epsilon\epsilon$ (Pe/Pp) of a recording power. Pp and an erasing power Pe is set to a certain level to perform recording is often used. This is a method created in order for jitter and asymmetry to be excellently held in a broader recording power range. Here, when reflectance levels of marks and spaces are binarized on the slice level, jitter represents standardized temporal misalignment between the border line and the clock using a window width. The lower the jitter is, the more excellent the recording property is. The asymmetry is a property value representing to what extent the average value of crystalline reflectance I14H corresponding to a 14T space and amorphous reflectance I14L corresponding to a 14T mark is misaligned from the average value of crystalline reflectance I3H corresponding to a 3T space and amorphous reflectance I3L corresponding to a 3T mark. The expression is represented by (I14H+I14L)−(I3H+I3L)/2 (I14H−I14L) (see FIG. 19). Since the reflectance signal is binarized depending on the slice level, asymmetry being the closest to zero is best. When an asymmetry loses its shape, there is a possibility that the border line between a mark and a space is not appropriately recognized. The asymmetry loses its shape due to an exceedingly high or exceedingly low recording power Pp or an exceedingly high or exceedingly low erasing power Pe, resulting in degradation of jitter. Therefore, these ratios need to be fixed to balance the powers and to thereby prevent the recording property from degrading.

Thus, in the recording method of embodiments of the present invention, it is preferred that not only the ratio $\epsilon\epsilon$ of a recording power Pp and an erasing power Pe individually set for the first recording layer and the second recording layer but also the ratio $\delta 1, \ldots \delta N$ (=Pc1/Pp, … PcN/Pp) of the recording power Pp and a cooling power Pc1, Pc2, …, PcN be individually set at the same time.

Figure 20:
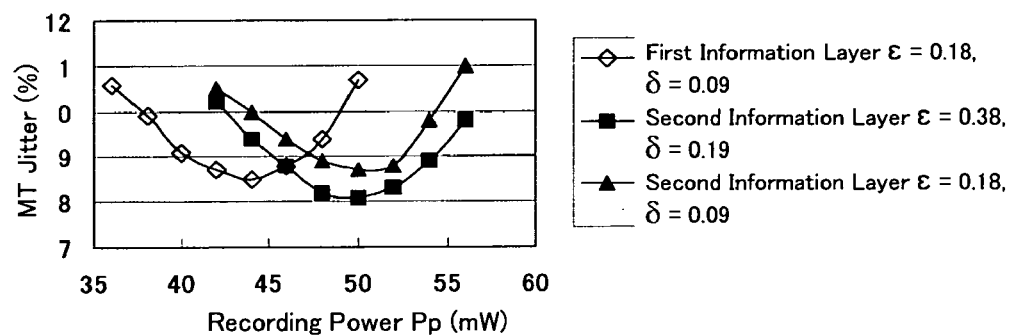
FIG. 20 is a view showing recording property of the first information layer compared to that of the second information layer when information is recorded to the first and second information layers with the recording strategy shown in FIG. 11.

For example, the case that both the phase-change recording material and the composition used for the first recording layer are the same as those of the second recording layer is considered as follows. When recording marks are recorded on each of the information layers at the same recording speed using an optical recording method in which the recording marks are modulated between a bias power level Pb and a recording power level Pp, and cooling power levels Pc1, Pc2, …, PcN (where N is an integer of 1 or more) between an erasing power level Pe and at least one bias power level Pb anterior to the leading pulse and posterior to the last pulse is set so as to form the recording marks by means of a pulse train satisfying the relation represented by the following condition: Pp>Pe>Pc1>Pc2 … >PcN>Pb, as a result of study on comparing the case that each of the information layers respectively have the same value $\epsilon$ and the same values $\delta 1, \ldots \delta N$ with the case that each of the information layers individually have a different value $\epsilon$ and a different value $\delta 1, \ldots \delta N$, the result as shown in FIG. 20 could be obtained. FIG. 20 shows the data result when recording was performed on a two-layered phase-change optical recording medium described in Example B-19 using the recording strategy shown in FIG. 11, which corresponds to the cases of Example B-28 and Comparative Example B-23 to be described thereafter.

As shown in FIG. 20, the recording properties at the time when recording was performed on the second information layer using a different power ratios ($\epsilon$=0.38, $\delta 1$=0.19) from the best suited power ratio of the first information layer ($\epsilon$=0.18, $\delta 1$=0.09) were more excellent than those when recording was performed on the second information layer using the same power ratio as the best suited power ratio of the first information layer. Particularly, the jitter in the best suited recording power (called as bottom jitter) at the time when recording was performed on the second information layer using the same power ratio was 8.7%. Contrarily, the bottom jitter at the time when recording was performed using different power ratios for the first information layer and the second information layer was 8.1%. As described above, it is recognized that there is the best suited power ratio for each information layer.

Further, as shown in Table 1, when recording was performed on the second information layer using a power ratio of $\epsilon$=0.38, $\delta 1$=0.09), the bottom jitter was 8.3%. This shows that not only the effect of the ratio $\epsilon$ but also the effect of the ratio $\delta 1$ has impact on the recording properties.

TABLE 1

|  | $\epsilon$ | $\delta 1$ | Bottom Jitter |
| --- | --- | --- | --- |
| First information layer | 0.18 | 0.09 | 8.5 |
| Second information layer | 0.18 | 0.09 | 9.7 |
|  | 0.38 | 0.09 | 8.3 |
|  | 0.38 | 0.19 | 8.1 |

In the optical recording method of embodiments of the present invention, the number of irradiation pulses of a recording power level Pp at the time when a recording mark having a length of nT (where T is a clock cycle, and n is an integer of one or more) is represented as m (m is an integer of one or more), and when 'n' is an even number, the relation n=2m is satisfied, and when 'n' is an odd number, the relation n=2m+1 is satisfied, it is possible to make the recording sensitivity excellent.

Conventionally, when recording is performed on a single-layer optical recording medium responding to 1× DVD to 4× DVD, a method of which one set of heating irradiation pulses and cooling irradiation pulses is repeatedly performed with respect to each one clock cycle is widely used (1T cycle strategy), because the scanning linear velocity of such a medium is slow. This recording method is the one that when an amorphous mark having a length of nT is recorded, irradiation of (n−1) heating irradiation pulses and (n−1) cooling irradiation pulses are alternated. However, since the clock cycle is shortened with improvements in recording linear velocity, when a single layer optical recording medium is irradiated with one set of heating irradiation pulses and cooling pulses based on 1T cycle as is conventionally done, sufficient cooling time cannot be ensured. In other words, even when irradiation is performed with certain heating pulses and cooling pulses and an amorphous mark is formed, the once formed amorphous mark is re-crystallized by residual heat caused from the heating pulses after the next 1T cycle, resulting in a problem that particularly long marks become thinner, and it is hard to have the modulation degree. To resolve such a problem, it is essential to take a cooling pulse irradiation time as long as possible.

Thus, in a high-speed recording more than 4× DVD, it is possible to form thick and uniform amorphous marks as well as to ensure a high modulation degree by employing a recording method of which one set of heating irradiation pulses and cooling irradiation pulses is repeatedly performed at every two clock cycle (2T cycle strategy). In the recording method, it is preferred that when recording an amorphous mark having a length of nT and the number of heating irradiation pulses is represented as m (where m is an integer of one or more), it is preferred that when 'n' is an even number, the relation n=2m be satisfied, and when 'n' is an odd number, the relation n=2m+1 be satisfied. Recording strategy using 2T cycle enables easy recording when used at a recording linear velocity as fast as 1× DVD to 4× DVD. Further, as mentioned above, it is possible to use lower recording powers as well as to record information with more excellent sensitivity than in recording at recording strategy using 1T cycle, since it is possible to take a long cooling time and to promote quenching effect. It is also preferably in the recording method for a multi-layered optical recording medium of embodiments of the present invention, because recording sensitivities of each individual recording layer such as the first information layer and the second information layer are improved.

In this case, repetitive recording on a multi-layered optical recording medium can be more excellently performed by increasing particularly the shortest mark by only one pulse.

In the optical recording method of embodiments of the present invention, the erasing power level Pe contains a pulse structure of a lower erasing power level Pe⁻ than the erasing power Pe during the irradiation with the erasing power level Pe, and the configuration enables further preventing thermal damages of the information layer disposed on the front side.

Figure 21:
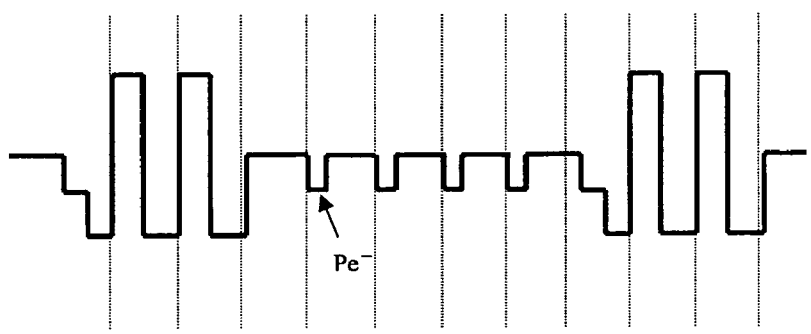
FIG. 21 is a view showing the laser emission waveforms when an erasing power $Pe^-$ is included.

FIG. 21 illustrates an emission waveform of a laser. Examples of known technologies similar to the laser irradiation waveform include the one disclosed in Japanese Patent Application Laid-Open (JP-A) No. 2004-63005. In the technology, an erasing power Pe⁺ is disposed in a pulse shape in the Pe area to supply energy needed for erasing in order to prevent recorded marks from remaining in space parts without being erased as the recording linear velocity is increased. To resolve the problem, in embodiments of the present invention, for the purpose of preventing thermal damages of the information layer on the front side of a multi-layered optical recording medium caused by irradiation with a relatively high erasing power Pe, a pulse structure Pe⁻ is arranged in the erasing power Pe area. With this configuration, it is possible to improve repetitive recording property of the information layer disposed on the front side.

In the optical recording method of the embodiments of present invention, when information is recorded on each individual information layers of a multi-layered optical recording medium, it is preferred to record information sequentially from the information layer disposed on the front side as viewed from the laser beam flux irradiation side.

Crystalline condition and amorphous condition of a phase-change material used for recording layers of the multi-layered optical recording medium respectively have a different optical constant, and crystalline condition have a higher absorption coefficient than amorphous condition. In other words, amorphous condition has a higher light transmittance than crystalline condition, because amorphous condition has a smaller degree of absorbing light than crystalline condition. Then, when recording is performed sequentially from the information layer disposed on the front side as viewed from the laser beam flux irradiation side, an amorphous mark is formed on the information layer by the recording, and conditions with a wide area for amorphous marks are formed sequentially from the front side, and the laser beam is easily transmitted to ease the recording on the information layer disposed on the innermost side.

When information is actually recorded on an optical recording medium using a recording apparatus, the case of recording the information from the first information layer enables recording with a recording power several percent lower than the case of recording the information from the second information layer. The light transmittance of the first information layer acts on a recording power needed for recording the information on the second information layer to be effective in relatively improving recording sensitivity.

FIG. 33 is a view exemplarily shoring an optical recording apparatus relating to an embodiment of the present invention. The optical recording apparatus 220 is provided with spindle motor 222 serving to rotatably drive optical disc 215 as a single-sided multi-layered optical recording medium relating to an embodiment of the present invention; optical pickup device 223; seek motor 221 for driving the optical pickup device 223 in the sledge direction; laser control circuit 224; encoder 225; drive control circuit 226; reproduced signal processing circuit 228; buffer RAM 234; buffer manager 237; interface 238, flush memory 239; CPU 240; and RAM 241, and the like.

It should be note that the arrows shown in FIG. 33 respectively indicate the flow of typical signals and information and are not intended to indicate all the connecting relations among each of the blocks. In this embodiment, the optical recording apparatus 220 is compatible with a single-sided multi-layered optical recording medium.

(Multi-layered Optical Recording Medium)

Multi-layered optical recording medium of embodiments of the present invention are used for the recording method for a multi-layered optical recording medium of embodiments of the present invention, and contains two or more information layers each having a phase-change recording layer in which information is recorded by inducing reversible phase changes between a crystalline condition and an amorphous condition and further contains other layers in accordance with the necessity. For the multi-layered optical recording medium, an aspect is preferably used in which information layers other than the information layer disposed at the innermost side as viewed from the laser beam irradiation side contain an upper protective layer, a phase-change recording layer, an lower protective layer, a reflective layer, and a thermal diffusion layer.

In this case, light transmittances of each individual information layers other than the information layer disposed on the innermost side as viewed from the laser beam irradiation side are preferably 30% to 70%, and more preferably 40% to 70%. When the light transmittances are lower than 30%, recording, erasing, and reproducing information on the second information layer disposed on the inner side may be difficult. When the light transmittances are higher than 70%, recording, erasing, and reproducing information on the first information layer may be difficult.

Here, the light transmittances can be measured by ETA-Optik manufactured by STEAG AG. In the measurement of the light transmittance, in the case of a two-layered optical recording medium, transmittance, reflectance, and absorption rate are measured from the transmitted light intensity and reflected light intensity that are determined by irradiating only a first substrate with the first information layer formed thereon with a laser beam. Namely, the light transmittance is measured before the first substrate is bonded to a second substrate.

For the multi-layered optical recording medium, a two-layered optical recording medium having a first information layer and a second information layer from the laser beam irradiation side is particularly preferably used.

Figure 17:
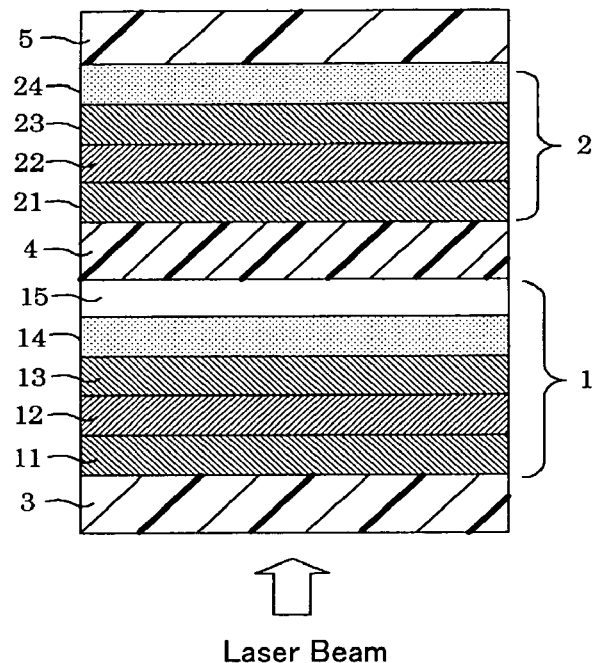
FIG. 17 is a cross-sectional view exemplarily showing an example of a laminar structure of a two-layered optical recording medium according to an embodiment of the present invention.
Figure 18:
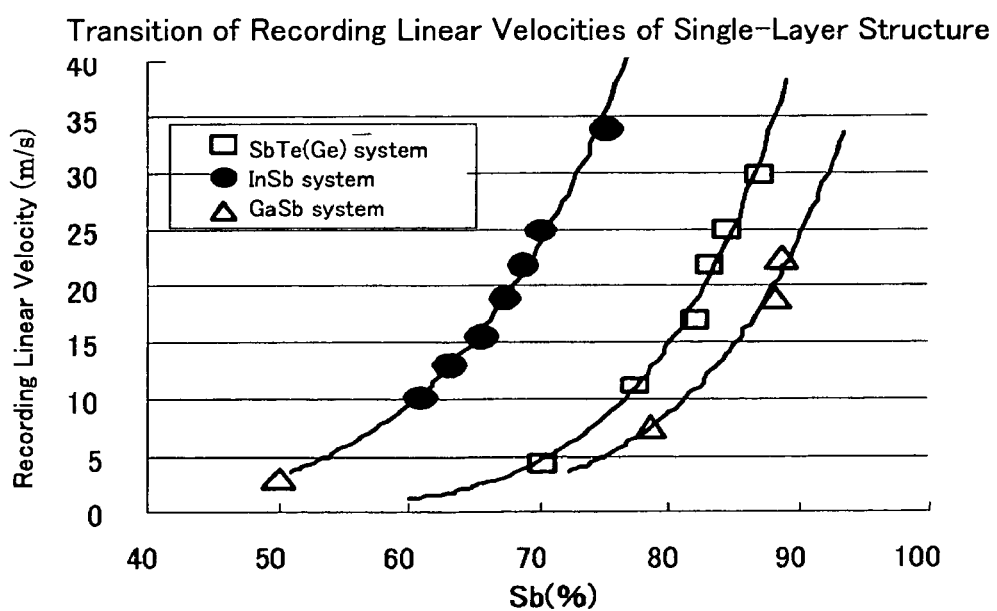
FIG. 18 is a graph showing the relation between the amount of Sb content and recording linear velocity in the recording layer of a single layer optical recording medium.

FIG. 17 is a schematic cross-sectional view of a two-layered optical recording medium relating to an aspect of some embodiments of the present invention. The two-layered optical recording medium contains first information layer 1, intermediate layer 4, second information layer 2, and second substrate 5 disposed on first substrate 3 in this order, and further contains other layers in accordance with the necessity.

The first information layer contains first lower protective layer 11, first recording layer 12, first upper protective layer 13, first reflective layer 14, and a thermal diffusion layer 15.

The second information layer 2 contains second lower protective layer 21, second recording layer 22, second upper protective layer 23, and second reflective layer 24.

A barrier layer may be formed between the upper protective layer 13 and the first reflective layer 14, and between the second upper protective layer 23 and the second reflective layer 24, respectively.

—First Substrate—

The first substrate 3 needs to sufficiently transmit the laser beam for irradiation for recording and reproducing information and can be suitably used from those known in the art.

For the material used for the first substrate 3, typically glasses, ceramics, resins, or the like are used, however, resins are preferably used in terms of formability and cost.

Examples of resins include polycarbonate resins, acrylic resins, epoxy resins, polystyrene resins, acrylonitrile-styrene copolymers, polyethylene resins, polypropylene resins, silicone resins, fluorine resins, ABS resins, and urethane resins. Of these resins, polycarbonate resins, and acrylic resins such as polymethyl methacrylate (PMMA) which are excellent in formability, optical properties, and cost, are preferably used.

On the surface on which the information layer for the first substrate 3 is formed, a concave-convex pattern called generally as groove part or land part, which is a groove in a spiral shape or in a concentric form, may be formed, and the pattern is typically formed by an injection molding method, a photopolymer method, or the like.

The thickness of the first substrate is not particularly limited, may be suitably selected in accordance with the intended use, and it is preferably 10 μm to 600 μm.

For the material of the second substrate, the same material as used for the first substrate 3, and a material opaque to the recording and reproducing light beam may be used, and the material and the groove shape of the second substrate 5 may be different from those of the first substrate 3.

The thickness of the second substrate 5 is not particularly limited, may be suitably selected in accordance with the intended use, and it is preferred to select the thickness of the second substrate 5 such that the total thickness including the thickness of the first substrate 5 is 1.2 mm.

—Phase-Change Recording Layer (First Recording Layer and Second Recording Layer)—

With respect to phase-change recording layers, when viewed from the perspective of development of materials for conventional recording layers, there are two main streams of development of the materials. Namely, one stream of materials for the phase-change recording layers includes GeTe which is a material for recordable recording layers, a $Sb_2Te_3$ alloy between Sb being reversibly phase-changeable and Te, and materials for recording layers containing a ternary alloy of GeSbTe from solid solutions or eutectic compositions of the two materials. The other stream of materials for the phase-change recording layers includes alloys between Sb and Te, and materials for recording layers are known in which a trace element is added to SbTe system that the content of Sb being a eutectic composition between Sb and $Sb_2Te_3$ is around 70%.

For optical recording media having two recording layers, a first information layer is required to have a high-transmittance in view of recording and reproducing of information on a second information layer. Thus, an effort to make the recording layers thinner is tried in parallel with an effort to reduce absorption rate of reflective layers. When making recording layers thinner, crystallization speed decelerates, and therefore, it is advantageous that the material for recording layer itself is made to have a high-crystallization speed. Thus, in the stream of the materials for recording layers, the latter SbTe eutectic composition having a Sb content of around 70% is preferable.

Specifically, Ge—Sb—Te, In—Sb—Te, Ag—In—Sb—Te, Ge—In—Sb—Te, Ge—Sn—Sb—Te, Ag—In—Ge—Sb—Te or the like are used. In addition, Ge—Te, In—Sb, Ga—Sb, Ge—Sb or the like may be used.

The first recording layer and the second recording layer can be formed by various vapor growth such as vacuum evaporation method, sputtering method, plasma CVD method, optical CVD method, ion-plating method, and electron-beam evaporation method. Of these methods, sputtering method is preferably used because of excellence in mass productivity, and quality of layers, and particularly direct-current sputtering method having a pulse waveform is more preferably used in that there is less composition gap between a targeted recording layer composition and an actually formed recording layer, and abnormal electric discharge occurring at the time of forming a recording layer by sputtering such as arcing and delayed start of electric discharge can be reduced.

The thickness of the first recording layer is preferably 4 nm to 15 nm, and more preferably 6 nm to 12 nm. When the thickness is less than 4 nm, it may be difficult to uniformly form the recording layer, and when the thickness is more than 15 nm, transmittance may be reduced.

The thickness of the second recording layer is not particularly limited, may be suitably selected in accordance with the intended use, and it is preferably 3 nm to 25 nm. When the thickness is less than 3 nm, it may be difficult to uniformly form the recording layer, and when the thickness is more than 25 nm, recording sensitivity may degrade.

—Reflective Layer (First Reflective Layer and Second Reflective Layer)—

As shown in FIG. 17, an optical recording medium having two recording layers needs to make a laser beam for recording and reproducing transmitted to a second information layer as much as possible. Thus, a material which a laser beam is hardly absorbed in the first reflective layer and easily transmit the laser beam thereto is preferably used. Specific examples of such a material include Ag, and Cu. On the other hand, the second reflective layer is not necessarily translucent as shown in the first reflective layer.

For a method for forming layers of the first reflective layer and the second reflective layer as described above, there are various vapor growth methods, for example, the first and the second reflective layers can be formed by vacuum evaporation method, sputtering method, plasma CVD method, optical CVD method, ion-plating method, and electron-beam evaporation method. Of these vapor growth methods, sputtering method excels in mass productivity, quality of layers or the like.

—Protective Layer (Upper Protective Layer and Lower Protective Layer)—

For material used for an upper protective layer in a single-layer optical recording medium, it is preferably the one that is transparent, transmits light well, and having a higher melting point than that of the recording layer, and materials having effects to prevent degradation and denaturation of the recording layer, improve bonding strength with the recording layer as well as to improve recording property such as metal oxides, nitrides, sulfides, carbides, or the like are primarily used. Specific examples of such a material include metal oxides such as SiO, $SiO_2$, ZnO, $SnO_2$, $Al_2O_3$, $TiO_2$, $In_2O_3$, MgO, $ZrO_2$, and $Ta_2O_5$; nitrides such as $Si_3N_4$, AlN, TiN, BN, and ZrN; sulfides such as ZnS, $In_2S_3$, $TaS_4$; carbides such as SiC, TaC, $B_4C$, WC, TiC, and ZrC; diamond-like carbons (DLCs), or mixture thereof. Each of these materials may be used alone to form a protective layer or may be a mixture of two elements. Each of these materials may include impurities in accordance with the necessity. Examples of the mixture include $ZnS$—$SiO_2$ mixtures and $Ta_2O_5$—$SiO_2$ mixtures. Among them, $ZnS$—$SiO_2$ mixtures are particularly preferable. The mixture molar ratio, $(ZnS)_{80}(SiO_2)_{20}$ is most preferable.

However, in the case of a multi-layered optical recording medium, when information is recorded on a first recording layer, heat dissipation property degrades because only the first reflective layer is thin, resulting in a problem that it is hard to record information. Therefore, it is preferred to use a material having thermal conductivity as excellent as possible for the first upper protective layer. Thus, it is preferred to use a material having higher heat dissipation property than that of $ZnS$—$SiO_2$. For example, it is preferred to use Sn oxide. The Sn oxide may include a metal oxide such as In oxide, Zn oxide, Ta oxide and Al oxide. By using Sn oxide, amorphous marks are easily formed on the first recording layer even when the thickness of the first reflective layer is relatively thick. Sn oxides, Ta oxides, and Al oxides respectively do not accelerate degradation relative to reflective layers, and each of these composition rates may be selected depending on the production processes, cost, allowed time for production, and the like. However, when the amount of Sn oxide is large, power needed for recording tends to be increased. When the amount of Ta oxide is large, it is hard to make recording property exerted on the first information layer, although it is a material that prevents deposition rate from decelerating. When the amount of Al oxide is large, the deposition rate tends to decelerate.

For the second upper protective layer, $ZnS$—$SiO_2$ may be used as used conventionally or Sn oxide may be used. The reason is that when recording is performed on the second recording layer, sufficient heat dissipation can be obtained because the second reflective layer can be formed sufficiently thick in thickness. When $ZnS$—$SiO_2$ is used for the second upper protective layer and Ag is used for the second reflective layer, an interface layer such as TiC—$TiO_2$ may be sandwiched in between the second upper protective layer and the second reflective layer. This is because reacting sulfur S with Ag prevents causing a problem on the optical recording medium.

For material for the first lower protective layer and the second lower protective layer, it is preferably the one that is transparent, transmits light well, and having a higher melting point than that of the recording layer, and materials having effects to prevent degradation and denaturation of the recording layer, improve bonding strength with the recording layer as well as to improve recording property such as metal oxides, nitrides, sulfides, carbides, or the like are primarily used. Specific examples of such a material include metal oxides such as SiO, $SiO_2$, ZnO, $SnO_2$, $Al_2O_3$, $TiO_2$, $In_2O_3$, MgO, $ZrO_2$, and $Ta_2O_5$; nitrides such as $Si_3N_4$, AlN, TiN, BN, and ZrN; sulfides such as ZnS, $In_2S_3$, $TaS_4$; carbides such as SiC, TaC, $B_4C$, WC, TiC, and ZrC; diamond-like carbons (DLCs), or mixture thereof. Each of these materials may be used alone to form a protective layer or may be a mixture of two elements. Each of these materials may include impurities in accordance with the necessity. Examples of the mixture include $ZnS$—$SiO_2$ mixtures and $Ta_2O_5$—$SiO_2$ mixtures. Among them, $ZnS$—$SiO_2$ mixtures are particularly preferable. The mixture mole ratio is most preferably $(ZnS)_{80}(SiO_2)_{20}$. Since $ZnS$—$SiO_2$ has a high refractive index 'n' and an extinction coefficient 'k' near zero, and thus it enables improving light absorption efficiency of the recording layer, reducing thermal conductivity, and moderately restraining thermal diffusion generated by light absorption, it is possible to increase the temperature on the recording layer up to the temperature at which the recording layer can be fused.

For a method for forming layers of the first upper protective layer, the second upper protective layer, the first lower protective layer, and the second upper protective layer as described above, there are various vapor growth methods, for example, the first and the second protective layers can be formed by vacuum evaporation method, sputtering method, plasma CVD method, optical CVD method, ion-plating method, and electron-beam evaporation method. Of these vapor growth methods, sputtering method excels in mass productivity, quality of layers or the like.

—Thermal Diffusion Layer—

The thermal diffusion layer is required to have a high thermal conductivity in order to quench the first recording layer which was subjected to laser irradiation. The thermal diffusion layer is also required to have a low absorption rate at laser wavelengths so that recording can be performed on the second information layer being disposed at the innermost side. Summarizing the above, it is preferred that the thermal diffusion layer include at least one selected from nitrides, oxides, sulfides, carbides, and fluorides. Examples of the materials include AlN, $Al_2O_3$, SiC, SiN, IZO (indium oxide-zinc oxide), ITO (indium oxide-tin oxide), DLC (diamond-like carbon) and BN. Of these materials, IZO and ITO are considered as most preferable. Tin oxide included in ITO (indium oxide-tin oxide) is preferably included with an amount of 1% by mass to 10% by mass. When the tin amount is less or more than the range, thermal conductivity and transmittance are reduced. Further, other elements may be added for the purpose of improvement in storage stability. These elements may be added to the extent that it has no impact on optical properties and preferably included with an amount of 0.1% by mass to 5% by mass. When the added amount of these elements is less than the range, the effect may not be obtained. When the added amount is more than the range, the light absorption is increased, causing decrease in transmittance. In wavelengths of laser beam used for recording and reproducing information, the absorption coefficient is preferably 1.0 or less, and more preferably 0.5 or less. When the absorption coefficient is more than 1.0, the absorption rate of the first information layer is increased, and recording and reproducing information on the second information layer may be difficult.

IZO (indium oxide-zinc oxide) is preferably used instead of ITO (indium oxide-tin oxide), because changes in microscopic thinness hardly occur due to reduced internal stress in the optical recording medium.

For a method for forming such a thermal diffusion layer, there are various vapor growth methods, for example, the thermal diffusion layer can be formed by vacuum evaporation method, sputtering method, plasma CVD method, optical CVD method, ion-plating method, and electron-beam evaporation method. Of these vapor growth methods, sputtering method excels in mass productivity, quality of layers or the like.

—Intermediate Layer—

The intermediate layer preferably has a low absorption rate in the wavelengths of laser beam for irradiation for recording and reproducing information. Materials used for the intermediate layer is preferably resins in terms of formability and cost, and ultraviolet curable resins, delayed-action resins, and thermoplastic resins can be used. On the second substrate, and the intermediate layer, a concave-convex pattern such as groove and guide groove formed by injection molding method or photopolymer method which is the same as on the first information layer may be formed. The intermediate layer is formed for which a pickup can differentiate the first information layer from the second information layer to optically separate the two information layers.

The thickness of the intermediate layer is not particularly limited, may be suitably selected in accordance with the intended use, and it is preferably 10 μm to 70 μm. When the thickness is less than 10 μm, cross-talk may occur between the two information layers, and when the thickness is more than 70 μm, spherical aberration occurs during recording and reproducing information on the second recording layer, and the recording and reproducing may be difficult.

—Barrier Layer—

A multi-layered optical recording medium of embodiments of the present invention may comprise a barrier layer between the upper protective layer and the reflective layer. For material used for the reflective layer, Ag alloy is the most preferable. For material used for the upper protective layer, a mixture of ZnS and $SiO_2$ is the most preferable, however, when these two layers are adjacently formed, there is a possibility that sulfur in the protective layer corrodes Ag in the reflective layer, and this possibly degrade storage stability. To resolve the trouble, it is preferred to form a barrier layer when Ag materials are used. The barrier layer needs not to include sulfur and needs to have a higher melting point than the recording layer. Specific examples of the material for the barrier include metal oxides such as SiO, ZnO, $SnO_2$, $Al_2O_3$, $TiO_2$, $In_2O_3$, MgO, and $ZrO_2$; nitrides such as $Si_3N_4$, AlN, TiN, and ZrN; sulfides such as ZnS, $In_2S_3$, $TaS_4$; carbides such as SiC, TaC, $B_4C$, WC, TiC, and ZrC; or mixtures thereof. The barrier layer is required to have a low absorption rate at laser wavelengths.

The barrier layer can be formed by various vapor growth methods, for example, by vacuum evaporation method, sputtering method, plasma CVD method, optical CVD method, ion-plating method, and electron-beam evaporation method. Of these vapor growth methods, sputtering method excels in mass productivity, quality of layers or the like.

The thickness of the barrier layer is preferably 2 nm to 10 nm. When the thickness is less than 2 nm, the effect for preventing corrosion of Ag may not be obtained, and the storage reliabilities degrade. On the other hand, when the thickness is more than 10 nm, there is a tendency that the heat dissipation effect cannot be obtained, and the transmittance degrades.

Next, the two-layered optical recording medium of embodiments of the present invention is not particularly limited, may be suitably selected in accordance with the intended use, however, it is preferably produced as follows. The production method of the two-layered optical recording medium includes layer-forming process, initialization process, and bonding process, and basically, each of these processes are carried out in this order.

In the layer-forming process, in FIG. 17, the first information layer is formed on a surface of the first substrate with groove formed thereon, and the second information layer is formed on a surface of the second substrate with groove formed thereon. The first information layer and the second information layer can be formed by various vapor growth methods, for example, by vacuum evaporation method, sputtering method, plasma CVD method, optical CVD method, ion-plating method, and electron-beam evaporation method. Of these vapor growth methods, sputtering method excels in mass productivity, quality of layers or the like. In sputtering method, generally, layers are formed while flowing an inert gas such as argon gas, however, they may be subjected to a reaction while mixing oxygen, nitrogen, or the like in the inert gas to be sputtered.

In the initialization process, the entire surfaces of the first information layer and the second information layer are initialized by irradiating the entire surfaces with an energy light beam such as a laser beam, namely, the recording layers are crystallized. When the layers are possibly buoyed up by action of the laser beam energy during the initialization, the first information layer and the second information layer may be spin-coated using an ultraviolet resin or the like, and the information layer may be irradiated with ultraviolet rays to be cured and then overcoated. In addition, after performing the subsequent bonding process in first, the first information layer and the second information layer may be initialized from the first substrate side.

In the bonding process, the first substrate is bonded to the second substrate through the intermediate layer in a manner that the first substrate faces to the second substrate. For example, ultraviolet resin is coated on any one of layer surfaces of the first substrate and the second substrate such that the layer surface of the first information layer and the layer surface of the second information layer are arranged face to face, pressurized, and bonded, and then the bonded area is irradiated with ultraviolet rays, thereby curing the ultraviolet resin.

According to embodiments of the present invention, it is possible to provide a multi-layered optical recording medium capable of resolving conventional problems. When information is recorded on a first recording layer residing a first information layer disposed at the most front side as viewed from the laser beam flux irradiation side in a multi-layered optical recording medium having two or more information layers each of which contains a phase-change recording layer, the multi-layered optical recording medium is capable of preventing thermal damages the recording layer suffers and appropriately performing recording and erasing, and having excellent recording property. It is also possible to provide an optical recording method for the multi-layered optical recording medium, and an optical recording apparatus for the multi-layered optical recording medium. Further, embodiments of the present invention also enable making the recording sensitivities of the second recording layer or more recording layers excellent.

EXAMPLES

Hereafter, the present invention will be described in detail referring to specific examples, however, the present invention is not limited to the disclosed examples.

Example A-1

On a polycarbonate disc substrate having a diameter of 12 cm, a thickness of 0.6 mm, and guide groove with a track pitch of 0.74 μm, a first protective layer made from ZnS—SiO$_2$ having a thickness of 60 nm, a recording layer made from In$_3$Sb$_{17}$Te$_{80}$ having a thickness of 15 nm, a second protective layer made from ZnS—SiO$_2$ having a thickness of 12 nm, an anti-sulfuration layer made from SiC having a thickness of 4 nm, and a reflective layer made from Ag having a thickness of 140 nm were formed by sputtering method in this order. An organic protective layer was overcoated on the obtained reflective layer, and a polycarbonate disc having a thickness of 0.6 mm was further bonded on the organic protective layer to thereby produce a phase-change optical recording medium. Then, the phase-change optical recording medium was initially crystallized using a laser diode having large diameter lens.

Recording was performed on the obtained optical recording medium under the conditions described below to examine the jitter of repetitive recording.

Figure 8:
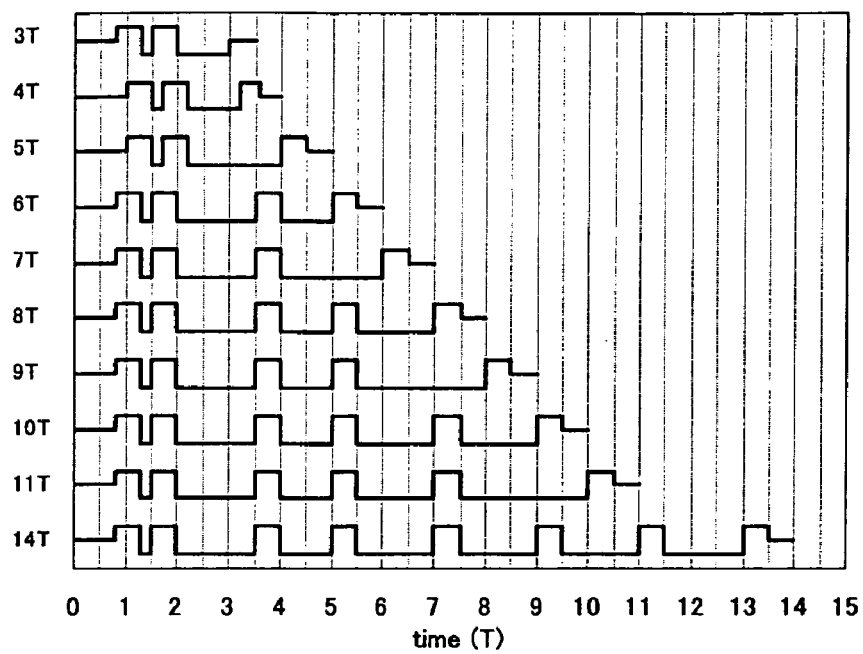
FIG. 8 is a graph showing emission patterns of waveform (recording strategies) for each mark length used in Examples.

For the recording, a random pattern having a linear density of 0.267 μm/bit was recorded by EFM+modulation method using optical head having a wavelength of 660 nm and a numerical aperture NA 0.65 at a recording linear velocity of 42 m/s which is as fast as 12× DVD. FIG. 8 shows emission patterns of waveform (recording strategies) for each mark length. Table 2 shows values that timescale held for each power (Pe, Pp, and Pb) beginning at the starting position of mark are standardized by reference clock T. In Examples in the present invention, all the leading cooling pulses were set at 0.2T. The second cooling pulses were different depending on the mark length and set at between 1.0T to 1.8T.

Figure 6:
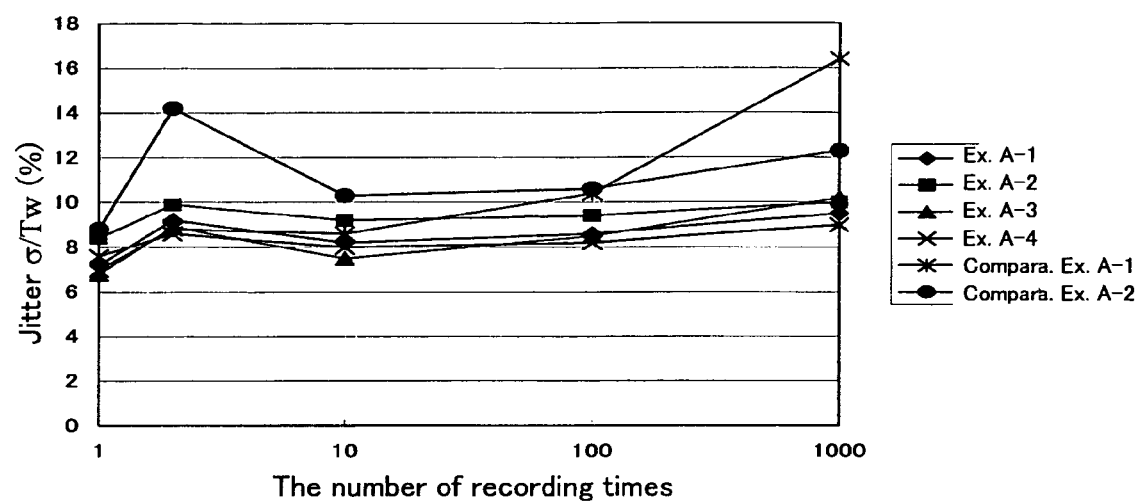
FIG. 6 is a graph showing jitters after the random pattern was repeatedly recorded in Examples A-1 to A-4, and Comparative Examples A-1 and A-2.

FIG. 6 shows jitters when the setting values for each power (Pe, Pp, and Pb) were set as Pp=38 mW, Pb=0.1 mW, and Pe=6.5 mW. As can be seen from the results in FIG. 6, there was no sharp increase in jitter even at the first time of repetitive recording, the results showed excellent repetitive recording properties.

Figure 9:
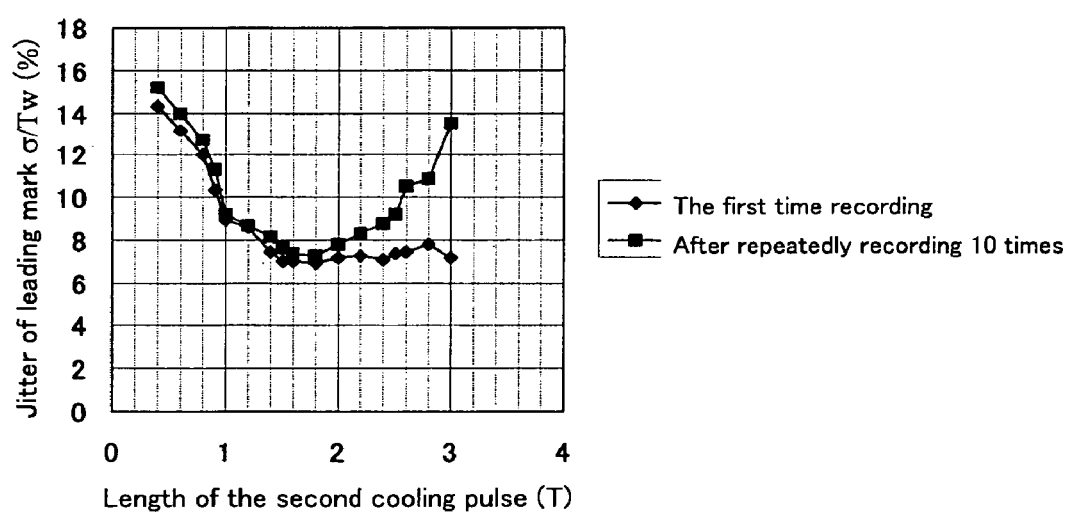
FIG. 9 is a graph showing examined results of jitters of a leading mark of 6T or more when the random pattern was recorded at the first recording and after the random pattern was repeatedly recorded ten times with varying lengths of the second cooling pulse of the mark.

FIG. 9 shows examined results of jitters of the mark at the leading part when a random pattern was recorded at the first recording and after the random pattern was repeatedly recorded ten times with varying the length of the second cooling pulse of a mark of 6T or more. When the length of the second cooling pulse of a mark of 6T or more was shorter than 1.0T, the jitter of the mark at the leading part increased sharply. When the length of the second cooling pulse of a mark of 6T or more was longer than 2.5T, the jitter at the first recording was low, however, the jitter after repeatedly recording 10 times increased sharply.

Figure 10:
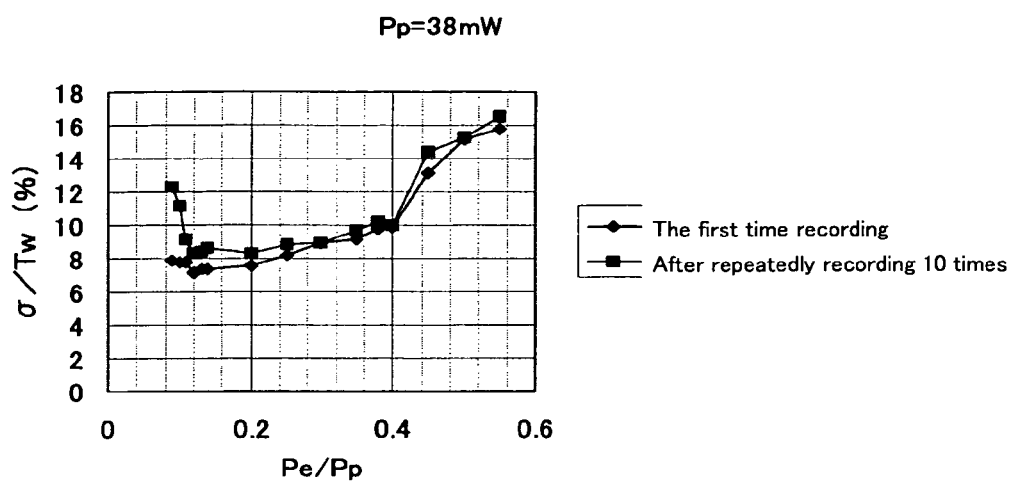
FIG. 10 is a graph showing respective jitters when a random pattern was recorded at the first recording and after the random pattern was repeatedly recorded 10 times with Pp fixed at 38 mW and varying the Pe value to change the value of Pe/Pp.

FIG. 10 shows respective jitters when a random pattern was recorded at the first recording and after the random pattern was repeatedly recorded 10 times with Pp fixed at 38 mW and varying the Pe value to vary the value of Pe/Pp. When the value Pe/Pp was smaller than 0.1, the jitter at the first recording was low, however, the jitter greatly increased due to the repetitive recording. When the value Pe/Pp is greater than 0.4, both at the first recording and after the repetitive recording, the jitter increased.

TABLE 2

|     | Pe  | Pp  | Pb  | Pp  | Pb  | Pp  | Pb  | Pp  | Pb  | Pp  | Pb  | Pp  | Pb  | Pp  | Pb  | Pp  | Pb  |
| --- | --- | --- | --- | --- | --- | --- | --- | --- | --- | --- | --- | --- | --- | --- | --- | --- | --- |
| 3T  | 0.8 | 0.5 | 0.2 | 0.5 | 1.0 |     |     |     |     |     |     |     |     |     |     |     |     |
| 4T  | 1.0 | 0.5 | 0.2 | 0.5 | 1.0 | 0.4 | 0.0 |     |     |     |     |     |     |     |     |     |     |
| 5T  | 1.0 | 0.5 | 0.2 | 0.5 | 1.8 | 0.5 | 0.0 |     |     |     |     |     |     |     |     |     |     |
| 6T  | 0.8 | 0.5 | 0.2 | 0.5 | 1.5 | 0.5 | 1.0 | 0.5 | 0.0 |     |     |     |     |     |     |     |     |
| 7T  | 0.8 | 0.5 | 0.2 | 0.5 | 1.5 | 0.5 | 2.0 | 0.5 | 0.0 |     |     |     |     |     |     |     |     |
| 8T  | 0.8 | 0.5 | 0.2 | 0.5 | 1.5 | 0.5 | 1.0 | 0.5 | 1.5 | 0.5 | 0.0 |     |     |     |     |     |     |
| 9T  | 0.8 | 0.5 | 0.2 | 0.5 | 1.5 | 0.5 | 1.0 | 0.5 | 2.5 | 0.5 | 0.0 |     |     |     |     |     |     |
| 10T | 0.8 | 0.5 | 0.2 | 0.5 | 1.5 | 0.5 | 1.0 | 0.5 | 1.5 | 0.5 | 1.5 | 0.5 | 0.0 |     |     |     |     |
| 11T | 0.8 | 0.5 | 0.2 | 0.5 | 1.5 | 0.5 | 1.0 | 0.5 | 1.5 | 0.5 | 2.5 | 0.5 | 0.0 |     |     |     |     |
| 14T | 0.8 | 0.5 | 0.2 | 0.5 | 1.5 | 0.5 | 1.0 | 0.5 | 1.5 | 0.5 | 1.5 | 0.5 | 1.5 | 0.5 | 1.5 | 0.5 | 0.0 |

Example A-2

Recording properties of the optical recording medium which was the same as prepared in Example A-1 were examined in the same manner as in Example A-1 except that the recording strategy was set with the conditions shown in Table 3. When the mark length was 6T or more, the irradiation time of the leading cooling pulse was set at 0.4T, and the irradiation time of the second cooling pulse was set at 1.3T.

FIG. 6 shows jitters when the setting values for each power (Pe, Pp, and Pb) were set as Pp=38 mW, Pb=0.1 mW, and Pe=6.5 mW. As can be seen from the results in FIG. 6, there was no sharp increase in jitter even at the first time of repetitive recording, the results showed excellent repetitive recording properties.

TABLE 3

| | Pe | Pp | Pb | Pp | Pb | Pp | Pb | Pp | Pb | Pp | Pb | Pp | Pb | Pp | Pb | Pp | Pb |
|---|---|---|---|---|---|---|---|---|---|---|---|---|---|---|---|---|---|
| 3T | 0.8 | 0.5 | 0.2 | 0.5 | 1.0 | | | | | | | | | | | | |
| 4T | 1.0 | 0.5 | 0.2 | 0.5 | 1.0 | 0.4 | 0.0 | | | | | | | | | | |
| 5T | 1.0 | 0.5 | 0.2 | 0.5 | 1.8 | 0.5 | 0.0 | | | | | | | | | | |
| 6T | 0.8 | 0.5 | 0.4 | 0.5 | 1.3 | 0.5 | 1.0 | 0.5 | 0.0 | | | | | | | | |
| 7T | 0.8 | 0.5 | 0.4 | 0.5 | 1.3 | 0.5 | 2.0 | 0.5 | 0.0 | | | | | | | | |
| 8T | 0.8 | 0.5 | 0.4 | 0.5 | 1.3 | 0.5 | 1.0 | 0.5 | 1.5 | 0.5 | 0.0 | | | | | | |
| 9T | 0.8 | 0.5 | 0.4 | 0.5 | 1.3 | 0.5 | 1.0 | 0.5 | 2.5 | 0.5 | 0.0 | | | | | | |
| 10T | 0.8 | 0.5 | 0.4 | 0.5 | 1.3 | 0.5 | 1.0 | 0.5 | 1.5 | 0.5 | 1.5 | 0.5 | 0.0 | | | | |
| 11T | 0.8 | 0.5 | 0.4 | 0.5 | 1.3 | 0.5 | 1.0 | 0.5 | 1.5 | 0.5 | 2.5 | 0.5 | 0.0 | | | | |
| 14T | 0.8 | 0.5 | 0.4 | 0.5 | 1.3 | 0.5 | 1.0 | 0.5 | 1.5 | 0.5 | 1.5 | 0.5 | 1.5 | 0.5 | 1.5 | 0.5 | 0.0 |

Example A-3

Recording properties of the optical recording medium which was the same as prepared in Example A-1 were examined in the same manner as in Example A-1 except that the recording strategy was set with the conditions shown in Table 4. When the mark length was 6T or more, the irradiation time of the second cooling pulse was set at 2.5T, and the pulse at the time when the mark length increases T-even times was set so as to be 1.0T smaller than the pulse in Example A-1.

FIG. 6 shows jitters when the setting values for each power (Pe, Pp, and Pb) were set as Pp=38 mW, Pb=0.1 mW, and Pe=6.5 mW. As can be seen from the results in FIG. 6, there was no sharp increase in jitter even at the first time of repetitive recording, the results showed excellent repetitive recording properties.

was changed to $In_5Sb_{17}Te_{78}$ having a crystallization rate slightly slower than in Example A-1.

Recording properties of the optical recording medium were examined in the same manner as in Example A-1 except that the recording speed was changed to 8× DVD (approx. 27.9 m/s) with the same recording strategy conditions as shown in Table 2.

FIG. 6 shows jitters when the setting values for each power (Pe, Pp, and Pb) were set as Pp=30 mW, Pb=0.2 mW, and Pe=6 mW. As can be seen from the results in FIG. 6, there was no sharp increase in jitter even at the first time of repetitive recording, the results showed excellent repetitive recording properties.

Comparative Example A-1

Recording properties of the optical recording medium which was the same as prepared in Example A-1 were examined in the same manner as in Example A-1 except that the recording strategy was set with the conditions shown in Table 5.

FIG. 6 shows jitters when the setting values for each power (Pe, Pp, and Pb) were set as Pp=38 mW, Pb=0.1 mW, and Pe=6 mW. As can be seen from the results in FIG. 6, the initial increase in jitter of the repetitive recording was small and excellent, however, the repetitive recording endurance was poor, and at the thousandth recording, the jitter was greatly increased. In addition, the influence of cross-erase was examined. When the random pattern was recorded on a track adjacent to one track, the jitter on the one track that the random

TABLE 4

| | Pe | Pp | Pb | Pp | Pb | Pp | Pb | Pp | Pb | Pp | Pb | Pp | Pb | Pp | Pb | Pp | Pb |
|---|---|---|---|---|---|---|---|---|---|---|---|---|---|---|---|---|---|
| 3T | 0.8 | 0.5 | 0.2 | 0.5 | 1.0 | | | | | | | | | | | | |
| 4T | 1.0 | 0.5 | 0.2 | 0.5 | 1.0 | 0.4 | 0.0 | | | | | | | | | | |
| 5T | 1.0 | 0.5 | 0.2 | 0.5 | 1.8 | 0.5 | 0.0 | | | | | | | | | | |
| 6T | 0.8 | 0.5 | 0.2 | 0.5 | 2.5 | 0.8 | 0.0 | | | | | | | | | | |
| 7T | 0.8 | 0.5 | 0.2 | 0.5 | 2.5 | 0.5 | 1.0 | 0.5 | 0.0 | | | | | | | | |
| 8T | 0.8 | 0.5 | 0.2 | 0.5 | 2.5 | 0.5 | 1.7 | 0.8 | 0.0 | | | | | | | | |
| 9T | 0.8 | 0.5 | 0.2 | 0.5 | 2.5 | 0.5 | 1.5 | 0.5 | 1.0 | 0.5 | 0.0 | | | | | | |
| 10T | 0.8 | 0.5 | 0.2 | 0.5 | 2.5 | 0.5 | 1.5 | 0.5 | 1.7 | 0.8 | 0.0 | | | | | | |
| 11T | 0.8 | 0.5 | 0.2 | 0.5 | 2.5 | 0.5 | 1.5 | 0.5 | 1.5 | 0.5 | 1.0 | 0.5 | 0.0 | | | | |
| 14T | 0.8 | 0.5 | 0.2 | 0.5 | 2.5 | 0.5 | 1.5 | 0.5 | 1.5 | 0.5 | 1.5 | 0.5 | 1.7 | 0.8 | 0.0 | | |

Example A-4

Optical recording medium 6 was produced in the same manner as in Example A-1 except that the recording material pattern had been recorded was increased by approx. 1% compared to the case where the random pattern was recorded on only the one track, and it was found that the influence of cross-erase was large. This shows that in the case of high-speed recording, the cooling effect cannot be obtained with the cooling pulse setting of 0.1T or less.

evaluation criteria for the evaluations of properties, the case that the data-to-clock jitter (DC jitter) at the time when marks of 3T to 11T, a mark of 14T, and spaces were randomly recorded being 11% or less was evaluated as passable. Here, when reflectance levels of marks and spaces are binarized on the slice level, DC jitter represents standardized a time-lag between the border line and the clock. The lower the DC jitter is, the more excellent the recording property is.

TABLE 5

|  | Pe | Pp | Pb | Pp | Pb | Pp | Pb | Pp | Pb | Pp | Pb | Pp | Pb | Pp | Pb | Pp | Pb |
|---|---|---|---|---|---|---|---|---|---|---|---|---|---|---|---|---|---|
| 3T | 0.8 | 0.5 | 0.1 | 0.5 | 1.0 | | | | | | | | | | | | |
| 4T | 1.0 | 0.5 | 0.1 | 0.5 | 1.0 | 0.4 | 0.0 | | | | | | | | | | |
| 5T | 1.0 | 0.5 | 0.1 | 0.5 | 1.8 | 0.5 | 0.0 | | | | | | | | | | |
| 6T | 0.8 | 0.5 | 0.1 | 0.5 | 1.5 | 0.5 | 1.0 | 0.5 | 0.0 | | | | | | | | |
| 7T | 0.8 | 0.5 | 0.1 | 0.5 | 1.5 | 0.5 | 2.0 | 0.5 | 0.0 | | | | | | | | |
| 8T | 0.8 | 0.5 | 0.1 | 0.5 | 1.5 | 0.5 | 1.0 | 0.5 | 1.5 | 0.5 | 0.0 | | | | | | |
| 9T | 0.8 | 0.5 | 0.1 | 0.5 | 1.5 | 0.5 | 1.0 | 0.5 | 2.5 | 0.5 | 0.0 | | | | | | |
| 10T | 0.8 | 0.5 | 0.1 | 0.5 | 1.5 | 0.5 | 1.0 | 0.5 | 1.5 | 0.5 | 1.5 | 0.5 | 0.0 | | | | |
| 11T | 0.8 | 0.5 | 0.1 | 0.5 | 1.5 | 0.5 | 1.0 | 0.5 | 1.5 | 0.5 | 2.5 | 0.5 | 0.0 | | | | |
| 14T | 0.8 | 0.5 | 0.1 | 0.5 | 1.5 | 0.5 | 1.0 | 0.5 | 1.5 | 0.5 | 1.5 | 0.5 | 1.5 | 0.5 | 1.5 | 0.5 | 0.0 |

Comparative Example A-2

Recording properties of the optical recording medium which was the same as prepared in Example A-1 were examined in the same manner as in Example A-1 except that the recording strategy was set with the conditions shown in Table 6. When the mark length was 6T or more, the leading cooling pulse was set at 0.5T, and the second cooling pulse was set at 1.2T.

FIG. 6 shows jitters when the setting values for each power (Pe, Pp, and Pb) were set as Pp=38 mW, Pb=0.1 mW, and Pe=6 mW. As can be seen from the results in FIG. 6, the increase in jitter of the first repetitive recording was largely increased. This is believed that the mark edge shape became thin due to the excessively long leading cooling pulse, and the jitter at the anterior edge of the mark showed great sensitivity to the difference in crystalline conditions.

Examples B-1 to B-4 and Comparative Examples B-1 to B-3

On a first substrate made from polycarbonate resin having a diameter of 12 cm, a thickness of 0.6 mm, and concaves-convexes for tracking guide being a continuously wobbling groove (wobble groove) with a track pitch of 0.74 μm on the one side thereof, a first lower protective layer made from ZnS (80 mole %)-SiO$_2$ (20 mole %) having a thickness of 70 nm, a first recording layer made from Ag$_{0.2}$In$_{3.5}$Sb$_{69.8}$Te22Ge$_{4.5}$ having a thickness of 7.5 nm, a first upper protective layer made from In$_2$O$_3$ (7.5 mole %)-ZnO (22.5 mole %)-SnO$_2$ (60 mole %)-Ta$_2$O$_5$ (10 mole %) having a thickness of 5 nm, a first reflective layer made from Cu containing 1.1% by mass Mo

TABLE 6

|  | Pe | Pp | Pb | Pp | Pb | Pp | Pb | Pp | Pb | Pp | Pb | Pp | Pb | Pp | Pb | Pp | Pb |
|---|---|---|---|---|---|---|---|---|---|---|---|---|---|---|---|---|---|
| 3T | 0.8 | 0.5 | 0.2 | 0.5 | 1.0 | | | | | | | | | | | | |
| 4T | 1.0 | 0.5 | 0.2 | 0.5 | 1.0 | 0.4 | 0.0 | | | | | | | | | | |
| 5T | 1.0 | 0.5 | 0.2 | 0.5 | 1.8 | 0.5 | 0.0 | | | | | | | | | | |
| 6T | 0.8 | 0.5 | 0.5 | 0.5 | 1.2 | 0.5 | 1.0 | 0.5 | 0.0 | | | | | | | | |
| 7T | 0.8 | 0.5 | 0.5 | 0.5 | 1.2 | 0.5 | 2.0 | 0.5 | 0.0 | | | | | | | | |
| 8T | 0.8 | 0.5 | 0.5 | 0.5 | 1.2 | 0.5 | 1.0 | 0.5 | 1.5 | 0.5 | 0.0 | | | | | | |
| 9T | 0.8 | 0.5 | 0.5 | 0.5 | 1.2 | 0.5 | 1.0 | 0.5 | 2.5 | 0.5 | 0.0 | | | | | | |
| 10T | 0.8 | 0.5 | 0.5 | 0.5 | 1.2 | 0.5 | 1.0 | 0.5 | 1.5 | 0.5 | 1.5 | 0.5 | 0.0 | | | | |
| 11T | 0.8 | 0.5 | 0.5 | 0.5 | 1.2 | 0.5 | 1.0 | 0.5 | 1.5 | 0.5 | 2.5 | 0.5 | 0.0 | | | | |
| 14T | 0.8 | 0.5 | 0.5 | 0.5 | 1.2 | 0.5 | 1.0 | 0.5 | 1.5 | 0.5 | 1.5 | 0.5 | 1.5 | 0.5 | 1.5 | 0.5 | 0.0 |

As an evaluation device for the optical recording media in the following Examples B-1 to B-47 and Comparative Examples B-1 to B-32, ODU-1000 manufactured by PULSTEC INDUSTRIAL CO., LTD was used, the laser wavelength used for irradiation during the recording was 660 nm, and the numerical aperture (NA) of the object lens was 0.65. The laser beam power for reproducing was set at 1.4 mW.

Recording was performed on adjacent three tracks on the first recording layer, and the recorded mark on the middle track of the three tracks was reproduced to thereby evaluate the optical recording media. The recording was performed using recording strategy of 1T cycle. With respect to the having a thickness of 7.5 nm, and a thermal diffusion layer made from In$_2$O$_3$ (90 mole %)-ZnO (10 mole %) having a thickness of 65 nm were formed in the presence of Ar gas by sputtering method in this order to thereby form a first information layer. The sputtering was performed using a sputtering apparatus having 8 chambers (manufactured by Balzers AG).

A substrate similar to the first substrate was formed as a second substrate. On the second substrate, a second reflective layer made from Ag having a thickness of 140 nm, an interface layer made from TiC (70 mole %)-TiO$_2$ (30 mole %) having a thickness of 4 nm, a second upper protective layer made from ZnS (80 mole %)-SiO$_2$ (20 mole %) having a thickness of 20 nm, a second recording layer made from $Ag_{0.2}In_{3.5}Sb_{70.2}Te_{22.6}Ge_{3.5}$ having a thickness of 15 nm, and a second lower protective layer made from ZnS (80 mole %)-$SiO_2$ (20 mole %) having a thickness of 140 nm were formed in this order in the same manner as in the first information layer to thereby form a second information layer.

Next, ultraviolet curable resin (KARAYAD DVD003M, manufactured by Nippon Kayaku Co., Ltd.) was coated on the layer surface of the first information layer, and the side surface of the second information layer was bonded to the layer surface of the first information layer and spin-coated to cure the ultraviolet curable resin by irradiating the ultraviolet curable resin with ultraviolet rays from the first substrate side to form an intermediate layer having a thickness of 55 μm and to thereby produce a two-layered phase-change optical recording medium having two information layers.

Next, the first information layer and the second information layer were initialized by irradiating the information layers with a laser beam from the first substrate side. The initialization was performed by concentrating the laser beam emitted from a laser diode (emission wavelength: 810±10 nm) through an optical pickup (numerical aperture (NA)= 0.55). For the initialization conditions for the first recording layer, the optical recording medium was rotated in Constant Linear Velocity (CLV) mode at a liner velocity of 5 m/s, a feed per revolution of 50 μm/revolution, an initialization power of 900 mW, and a radius position of 23 mm to 59 mm. For the initialization conditions for the second recording layer, the optical recording medium was rotated in Constant Linear Velocity (CLV) mode at a liner velocity of 5 m/s, a feed per revolution of 40 μm/revolution, an initialization power of 1,250 mW, and a radius position of 23 mm to 59 mm. The second information layer was first initialized, and then the first information layer was initialized. The light transmittance of the first information layer after the initialization was 42.5%, and it was confirmed that a sufficient light transmittance was obtained. The light transmittance was measured using ETA-Optik manufactured by STEAG AG.

Recording was performed on the optical recording medium at a recording linear velocity of 9.2 m/s. For the recording strategy, recording strategy of 1T cycle was used, and the pulse width was set at 0.188T.

Table 7 shows the test results. For example, DOW10 means repeatedly recording of 10 times. The test results shown in Table 7 were the optimum jitters among the jitters obtained when a recording power was changed from 34 mW to 40 mW.

Recording was performed on the second information layer with recording strategies of 1T cycle and 2T cycle. In the result,, the recording power of the recording strategy of 1T cycle and the recording strategy of 2T cycle at which a modulation degree of 60% was obtained was approx. 47 mw for 1T cycle and approx. 40 mW for 2T cycle, and the recording sensitivity when recording was performed with recording strategy of 2T cycle was more excellent than with recording strategy of 1T cycle. There was little difference in recording power depending on difference in Tr in Examples B-1 to B-4.

TABLE 7

| Recording linear velocity 9.2 m/s | Tr [T] | DOW 10 | DOW 100 | DOW 500 |
|---|---|---|---|---|
| Compara. Ex. B-1 | n − 0.9 | 8.5 | 10.5 | 12.2 |
| Ex. B-1 | n − 1 | 8.3 | 9.3 | 10.9 |
| Ex. B-2 | n − 1.2 | 7.9 | 9.1 | 10.8 |
| Ex. B-3 | n − 1.4 | 7.7 | 8.9 | 10.7 |
| Ex. B-4 | n − 1.5 | 8.0 | 9.0 | 10.9 |

TABLE 7-continued

| Recording linear velocity 9.2 m/s | Tr [T] | DOW 10 | DOW 100 | DOW 500 |
|---|---|---|---|---|
| Compara. Ex. B-2 | n − 1.6 | 8.5 | 10.7 | 12.4 |
| Compara. Ex. B-3 | n − 2 | 11.1 | 13.8 | 15.6 |

Examples B-5 to B-8 and Comparative Examples B-4 to B-6

A two-layered optical recording medium was produced in the same manner as in Example B-1 except that the upper protective layer was changed to $In_2O_3$ (9.2 mole %)-ZnO (27.5 mole %)-$SnO_2$ (53.3 mole %)-$Ta_2O_5$ (10 mole %), and the recording test for the two-layered optical recording medium was performed in the same manner as in Example B-1. The light transmittance of the first information layer after the initialization was 42.8%, and it was confirmed that a sufficient light transmittance was obtained. The light transmittance was measured using ETA-Optik manufactured by STEAG AG.

Table 8 shows the test results. The test results shown in Table 8 were the optimum jitters among the jitters obtained when a recording power was changed from 34 mW to 40 mW.

Recording was performed on the second information layer with recording strategies of 1T cycle and 2T cycle. In the result,, the recording power of the recording strategy of 1T cycle and the recording strategy of 2T cycle at which a modulation degree of 60% was obtained was approx. 46 mw for 1T cycle and approx. 39.5 mW for 2T cycle, and the recording sensitivity when recording was performed with recording strategy of 2T cycle was more excellent than with recording strategy of 1T cycle. There was little difference in recording power depending on difference in Tr in Examples B-5 to B-8.

TABLE 8

| Recording linear velocity 9.2 m/s | Tr [T] | DOW 10 | DOW 100 | DOW 500 |
|---|---|---|---|---|
| Compara. Ex. B-4 | n − 0.9 | 8.2 | 10.3 | 12.0 |
| Ex. B-5 | n − 1 | 8.1 | 9.1 | 10.7 |
| Ex. B-6 | n − 1.2 | 7.9 | 8.9 | 10.5 |
| Ex. B-7 | n − 1.4 | 7.6 | 8.7 | 10.6 |
| Ex. B-8 | n − 1.5 | 7.8 | 8.8 | 10.7 |
| Compara. Ex. B-5 | n − 1.6 | 8 | 10.5 | 12.1 |
| Compara. Ex. B-6 | n − 2 | 10.7 | 13.4 | 14.6 |

Examples B-9 to B-12 and Comparative Examples B-7 to B-9

A two-layered optical recording medium was produced in the same manner as in Example B-1 except that the thickness of the first recording layer was changed to 8 nm, and the recording test for the two-layered optical recording medium was performed in the same manner as in Example B-1. The light transmittance of the first information layer after the initialization was 38.5%, and it was confirmed that a sufficient light transmittance was obtained. The light transmittance was measured using ETA-Optik manufactured by STEAG AG.

Table 9 shows the test results. The test results shown in Table 9 were the optimum jitters among the jitters obtained when a recording power was changed from 34 mW to 40 mW.

Recording was performed on the second information layer with recording strategies of 1T cycle and 2T cycle. In the result,, the recording power of the recording strategy of 1T cycle and the recording strategy of 2T cycle at which a modulation degree of 60% was obtained was approx. 54 mw for 1T cycle and approx. 46 mW for 2T cycle, and the recording sensitivity when recording was performed with recording strategy of 2T cycle was more excellent than with recording strategy of 1T cycle. There was little difference in recording power depending on difference in Tr in Examples B-9 to B-12.

TABLE 9

| Recording linear velocity 9.2 m/s | Tr [T] | DOW 10 | DOW 100 | DOW 500 |
|---|---|---|---|---|
| Compara. Ex. B-7 | n − 0.9 | 7.9 | 9.3 | 11.2 |
| Ex. B-9 | n − 1 | 7.8 | 8.5 | 10.8 |
| Ex. B-10 | n − 1.2 | 7.6 | 7.9 | 8.7 |
| Ex. B-11 | n − 1.4 | 7.3 | 7.8 | 9.0 |
| Ex. B-12 | n − 1.5 | 7.5 | 8.8 | 9.8 |
| Compara. Ex. B-8 | n − 1.6 | 7.9 | 9.5 | 11.1 |
| Compara. Ex. B-9 | n − 2 | 8.9 | 11.1 | 12.9 |

Examples B-13 to B-16 and Comparative Examples B-10 to B-12

The same two-layered optical recording medium as in Example B-1 was used to perform the recording test.

The recording liner velocity was set at 4.6 m/s, recording strategy of 1T cycle was used, and the pulse width was set at 0.125T.

Table 10 shows the test results. The test results shown in Table 10 were the optimum jitters among the jitters obtained when a recording power was changed from 28 mW to 34 mW.

Recording was performed on the second information layer with recording strategies of 1T cycle and 2T cycle. In the result,, the recording power of the recording strategy of 1T cycle and the recording strategy of 2T cycle at which a modulation degree of 60% was obtained was approx. 42 mW for 1T cycle and approx. 35 mW for 2T cycle, and the recording sensitivity when recording was performed with recording strategy of 2T cycle was more excellent than with recording strategy of 1T cycle. There was little difference in recording power depending on difference in Tr in Examples B-13 to B-16.

TABLE 10

| Recording linear velocity 4.6 m/s | Tr [T] | DOW 10 | DOW 100 | DOW 500 |
|---|---|---|---|---|
| Compara. Ex. B-10 | n − 0.9 | 8.2 | 9.6 | 11.8 |
| Ex. B-13 | n − 1 | 8.2 | 8.8 | 10.9 |
| Ex. B-14 | n − 1.2 | 7.9 | 8.6 | 9.2 |
| Ex. B-15 | n − 1.4 | 7.6 | 8.5 | 9.5 |
| Ex. B-16 | n − 1.5 | 7.8 | 9 | 10.1 |
| Compara. Ex. B-11 | n − 1.6 | 8.2 | 9.6 | 12.2 |
| Compara. Ex. B-12 | n − 2 | 9.1 | 11.5 | 14.2 |

TABLE 11

| | Recording linear velocity [m/s] | Recording Layer | Recording Power Pp [mW] | Erasing Power Pe [mW] | ε | Pc1 [mW] | Pc2 [mW] | δ1 | δ2 | Bottom Jitter [%] | Used pulse waveform shown in FIG. |
|---|---|---|---|---|---|---|---|---|---|---|---|
| Ex. B-10 | 8.4 | First | 44 | 7.9 | 0.18 | 4.0 | — | 0.09 | — | 8.5 | FIG. 11 |
| | | Second | 48 | 18.2 | 0.38 | 9.1 | — | 0.19 | — | 8.1 | |
| Compara. Ex. B-9 | | First | 44 | 7.9 | 0.18 | 4.0 | — | 0.09 | — | 8.5 | |
| | | Second | 48 | 8.6 | 0.18 | 4.3 | — | 0.09 | — | 9.7 | |
| Ex. B-11 | 9.9 | First | 46 | 8.3 | 0.18 | 4.1 | — | 0.09 | — | 8.6 | FIG. 11 |
| | | Second | 50 | 18.5 | 0.37 | 9.0 | — | 0.18 | — | 8.2 | |
| Compara. Ex. B-10 | | First | 46 | 8.3 | 0.18 | 4.1 | — | 0.09 | — | 8.6 | |
| | | Second | 52 | 9.4 | 0.18 | 4.7 | — | 0.09 | — | 9.8 | |
| Ex. B-12 | 11.5 | First | 50 | 8.5 | 0.17 | 4.5 | — | 0.09 | — | 9.6 | FIG. 11 |
| | | Second | 56 | 19.6 | 0.35 | 9.5 | — | 0.17 | — | 8.7 | |
| Compara. Ex. B-11 | | First | 50 | 8.5 | 0.17 | 4.5 | — | 0.09 | — | 9.6 | |
| | | Second | 56 | 9.5 | 0.17 | 5.0 | — | 0.09 | — | 10.1 | |
| Ex. B-13 | 8.4 | First | 44 | 7.9 | 0.18 | 4.0 | — | 0.09 | — | 8.5 | FIG. 13 |
| | | Second | 50 | 19.0 | 0.38 | 9.5 | — | 0.19 | — | 8.1 | |
| Compara. Ex. B-12 | | First | 44 | 7.9 | 0.18 | 4.0 | — | 0.09 | — | 8.5 | |
| | | Second | 50 | 9.0 | 0.18 | 4.5 | — | 0.09 | — | 9.6 | |
| Ex. B-14 | 8.4 | First | 43 | 7.7 | 0.18 | 3.9 | — | 0.09 | — | 8.7 | FIG. 14 |
| | | Second | 48 | 18.7 | 0.39 | 9.1 | — | 0.19 | — | 8.5 | |
| Compara. Ex. B-13 | | First | 43 | 7.7 | 0.18 | 3.9 | — | 0.09 | — | 8.7 | |
| | | Second | 48 | 8.6 | 0.18 | 4.3 | — | 0.09 | — | 10.0 | |
| Ex. B-15 | 8.4 | First | 42.5 | 7.7 | 0.18 | 3.8 | 2.1 | 0.09 | 0.05 | 8.6 | FIG. 12 |
| | | Second | 48 | 18.7 | 0.39 | 9.1 | 4.3 | 0.19 | 0.09 | 8.4 | |
| Compara. Ex. B-14 | | First | 42.5 | 7.7 | 0.18 | 3.8 | 2.1 | 0.09 | 0.05 | 8.6 | |
| | | Second | 48 | 8.6 | 0.18 | 4.3 | 2.4 | 0.09 | 0.05 | 10.0 | |

Example B-17 and Comparative Example B-13

The same two-layered optical recording medium as in Example B-1 was used to perform the recording test.

As shown in FIG. 25, the repetitive recording property at the time when recording was performed on the first recording layer with recording strategy of 1T cycle was more improved than with the recording strategy of 2T cycle. The recording power in the recording strategy of 1T cycle was 37 mW, and the recording power in the recording strategy of 2T cycle was 31 mW.

Example B-1 and Comparative Example B-14

The same two-layered optical recording medium as in Example B-1 was used to perform the recording test.

As shown in FIGS. 26 and 27, the recording sensitivity at the time when recording was performed on the second recording layer with recording strategy of 2T cycle was more excellent than with the recording strategy of 1T cycle.

Next, a two-layered optical recording medium as shown in FIG. 17 was produced in the manner as described in Examples B-19 to B-35 and Comparative Examples B-15 to B-28 to evaluate the two-layered optical recording medium.

A first substrate made from polycarbonate resin having a diameter of 12 cm, a thickness of 0.6 mm, and concaves-convexes for tracking guide being a continuously wobbling groove (wobble groove) with a track pitch of 0.74 μm on the one side thereof was prepared, and the following individual layers were formed on the first substrate in the presence of Ar gas by sputtering method, using a sputtering apparatus having 8 chambers (manufactured by Balzers AG).

First, on the first substrate, a first lower protective layer made from ZnS (80 mole %)-$SiO_2$ (20 mole %) having a thickness of 60 nm was formed.

Next, on the first lower protective layer, a first recording layer made from $Ag_{0.2}In_5Sb_{69.8}Ge_5Te_{20}$ having a thickness of 8 nm was formed.

On the first recording layer, a first upper protective layer made from $In_2O_3$ (7.5 mole %)-ZnO (22.5 mole %)-$SnO_2$ (60 mole %)-$Ta_2O_5$ (10 mole %) having a thickness of 5 nm was formed.

On the first upper protective layer, a first reflective layer made from Cu having a thickness of 8 nm was formed.

On the first reflective layer, a thermal diffusion layer made from $In_2O_3$ (90 mole %)-ZnO (10 mole %) having a thickness of 140 nm was formed.

With the layer structure described above, a first information layer was formed on the first substrate.

Here, the light transmittance of the first information layer was measured using ETA-Optik manufactured by STEAG AG, and the light transmittance was 41%.

Next, a second substrate similar to the first substrate was prepared, and each individual layers were formed on the second substrate by sputtering in the same manner as the first substrate.

First, on the second substrate, a second reflective layer made from Ag having a thickness of 140 nm was formed.

On the second reflective layer, a second upper protective layer made from $SnO_2$ (80 mole %)-$Ta_2O_5$ (4 mole %)-$Al_2O_3$ (16 mole %) having a thickness of 11 nm was formed.

On the second upper protective layer, a second recording layer made from $Ag_{0.2}In_{3.5}Sb_{71.4}Te_{21.4}Ge_{3.5}$ having a thickness of 14 nm was formed.

On the second recording layer, a second lower protective layer made from ZnS (80 mole %)-$SiO_2$ (20 mole %) having a thickness of 120 nm was formed.

With the layer structure described above, a second information layer was formed on the first substrate.

Next, the first information layer and the second information layer were initialized by irradiating the information layers with a laser beam from the first substrate and the layer surface of the second information layer, respectively. The initialization was performed by concentrating the laser beam emitted from a laser diode (emission wavelength: 810±10 nm) through an optical pickup (numerical aperture (NA)= 0.55). For the initialization conditions, the optical recording medium was rotated in Constant Linear Velocity (CLV) mode at a linear velocity of 3 m/s, a feed per revolution of 36 μm/revolution, a radius position of 23 mm to 58 mm, and an initialization power of 700 mW.

Next, ultraviolet curable resin (KARAYAD DVD003M, manufactured by Nippon Kayaku Co., Ltd.) was coated on the layer surface of the first information layer, and the layer surface of the second information layer was bonded to the layer surface of the first information layer and spin-coated to cure the ultraviolet curable resin by irradiating the ultraviolet curable resin with ultraviolet rays from the first substrate side to form an intermediate layer having a thickness of 55 μm and to thereby produce a two-layered phase-change optical recording medium having two information layers.

Push-pull (PP) signals of the continuous wobble groove formed on the substrate of the obtained two-layered optical recording medium were evaluated. The push-pull signal of the first information layer (hereinafter referred to as "PP1") was 0.45, and the push-pull signal of the second information layer (hereinafter referred to as "PP2") was 0.43. " PP" is a physical value necessary for easy tracking on the continuous wobble groove. When the value PP is excessively small or excessively large, there is a problem that it is difficult for an apparatus for reproducing signals to perform tracking. The values PP1 and PP2 obtained here were both favorable values. Carrier-to-noise (WCN) of the wobble groove was measured. The carrier-to-noise of signals in the first information layer (hereinafter, referred to as "WCN1") was 50 dB, and the carrier-to-noise of signals in the second information layer (hereinafter, referred to as "WCN2") was 46 dB. Here, when the value WCN is smaller than a certain value, it is unfavorable because it shows that a substrate having a low wobble periodicity and poor uniformity is prepared. However, the values WCN1 and WCN2 obtained here were both favorable values.

Using the obtained two-layered optical recording medium, recording was performed by changing recording conditions as described below.

Example B-19

Using a pulse waveform shown in FIG. 11, recording was performed with setting values of a recording liner velocity of 14 m/s, a recording power Pp of 46 mW, an erasing power Pe of 7 mW, a cooling power Pc1 of 4 mW, and a bias power Pb of 0.1 mW. The multi-pulse width was set at 0.3T.

In the result, the DC jitter showed a favorable value of 10.7%.

Comparative Example B-15

Using a pulse waveform shown in FIG. 16, recording was performed with setting values of a recording liner velocity of 14 m/s, a recording power Pp of 46 mW, an erasing power Pe of 7 mW, and a bias power Pb of 0.1 mW. The multi-pulse width was set at 0.3T.

In the result, the DC jitter was 13.7%, and the DC jitter property was poorer than in Example B-19.

Example B-20

Using a pulse waveform shown in FIG. 11, recording was performed with setting values of a recording liner velocity of 8.41 m/s, a recording power Pp of 38 mW, an erasing power Pe of 6.8 mW, a cooling power Pc1 of 3.9 mW, and a bias power Pb of 0.1 mW. The multi-pulse width was set at 0.2T.

In the result, the DC jitter showed a favorable value of 10.3%.

Comparative Example B-16

Using a pulse waveform shown in FIG. 16, recording was performed with setting values of a recording liner velocity of 8.41 m/s, a recording power Pp of 38 mW, an erasing power Pe of 6.8 mW, and a bias power Pb of 0.1 mW. The multi-pulse width was set at 0.2T.

In the result, the DC jitter was 12.5%, and the DC jitter property was poorer than in Example B-20.

Example B-21

Using a pulse waveform shown in FIG. 11, recording was performed with setting values of a recording liner velocity of 7 m/s, a recording power Pp of 36 mW, an erasing power Pe of 6.6 mW, a cooling power Pc1 of 3.5 mW, and a bias power Pb of 0.1 mW. The multi-pulse width was set at 0.18T.

In the result, the DC jitter showed a favorable value of 10.4%.

Comparative Example B-17

Using a pulse waveform shown in FIG. 16, recording was performed with setting values of a recording liner velocity of 7 m/s, a recording power Pp of 36 mW, an erasing power Pe of 6.6 mW, and a bias power Pb of 0.1 mW. The multi-pulse width was set at 0.18T.

In the result, the DC jitter was 12.9%, and the DC jitter property was poorer than in Example B-21.

Example B-22

Using a pulse waveform shown in FIG. 11, recording was performed with setting values of a recording liner velocity of 3.5 m/s, a recording power Pp of 33 mW, an erasing power Pe of 6.3 mW, a cooling power Pc1 of 3.4 mW, and a bias power Pb of 0.1 mW. The multi-pulse width was set at 0.13T.

In the result, the DC jitter showed a favorable value of 9.8%.

Comparative Example B-18

Using a pulse waveform shown in FIG. 16, recording was performed with setting values of a recording liner velocity of 3.5 m/s, a recording power Pp of 33 mW, an erasing power Pe of 6.3 mW, and a bias power Pb of 0.1 mW. The multi-pulse width was set at 0.13T.

In the result, the DC jitter was 11.5%, and the DC jitter property was poorer than in Example B-22.

Example B-23

Using a pulse waveform shown in FIG. 13, recording was performed with setting values of a recording liner velocity of 14 m/s, a recording power Pp of 46 mW, an erasing power Pe of 7.2 mW, a cooling power Pc1 of 4.2 mW, and a bias power Pb of 0.1 mW. The multi-pulse width was set at 0.3T.

In the result, the DC jitter showed a favorable value of 10.8%.

Comparative Example B-19

Using a pulse waveform shown in FIG. 16, recording was performed with setting values of a recording liner velocity of 14 m/s, a recording power Pp of 46 mW, an erasing power Pe of 7.2 mW, and a bias power Pb of 0.1 mW. The multi-pulse width was set at 0.3T.

In the result, the DC jitter was 13.9%, and the DC jitter property was poorer than in Example B-23.

Example B-24

Using a pulse waveform shown in FIG. 13, recording was performed with setting values of a recording liner velocity of 8.41 m/s, a recording power Pp of 40 mW, an erasing power Pe of 7 mW, a cooling power Pc1 of 4 mW, and a bias power Pb of 0.1 mW. The multi-pulse width was set at 0.4T.

In the result, the DC jitter showed a favorable value of 10.1%.

Comparative Example B-20

Using a pulse waveform shown in FIG. 16, recording was performed with setting values of a recording liner velocity of 8.41 m/s, a recording power Pp of 40 mW, an erasing power Pe of 7 mW, and a bias power Pb of 0.1 mW. The multi-pulse width was set at 0.4T.

In the result, the DC jitter was 12.9%, and the DC jitter property was poorer than in Example B-24.

Example B-25

Using a pulse waveform shown in FIG. 14, recording was performed with setting values of a recording liner velocity of 8.41 m/s, a recording power Pp of 40 mW, an erasing power Pe of 7.3 mW, a cooling power Pc1 of 4.3 mW, and a bias power Pb of 0.1 mW. The multi-pulse width was set at 0.2T.

In the result, the DC jitter showed a favorable value of 10.1%.

Comparative Example B-21

Using a pulse waveform shown in FIG. 16, recording was performed with setting values of a recording liner velocity of 8.41 m/s, a recording power Pp of 40 mW, an erasing power Pe of 7.3 mW, and a bias power Pb of 0.1 mW. The multi-pulse width was set at 0.2T.

In the result, the DC jitter was 12.1%, and the DC jitter property was poorer than in Example B-25.

Example B-26

Using a pulse waveform shown in FIG. 14, recording was performed with setting values of a recording liner velocity of 7 m/s, a recording power Pp of 36 mW, an erasing power Pe of 7.1 mW, a cooling power Pc1 of 4.1 mW, and a bias power Pb of 0.1 mW. The multi-pulse width was set at 0.18T.

In the result, the DC jitter showed a favorable value of 10.6%.

Comparative Example B-22

Using a pulse waveform shown in FIG. 16, recording was performed with setting values of a recording liner velocity of 7 m/s, a recording power Pp of 36 mW, an erasing power Pe of 7.1 mW, and a bias power Pb of 0.1 mW. The multi-pulse width was set at 0.18T.

In the result, the DC jitter was 12.8%, and the DC jitter property was poorer than in Example B-26.

Example B-27

Using a pulse waveform shown in FIG. 12, recording was performed with setting values of a recording liner velocity of 8.41 m/s, a recording power Pp of 39 mW, an erasing power Pe of 7 mW, cooling power Pc1 of 4 mW and Pc2 of 2 mW, and a bias power Pb of 0.1 mW. The multi-pulse width was set at 0.2T.

In the result, the DC jitter showed a favorable value of 10.5%.

Example B-28

On a first substrate made from polycarbonate resin having a diameter of 12 cm, a thickness of 0.6 mm, and concaves-convexes for tracking guide being a continuously wobbling groove (wobble groove) with a track pitch of 0.74 μm on the one side thereof, a first lower protective layer made from ZnS (80 mole %)-$SiO_2$ (20 mole %) having a thickness of 60 nm, a first recording layer made from $Ag_{0.2}In_{3.5}Sb_{71.4}Te_{21.4}Ge3.5$ having a thickness of 8 nm, a first upper protective layer made from $In_2O_3$ (7.5 mole %)-ZnO (22.5 mole %)-$SnO_2$ (60 mole %)-$Ta_2O_5$ (10 mole %) having a thickness of 5 nm, a first reflective layer made from Cu containing 1.0% by mass Mo having a thickness of 8 nm, and a thermal diffusion layer made from In2O3 (90 mole %)-ZnO (10 mole %) having a thickness of 60 nm were formed in the presence of Ar gas by sputtering method in this order to thereby form a first information layer. The sputtering was performed using the sputtering apparatus used in Example B-19.

A substrate similar to the first substrate was used as a second substrate. On the second substrate, a second reflective heat dissipation layer made from Ag having a thickness of 140 nm, a second upper protective layer made from $In_2O_3$ (7.5 mole %)-ZnO (22.5 mole %)-$SnO_2$ (60 mole %)-$Ta_2O_5$ (10 mole %) having a thickness of 20 nm, a second recording layer made from $Ag_{0.2}In_{3.5}Sb_{71.4}Te_{21.4}Ge_{3.5}$ having a thickness of 15 nm, and a second lower protective layer made from ZnS (80 mole %)-$SiO_2$ (20 mole %) having a thickness of 120 nm were formed in this order in the same manner as in the first information layer to thereby form a second information layer.

Next, the first information layer and the second information layer were initialized by irradiating the information layers with a laser beam from the first substrate and the layer surface of the second information layer, respectively. The initialization was performed by concentrating the laser beam emitted from a laser diode (emission wavelength: 810±10 nm) through an optical pickup (numerical aperture (NA)= 0.55). For the initialization conditions for the first recording layer, the optical recording medium was rotated in Constant Linear Velocity (CLV) mode at a liner velocity of 3 m/s, a feed per revolution of 36 μm/revolution, an initialization power of 900 mW, a radius position of 23 mm to 58 mm, and an initialization power of 700 mW. For the initialization conditions for the second recording layer, the optical recording medium was rotated in Constant Linear Velocity (CLV) mode at a liner velocity of 3 m/s, a feed per revolution of 36 μm/revolution, a radius position of 23 mm to 58 mm, and an initialization power of 500 mW.

The light transmittance of the first information layer after the initialization was 40%, and it was confirmed that a sufficient light transmittance was obtained. The light transmittance was measured using ETA-Optik manufactured by STEAG AG.

Next, ultraviolet curable resin (KARAYAD DVD003M, manufactured by Nippon Kayaku Co., Ltd.) was coated on the layer surface of the first information layer, and the layer surface of the second information layer was bonded to the layer surface of the first information layer and spin-coated to cure the ultraviolet curable resin by irradiating the ultraviolet curable resin with ultraviolet rays from the first substrate side to form an intermediate layer having a thickness of 55 μm and to thereby produce a two-layered phase-change optical recording medium having two information layers.

Push-pull (PP) signals of the continuous wobble groove formed on the substrate of the obtained two-layered optical recording medium were evaluated. The value PP1 was 0.47, and the value PP2 was 0.42. The values PP1 and PP2 obtained here were both favorable values. In addition, the value WCN1 was 51 dB, and the value WCN2 was 45 dB, and values WCN1 and WCN2 obtained here were both favorable values.

Using a pulse waveform shown in FIG. 11, recording was performed on the thus produced two-layered phase-change optical recording medium at a recording linear velocity of 8.4 m/s. The power ratio used for recording on the first information and for the second information layer was different from each other. Table 13 and FIG. 20 show the results.

Comparative Example B-23

Recording was performed on a two-layered phase-change optical recording medium having the same layer structure and layer thicknesses as the two-layered phase-change optical recording medium produced in Example B-28 in the same manner as in Example B-28 except that the ratio ε of the recording power level Pp to the erasing power level Pe and the ratio δ of the recording power level Pp to the cooling power level Pc1 for the first recording layer and the second recording layer were set as same values. Table 13 and FIG. 20 show the results.

Example B-29

Using a pulse waveform shown in FIG. 11, recording was performed on a two-layered phase-change optical recording medium having the same layer structure and layer thicknesses as the two-layered phase-change optical recording medium produced in Example B-28 at a recording liner velocity of 9.9 m/s. The power ratio used for recording on the first information and for the second information layer was different from each other.

Comparative Example B-24

Recording was performed on a two-layered phase-change optical recording medium having the same layer structure and layer thicknesses as the two-layered phase-change optical recording medium produced in Example B-28 in the same manner as in Example B-29 except that the ratio ε of the recording power level Pp to the erasing power level Pe and the ratio δ of the recording power level Pp to the cooling power level Pc1 for the first recording layer and the second recording layer were set as same values.

Example B-30

Using a pulse waveform shown in FIG. 11, recording was performed on a two-layered phase-change optical recording medium having the same layer structure and layer thicknesses as the two-layered phase-change optical recording medium produced in Example B-28 at a recording liner velocity of 11.5 m/s. The power ratio used for recording on the first information layer and for the second information layer was different from each other.

Comparative Example B-25

Recording was performed on a two-layered phase-change optical recording medium having the same layer structure and layer thicknesses as the two-layered phase-change optical recording medium produced in Example B-28 in the same manner as in Example B-30 except that the ratio $\epsilon$ of the recording power level Pp to the erasing power level Pe and the ratio $\delta$ of the recording power level Pp to the cooling power level Pc1 for the first recording layer and the second recording layer were set as same values.

Example B-31

Using a pulse waveform shown in FIG. 13, recording was performed on a two-layered phase-change optical recording medium having the same layer structure and layer thicknesses as the two-layered phase-change optical recording medium produced in Example B-28 at a recording liner velocity of 8.4 m/s. The power ratio used for recording on the first information and for the second information layer was different from each other.

Comparative Example B-26

Recording was performed on a two-layered phase-change optical recording medium having the same layer structure and layer thicknesses as the two-layered phase-change optical recording medium produced in Example B-28 in the same manner as in Example B-31 except that the ratio E of the recording power level Pp to the erasing power level Pe and the ratio $\delta$ of the recording power level Pp to the cooling power level Pc1 for the first recording layer and the second recording layer were set as same values.

Example B-32

Using a pulse waveform shown in FIG. 14, recording was performed on a two-layered phase-change optical recording medium having the same layer structure and layer thicknesses as the two-layered phase-change optical recording medium produced in Example B-28 at a recording liner velocity of 8.4 m/s. The each power ratio used for recording on the first information and for the second information layer was different from each other.

Comparative Example B-27

Recording was performed on a two-layered phase-change optical recording medium having the same layer structure and layer thicknesses as the two-layered phase-change optical recording medium produced in Example B-28 in the same manner as in Example B-32 except that the ratio $\epsilon$ of the recording power level Pp to the erasing power level Pe and the ratio $\delta$ of the recording power level Pp to the cooling power level Pc1 for the first recording layer and the second recording layer were set as same values.

Example B-33

Using a pulse waveform shown in FIG. 12, recording was performed on a two-layered phase-change optical recording medium having the same layer structure and layer thicknesses as the two-layered phase-change optical recording medium produced in Example B-28 at a recording liner velocity of 8.4 m/s. The each power ratio used for recording on the first information and for the second information layer was different from each other.

TABLE 12

| Recording linear velocity 9.2 m/s | Tr [T] | DOW 10 | DOW 100 | DOW 500 |
|---|---|---|---|---|
| Compara. Ex. B-19 | n − 0.9 | 8.5 | 10.5 | 12.2 |
| Ex. B-30 | n − 1 | 8.3 | 9.3 | 10.9 |
| Ex. B-31 | n − 1.2 | 7.9 | 9.1 | 10.8 |
| Ex. B-32 | n − 1.4 | 7.7 | 8.9 | 10.7 |
| Ex. B-33 | n − 1.5 | 8.0 | 9.0 | 10.9 |
| Compara. Ex. B-20 | n − 1.6 | 8.5 | 10.7 | 12.4 |
| Compara. Ex. B-21 | n − 2 | 11.1 | 13.8 | 15.6 |

Comparative Example B-28

Recording was performed on a two-layered phase-change optical recording medium having the same layer structure and layer thicknesses as the two-layered phase-change optical recording medium produced in Example B-28 in the same manner as in Example B-33 except that the ratio $\epsilon$ of the recording power level Pp to the erasing power level Pe and the ratio $\delta$ of the recording power level Pp to the cooling power level Pc1 for the first recording layer and the second recording layer were set as same values.

Table 13 shows the evaluation results of recording properties of the two-layered phase-change optical recording media in Examples B-28 to B-33 and Comparative Examples B-23 to B-28.

TABLE 13

| | Recording linear velocity [m/s] | Recording Layer | Recording Power Pp [mW] | Erasing Power Pe [mW] | $\epsilon$ | Pc1 [mW] | Pc2 [mW] | $\delta 1$ | $\delta 2$ | Bottom Jitter [%] | Used pulse waveform shown in FIG. |
|---|---|---|---|---|---|---|---|---|---|---|---|
| Ex. B-28 | 8.4 | First | 44 | 7.9 | 0.18 | 4.0 | — | 0.09 | — | 8.5 | FIG. 11 |
| | | Second | 48 | 18.2 | 0.38 | 9.1 | — | 0.19 | — | 8.1 | |
| Compara. Ex. B-23 | | First | 44 | 7.9 | 0.18 | 4.0 | — | 0.09 | — | 8.5 | |
| | | Second | 48 | 8.6 | 0.18 | 4.3 | — | 0.09 | — | 9.7 | |
| Ex. B-29 | 9.9 | First | 46 | 8.3 | 0.18 | 4.1 | — | 0.09 | — | 8.6 | FIG. 11 |
| | | Second | 50 | 18.5 | 0.37 | 9.0 | — | 0.18 | — | 8.2 | |

TABLE 13-continued

| | Recording linear velocity [m/s] | Recording Layer | Recording Power Pp [mW] | Erasing Power Pe [mW] | ε | Pc1 [mW] | Pc2 [mW] | δ1 | δ2 | Bottom Jitter [%] | Used pulse waveform shown in FIG. |
|---|---|---|---|---|---|---|---|---|---|---|---|
| Compara. Ex. B-24 | | First | 46 | 8.3 | 0.18 | 4.1 | — | 0.09 | — | 8.6 | |
| | | Second | 52 | 9.4 | 0.18 | 4.7 | — | 0.09 | — | 9.8 | |
| Ex. B-30 | 11.5 | First | 50 | 8.5 | 0.17 | 4.5 | — | 0.09 | — | 9.6 | FIG. 11 |
| | | Second | 56 | 19.6 | 0.35 | 9.5 | — | 0.17 | — | 8.7 | |
| Compara. Ex. B-25 | | First | 50 | 8.5 | 0.17 | 4.5 | — | 0.09 | — | 9.6 | |
| | | Second | 56 | 9.5 | 0.17 | 5.0 | — | 0.09 | — | 10.1 | |
| Ex. B-31 | 8.4 | First | 44 | 7.9 | 0.18 | 4.0 | — | 0.09 | — | 8.5 | FIG. 13 |
| | | Second | 50 | 19.0 | 0.38 | 9.5 | — | 0.19 | — | 8.1 | |
| Compara. Ex. B-26 | | First | 44 | 7.9 | 0.18 | 4.0 | — | 0.09 | — | 8.5 | |
| | | Second | 50 | 9.0 | 0.18 | 4.5 | — | 0.09 | — | 9.6 | |
| Ex. B-32 | 8.4 | First | 43 | 7.7 | 0.18 | 3.9 | — | 0.09 | — | 8.7 | FIG. 14 |
| | | Second | 48 | 18.7 | 0.39 | 9.1 | — | 0.19 | — | 8.5 | |
| Compara. Ex. B-27 | | First | 43 | 7.7 | 0.18 | 3.9 | — | 0.09 | — | 8.7 | |
| | | Second | 48 | 8.6 | 0.18 | 4.3 | — | 0.09 | — | 10.0 | |
| Ex. B-33 | 8.4 | First | 42.5 | 7.7 | 0.18 | 3.8 | 2.1 | 0.09 | 0.05 | 8.6 | FIG. 12 |
| | | Second | 48 | 18.7 | 0.39 | 9.1 | 4.3 | 0.19 | 0.09 | 8.4 | |
| Compara. Ex. B-28 | | First | 42.5 | 7.7 | 0.18 | 3.8 | 2.1 | 0.09 | 0.05 | 8.6 | |
| | | Second | 48 | 8.6 | 0.18 | 4.3 | 2.4 | 0.09 | 0.05 | 10.0 | |

Example B-34

Using a pulse waveform shown in FIG. 11, to a two-layered phase-change optical recording medium having the same layer structure and layer thicknesses as the two-layered phase-change optical recording medium produced in Example B-28, recording was performed on the second recording layer with recording strategy of 2T cycle at a recording liner velocity of 8.4 m/s.

Figure 22:
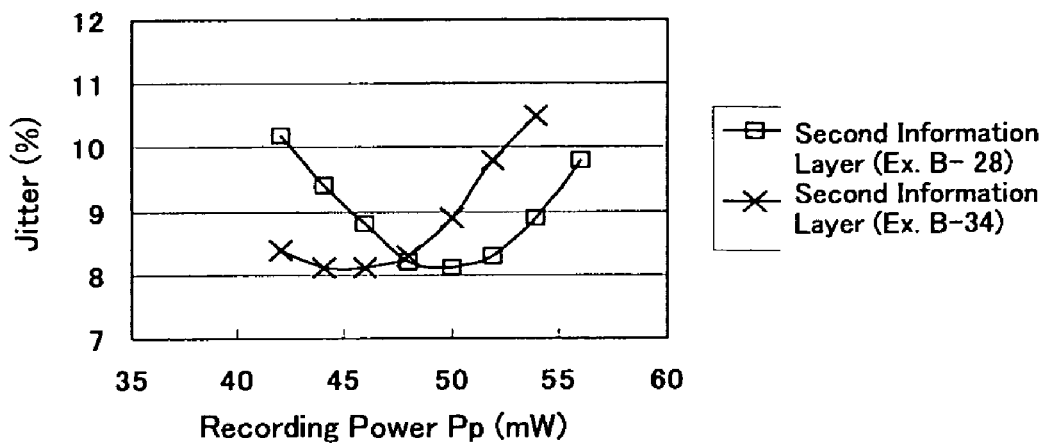
FIG. 22 is a graph showing recording property of the second information layer of a two-layered phase-change optical recording medium prepared in Example B-34 compared to that of a two-layered phase-change optical recording medium prepared in Example B-28.

FIG. 22 shows the results. It shows that the recording sensitivity with the recording strategy of 2T cycle gave around 10% more excellent ratings than in Example B-28 where recording was performed with recording strategy of 1T cycle.

Example B-35

Recording was performed on a two-layered phase-change optical recording medium having the same layer structure and layer thicknesses as the two-layered phase-change optical recording medium produced in Example B-28 with recording strategy of 1T cycle at a recording liner velocity of 8.4 m/s, a recording power Pp of 42 mW, an erasing power Pe of 7 mW, and Pe⁻ of 4 mW.

Table 14 shows the results. It shows that the repetitive recording properties of the first information layer were improved, compared to the conventional recording method as shown in FIGS. 15 and 16. It is noted that in conventional method, it is clear that repetitive recording of the second time or more show poorer results than in the first recording, and there is no point in showing the resultant numerical values, therefore, no repetitive recording in conventional method was measured.

TABLE 14

First information layer
Recording linear velocity 8.4 m/s
1T cycle recording strategy
Recording Power Pp = 42 mW

| No. of repetitive recording times | Conventional recording method (FIGS. 15 & 16) Jitter (%) | Recording method of the present invention Jitter (%) | Pe– added in the recording method of the present invention Jitter (%) |
|---|---|---|---|
| 1 | 8.8 | 8.7 | 8.7 |
| 5 | 9.5 | 8.9 | 8.9 |
| 10 | 9.5 | 8.8 | 8.6 |
| 50 | 9.7 | 8.9 | 8.6 |
| 100 | 10.1 | 9.2 | 8.7 |
| 200 | 11.2 | 10.5 | 9.5 |
| 500 | 13.4 | 12 | 10.6 |

Example B-36

A two-layered phase-change optical recording medium having the same layer structure and layer thicknesses as in Example B-28 was produced in the same manner as in Example B-28 except that the material for both the first recording layer and the second recording layer was changed to $Ag_{0.5}In_{3.9}Sb_{69.6}Te_{24}Ge_2$, and the material for the second upper protective layer was changed to ZnS (80 mole %)-SiO₂ (20 mole %). Using a pulse waveform as shown in FIG. 11, recording was performed with setting values of a recording liner velocity of 15.3 m/s, a recording power Pp of 30 mW, an erasing power Pe of 7 mW, a cooling power Pc1 of 4 mW, and a bias power Pb of 0.1 mW. The multi-pulse width was set at 0.3T.

The DC jitter after repeatedly recording 100 times on a track of the first recording layer showed a favorable value of 9.8%.

Comparative Example B-29

Using a pulse waveform shown in FIG. 16, recording was performed on a two-layered phase-change optical recording medium having the same layer structure and layer thicknesses as in Example B-36 with setting values of a recording liner velocity of 15.3 m/s, a recording power Pp of 30 mW, an erasing power Pe of 7 mW, and a bias power Pb of 0.1 mW. The multi-pulse width was set at 0.3T.

The DC jitter after repeatedly recording 100 times on a track of the first recording layer was 11.3% and was poorer than in Example B-36.

Example B-37

Using a pulse waveform as shown in FIG. 11, recording was performed on a two-layered phase-change optical recording medium having the same layer structure and layer thicknesses as in Example B-36 with setting values of a recording liner velocity of 9.2 m/s, a recording power Pp of 28 mW, an erasing power Pe of 6 mW, a cooling power Pc1 of 3 mW, and a bias power Pb of 0.1 mW. The multi-pulse width was set at 0.2T.

The DC jitter after repeatedly recording 100 times on a track of the first recording layer showed a favorable value of 9.6%.

TABLE 15

| Recording linear velocity 9.2 m/s | Tr [T] | DOW 10 | DOW 100 | DOW 500 |
|---|---|---|---|---|
| Compara. Ex. B-22 | n − 0.9 | 8.2 | 10.3 | 12.0 |
| Ex. B-34 | n − 1 | 8.1 | 9.1 | 10.7 |
| Ex. B-35 | n − 1.2 | 7.9 | 8.9 | 10.5 |
| Ex. B-36 | n − 1.4 | 7.6 | 8.7 | 10.6 |
| Ex. B-37 | n − 1.5 | 7.8 | 8.8 | 10.7 |
| Compara. Ex. B-23 | n − 1.6 | 8.0 | 10.5 | 12.1 |
| Compara. Ex. B-24 | n − 2 | 10.7 | 13.4 | 14.6 |

Comparative Example B-30

Using a pulse waveform shown in FIG. 16, recording was performed on a two-layered phase-change optical recording medium having the same layer structure and layer thicknesses as in Example B-36 with setting values of a recording liner velocity of 9.2 m/s, a recording power Pp of 28 mW, an erasing power Pe of 6 mW, and a bias power Pb of 0.1 mW. The multi-pulse width was set at 0.2T.

The DC jitter after repeatedly recording 100 times on a track of the first recording layer was 10.9% and was poorer than in Example B-37.

Example B-38

Using a pulse waveform as shown in FIG. 11, recording was performed on a two-layered phase-change optical recording medium having the same layer structure and layer thicknesses as in Example B-36 with setting values of a recording liner velocity of 8.4 m/s, a recording power Pp of 26 mW, an erasing power Pe of 6 mW, a cooling power Pc1 of 3 mW, and a bias power Pb of 0.1 mW. The multi-pulse width was set at 0.2T.

The DC jitter after repeatedly recording 100 times on a track of the first recording layer showed a favorable value of 10%.

Comparative Example B-31

Using a pulse waveform shown in FIG. 16, recording was performed on a two-layered phase-change optical recording medium having the same layer structure and layer thicknesses as in Example B-36 with setting values of a recording liner velocity of 8.4 m/s, a recording power Pp of 26 mW, an erasing power Pe of 6 mW, and a bias power Pb of 0.1 mW. The multi-pulse width was set at 0.2T.

The DC jitter after repeatedly recording 100 times on a track of the first recording layer was 11.1% and was poorer than in Example B-38.

Example B-39

Using a pulse waveform as shown in FIG. 13, recording was performed on a two-layered phase-change optical recording medium having the same layer structure and layer thicknesses as in Example B-36 with setting values of a recording liner velocity of 15.3 m/s, a recording power Pp of 30 mW, an erasing power Pe of 6.2 mW, a cooling power Pc1 of 2.8 mW, and a bias power Pb of 0.1 mW. The multi-pulse width was set at 0.3T.

The DC jitter after repeatedly recording 100 times on a track of the first recording layer showed a favorable value of 9.5%.

Example B-40

Using a pulse waveform as shown in FIG. 13, recording was performed on a two-layered phase-change optical recording medium having the same layer structure and layer thicknesses as in Example B-36 with setting values of a recording liner velocity of 9.2 m/s, a recording power Pp of 30 mW, an erasing power Pe of 6 mW, a cooling power Pc1 of 3 mW, and a bias power Pb of 0.1 mW. The multi-pulse width was set at 0.2T.

The DC jitter after repeatedly recording 100 times on a track of the first recording layer showed a favorable value of 9.6%.

Example B-41

Using a pulse waveform as shown in FIG. 14, recording was performed on a two-layered phase-change optical recording medium having the same layer structure and layer thicknesses as in Example B-36 with setting values of a recording liner velocity of 15.3 m/s, a recording power Pp of 30 mW, an erasing power Pe of 6.5 mW, a cooling power Pc1 of 3.2 mW, and a bias power Pb of 0.1 mW. The multi-pulse width was set at 0.3T.

The DC jitter after repeatedly recording 100 times on a track of the first recording layer showed a favorable value of 9.7%.

TABLE 16

| Recording linear velocity 9.2 m/s | Tr [T] | DOW 10 | DOW 100 | DOW 500 |
|---|---|---|---|---|
| Compara. Ex. B-25 | n − 0.9 | 7.9 | 9.3 | 11.2 |
| Ex. B-38 | n − 1 | 7.8 | 8.5 | 10.8 |
| Ex. B-39 | n − 1.2 | 7.6 | 7.9 | 8.7 |
| Ex. B-40 | n − 1.4 | 7.3 | 7.8 | 9.0 |
| Ex. B-41 | n − 1.5 | 7.5 | 8.8 | 9.8 |
| Compara. Ex. B-26 | n − 1.6 | 7.9 | 9.5 | 11.1 |
| Compara. Ex. B-27 | n − 2 | 8.8 | 11.1 | 12.9 |

Example B-42

Using a pulse waveform as shown in FIG. 14, recording was performed on a two-layered phase-change optical recording medium having the same layer structure and layer thicknesses as in Example B-36 with setting values of a recording liner velocity of 9.2 m/s, a recording power Pp of 28 mW, an erasing power Pe of 5.9 mW, a cooling power Pc1 of 2.8 mW, and a bias power Pb of 0.1 mW. The multi-pulse width was set at 0.2T.

The DC jitter after repeatedly recording 100 times on a track of the first recording layer showed a favorable value of 9.5%.

Example B-43

Using a pulse waveform as shown in FIG. 12, recording was performed on a two-layered phase-change optical recording medium having the same layer structure and layer thicknesses as in Example B-36 with setting values of a recording liner velocity of 15.3 m/s, a recording power Pp of 30 mW, an erasing power Pe of 7 mW, cooling power Pc1 of 4 mW and Pc2 of 2 mW, and a bias power Pb of 0.1 mW. The multi-pulse width was set at 0.3T.

The DC jitter after repeatedly recording 100 times on a track of the first recording layer showed a favorable value of 9.3%.

Example B-44

Using a pulse waveform as shown in FIG. 12, recording was performed on a two-layered phase-change optical recording medium having the same layer structure and layer thicknesses as in Example B-36 with setting values of a recording liner velocity of 9.2 m/s, a recording power Pp of 28 mW, an erasing power Pe of 6.2 mW, cooling power Pc1 of 4 mW and Pc2 of 2.1 mW, and a bias power Pb of 0.1 mW. The multi-pulse width was set at 0.2T.

The DC jitter after repeatedly recording 100 times on a track of the first recording layer showed a favorable value of 9.4%.

Example B-45

Using a pulse waveform as shown in FIG. 21, recording was performed on a two-layered phase-change optical recording medium having the same layer structure and layer thicknesses as in Example B-36 with setting values of a recording liner velocity of 15.3 m/s, a recording power Pp of 30 mW, an erasing power Pe of 7.2 mW, an erasing power Pe$^-$ of 4.2m W, a cooling power Pc1 of 6.6 mW, and a bias power Pb of 0.1 mW. The multi-pulse width was set at 0.3T.

The DC jitter after repeatedly recording 1,000 times on a track of the first recording layer showed a favorable value of 9.4%.

TABLE 17

| Recording Linear velocity 9.2 m/s | Tr [T] | DOW 10 | DOW 100 | DOW 500 |
|---|---|---|---|---|
| Compara. Ex. B-28 | n − 0.9 | 8.2 | 9.6 | 11.8 |
| Ex. B-42 | n − 1 | 8.2 | 8.8 | 10.9 |
| Ex. B-43 | n − 1.2 | 7.9 | 8.6 | 9.2 |
| Ex. B-44 | n − 1.4 | 7.6 | 8.5 | 9.5 |
| Ex. B-45 | n − 1.5 | 7.8 | 9.0 | 10.1 |
| Compara. Ex. B-29 | n − 1.6 | 8.2 | 9.6 | 12.2 |
| Compara. Ex. B-30 | n − 2 | 9.1 | 11.5 | 14.2 |

Example B-46

Using a pulse waveform as shown in FIG. 21, recording was performed on a two-layered phase-change optical recording medium having the same layer structure and layer thicknesses as in Example B-36 with setting values of a recording liner velocity of 9.2 m/s, a recording power Pp of 28 mW, an erasing power Pe of 6.8 mW and Pe$^-$ of 3.8 mW, a cooling power Pc1 of 3.8 mW, and a bias power Pb of 0.1 mW. The multi-pulse width was set at 0.2T.

The DC jitter after repeatedly recording 1,000 times on a track of the first recording layer showed a favorable value of 9.2%.

Example B-47

On a two-layered phase-change optical recording medium having the same layer structure and layer thicknesses as in Example B-36, recording was performed first in a radius position of 24 mm to 58 mm on the first information layer at a recording linear velocity of 9.2 m/s, and then recording was performed in a radius position of 40 mm on the second information layer at a recording linear velocity of 9.2 m/s.

Figure 23:
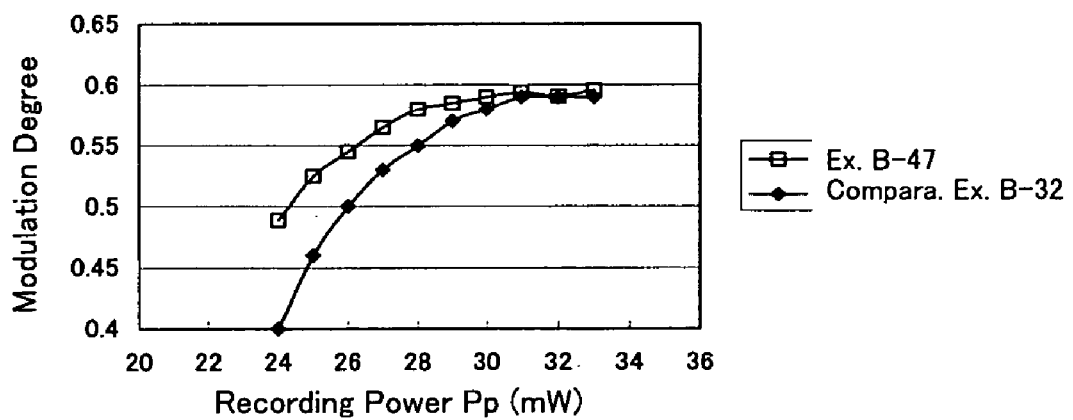
FIG. 23 is a graph showing modulation degrees obtained in Example B-47 compared to those obtained in Comparative Example B-32.

FIG. 23 shows the results. It shows that the recording method of Example B-47 enabled to obtain higher modulation degrees with lower power than in Comparative Example B-32.

Comparative Example 32

On a two-layered phase-change optical recording medium having the same layer structure and layer thicknesses as in Example B-36, recording was performed in a radius position of 40 mm on the second information layer at a recording linear velocity of 9.2 m/s, and no recording was performed on the first information layer.

FIG. 23 shows the results. It shows that the recording method exemplified poorer recording sensitivity and required higher power than in Example B-47.

The optical recording medium of the present invention, the optical recording method and the optical recording apparatus for the same can reduce jitter increase at an early stage of repetitive recording regardless of the early stage crystalline condition without causing degradation in repetitive recording endurance and increases in cross-talk even at high speed recording as fast as 6× DVD to 8× DVD or higher and can be applied to various compact discs (CD) and digital versatile discs (DVD).

The multi-layered optical recording medium of the present invention, the optical recording method and the optical recording apparatus for the same are capable of preventing thermal damage recording layers suffer, appropriately recording and erasing information, and improving the repetitive recording properties, and thus they are suitably used for multi-layered compact discs (CD), multi-layered digital versatile discs (DVD), and multi-layered optical recording media compatible for blue wavelengths.

What is claimed is:

1. A recording method for a multi-layered optical recording medium including M phase change recording layers, with $M \geq 2$, the method comprising:

recording a mark in a Kth one of said recording layers by using a laser to irradiate the Kth recording layer using a recording pulse train including a plurality of laser beam pulses, the recording pulse train for the Kth recording layer having a cycle of $t_{(K)}[T]$, where:

the 1st recording layer is the recording layer closest the laser beam, the Mth recording layer is the recording layer furthest from the laser beam, T is a clock cycle;

wherein the following relationship is satisfied:

$t_{(1)} < t_{(M)}$, and the cycle of recording pulse train does not decrease from one recording layer to the next recording layer in the direction in which the laser beam irradiates, and wherein marks are recorded on the recording layers other than the recording layer disposed at the innermost side as viewed from the laser beam irradiation side, and the recording marks are formed by a recording pulse train being set such that cooling power levels Pc1, Pc2, ..., PcN (where N is an integer of 1 or more) are modulated between a bias power level Pb and a recording power level Pp and are set between an erasing power level Pe and at least one bias power level Pb of the bias power level Pb anterior to a leading pulse and the bias power level Pb posterior to a last pulse so as to satisfy the following relation:

Pp>Pe>Pc1>Pc2 . . . >PcN>Pb.

2. A method according to claim 1, wherein the marks are formed by a recording pulse train being set such that the cooling power levels Pc1, Pc2, . . . , PcN (where N is an integer of 1 or more) are modulated between the bias power level Pb and the recording power level Pp and are set between the erasing power level Pe and the bias power level Pb anterior to the leading pulse so as to satisfy the following relation:

Pp>Pe>Pc1>Pc2 . . . >PcN>Pb.

3. A method according to claim 1, wherein the marks are formed by a recording pulse train being set such that the cooling power levels Pc1, Pc2, . . . , PcN (where N is an integer of 1 or more) are modulated between the bias power level Pb and the recording power level Pp and are set between the erasing power level Pe and the bias power level Pb posterior to the last pulse so as to satisfy the following relation:

Pp>Pe>Pc1>Pc2 . . . >PcN>Pb.

4. A method according to claim 1, wherein the marks are formed by a recording pulse train being set such that the cooling power levels Pc1, Pc2, PcN (where N is an integer of 1 or more) are modulated between the bias power level Pb and the recording power level Pp and are set between the erasing power level Pe and the bias power level Pb being anterior to the leading pulse and posterior to the last pulse so as to satisfy the following relation:

Pp>Pe>Pc1>Pc2 . . . >PcN>Pb.

5. A method according to claim 1, wherein the value N in the cooling power levels Pc1, Pc2, . . . , PcN is any one of integers from 1 to 3.

6. A method according to claim 1, wherein when information is recorded on each of the two or more phase-change recording layers, the information is recorded by varying at least one of a ratio e (Pe/Pp) between the recording power level Pp and the erasing power level Pe and a ratio d1, . . . dN (Pc1/Pp, . . . , PcN/Pp) between the recording power level Pp and the cooling power levels Pc1, Pc2, . . . , PcN for each of the two or more phase-change recording layers.

7. A method according to claim 1, wherein when the number of irradiation pulses of the recording power level Pp used at the time of recording a recording mark having a length of nT (where n is an integer of one or more, and T represents a clock cycle) is represented as m (where m is an integer of one or more), the relation n=2m is satisfied, provided that the value n is an even number, and the relation n=2m+1 is satisfied, provided that the value n is an odd number.

8. A method according to claim 7, wherein the mark is recorded by increasing only the shortest mark by one pulse.

9. An optical recording method for a multi-layered optical recording medium comprising:

irradiating a multi-layered optical recording medium having at least two or more phase-change recording layers on a substrate with a laser beam;

setting a recording pulse train which comprises a plurality of pulses for an emission waveform of the laser beam; and modulating the recording pulse train to thereby record recording marks on the multi-layered optical recording medium, wherein when the cycle of the recording pulse train used at the time of recording on the Kth recording layer (where K is an integer of 1 or more) viewed from the laser beam irradiation side based on a clock cycle T is represented as $t_{(k)}[T]$, the condition $1 \leq t_{(1)} \leq t_{(2)} \leq \ldots \leq t_{(k)} \leq t_{(K+1)}$ (where the condition is excluded when all the signs are represented by equals) is satisfied, and wherein recording marks are recorded on the recording layers other than the recording layer disposed at the innermost side as viewed from the laser beam irradiation side, and the recording marks are formed by a recording pulse train being set such that cooling power levels Pc1, Pc2, . . . , PcN (where N is an integer of 1 or more) are modulated between a bias power level Pb and a recording power level Pp and are set between an erasing power level Pe and at least one bias power level Pb of the bias power level Pb anterior to a leading pulse and the bias power level Pb posterior to a last pulse so as to satisfy the following relation:

Pp>Pe>Pc1>Pc2 . . . >PcN>Pb.

10. An optical recording method for a multi-layered optical recording medium according to claim 9, wherein the recording marks are formed by a recording pulse train being set such that the cooling power levels Pc1, Pc2, . . . , PcN (where N is an integer of 1 or more) are modulated between the bias power level Pb and the recording power level Pp and are set between the erasing power level Pe and the bias power level Pb anterior to the leading pulse so as to satisfy the following relation:

Pp>Pe>Pc1>Pc2 . . . >PcN>Pb.

11. An optical recording method for a multi-layered optical recording medium according to claim 9, wherein the recording marks are formed by a recording pulse train being set such that the cooling power levels Pc1, Pc2, . . . , PcN (where N is an integer of 1 or more) are modulated between the bias power level Pb and the recording power level Pp and are set between the erasing power level Pe and the bias power level Pb posterior to the last pulse so as to satisfy the following relation:

Pp>Pe>Pc1>Pc2 . . . >PcN>Pb.

12. An optical recording method for a multi-layered optical recording medium according to claim 9, wherein the recording marks are formed by a recording pulse train being set such that the cooling power levels Pc1, Pc2, ..., PcN (where N is an integer of 1 or more) are modulated between the bias power level Pb and the recording power level Pp and are set between the erasing power level Pe and the bias power level Pb being anterior to the leading pulse and posterior to the last pulse so as to satisfy the following relation:

$$Pp > Pe > Pc1 > Pc2 \ldots > PcN > Pb.$$

13. An optical recording method for a multi-layered optical recording medium according to claim 9, wherein the value N in the cooling power levels Pc1, Pc2, ..., PcN is any one of integers from 1 to 3.

14. An optical recording method for a multi-layered optical recording medium according to claim 9, wherein when information is recorded on each of the two or more phase-change recording layers, the information is recorded by varying at least one of a ratio $\epsilon$ (Pe/Pp) between the recording power level Pp and the erasing power level Pe and a ratio $\delta 1, \ldots \delta N$ (Pc1/Pp, ..., PcN/Pp) between the recording power level Pp and the cooling power levels Pc1, Pc2, ..., PcN for each of the two or more phase-change recording layers.

15. An optical recording method for a multi-layered optical recording medium according to claim 9, wherein when the number of irradiation pulses of the recording power level Pp used at the time of recording a recording mark having a length of nT (where n is an integer of one or more, and T represents a clock cycle) is represented as m (where m is an integer of one or more), the relation n=2m is satisfied, provided that the value n is an even number, and the relation n=2m+1 is satisfied, provided that the value n is an odd number.

16. An optical recording method for a multi-layered optical recording medium according to claim 15, wherein the recording mark is recorded by increasing only the shortest mark by one pulse.

* * * * *